INVENTOR.
JEFFERSON P. LAMB
BY
ATTORNEY

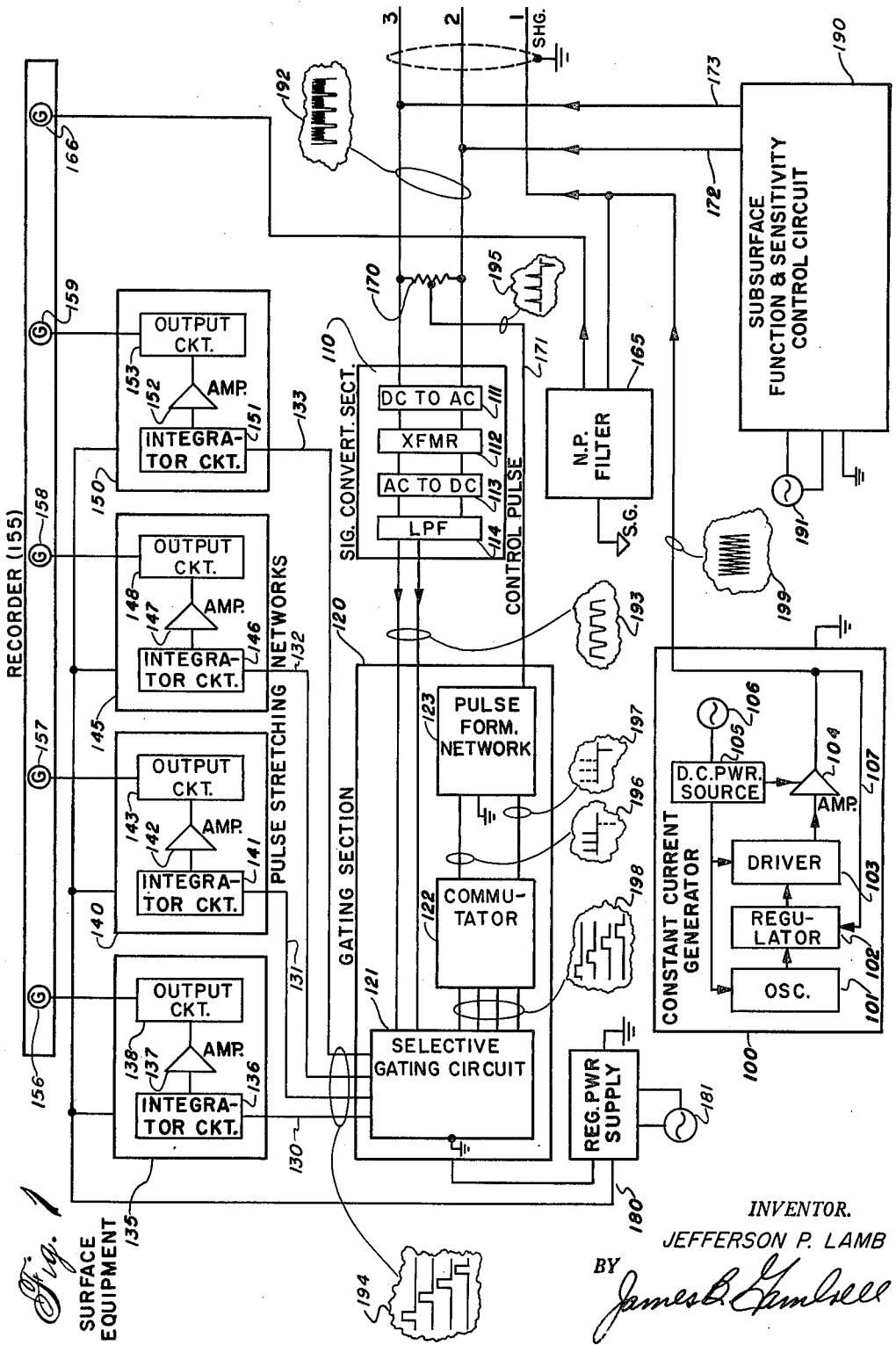

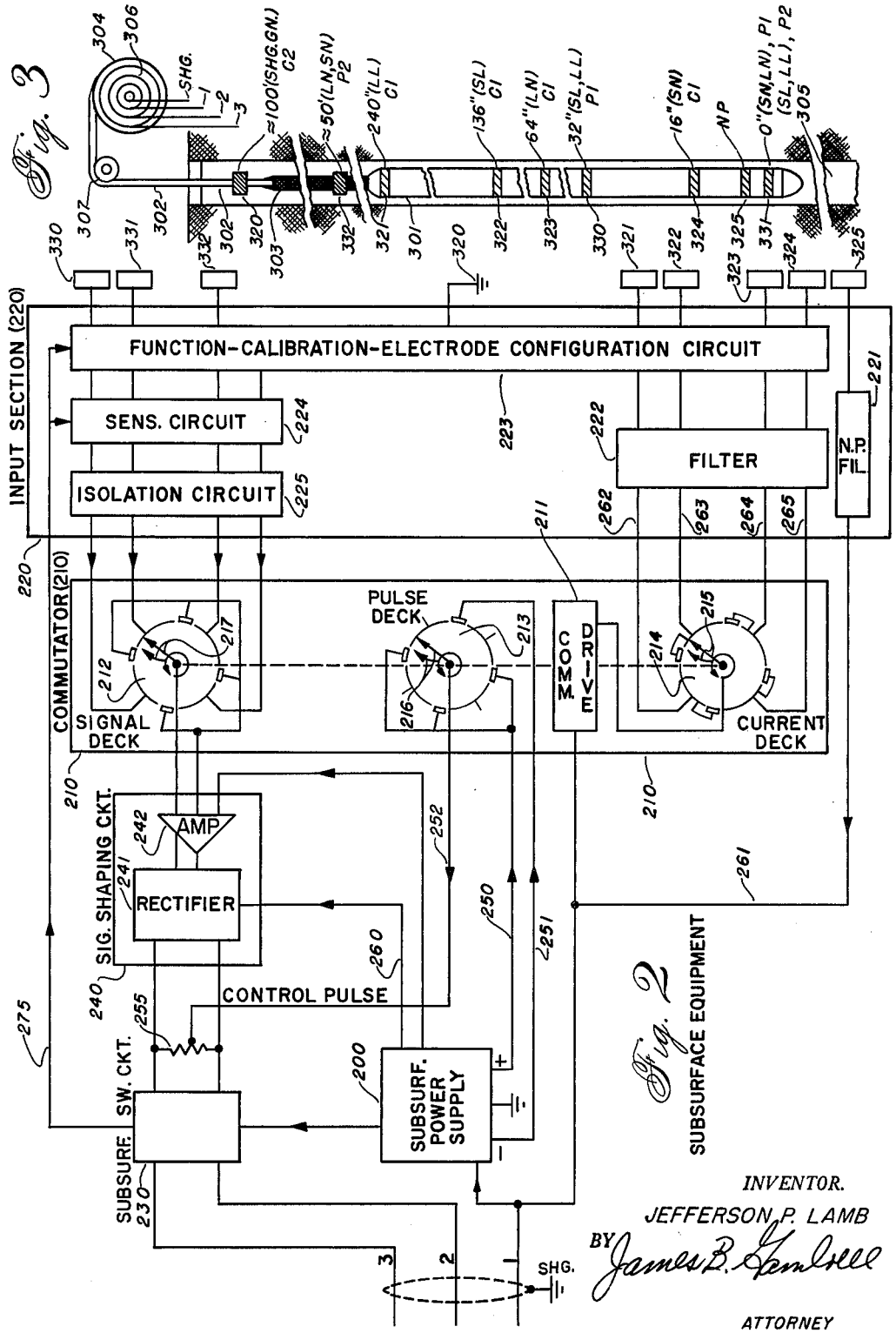

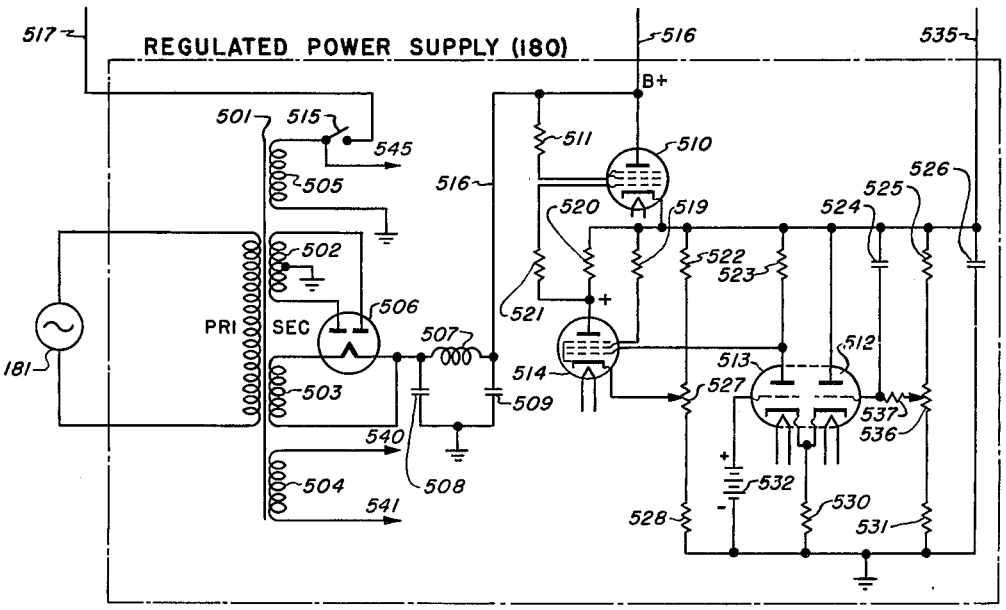

INVENTOR.
JEFFERSON P. LAMB
BY James B. Kimball
ATTORNEY

INVENTOR.
JEFFERSON P. LAMB

INVENTOR.
JEFFERSON P. LAMB
BY James B. Kimball
ATTORNEY

Sept. 7, 1965 J. P. LAMB 3,205,433
ELECTRICAL LOGGING SYSTEM FOR ESTABLISHING A PLURALITY
OF ELECTRICAL FIELDS, SAMPLING THE ESTABLISHED FIELDS
AND TRANSMITTING THE SAMPLES ON A TIME-SHARING BASIS
Filed June 20, 1958 15 Sheets-Sheet 9

INVENTOR.
JEFFERSON P. LAMB
BY James B. Kimball
ATTORNEY

Sept. 7, 1965 J. P. LAMB 3,205,433
ELECTRICAL LOGGING SYSTEM FOR ESTABLISHING A PLURALITY
OF ELECTRICAL FIELDS, SAMPLING THE ESTABLISHED FIELDS
AND TRANSMITTING THE SAMPLES ON A TIME-SHARING BASIS
Filed June 20, 1958 15 Sheets-Sheet 10

INVENTOR.
JEFFERSON P. LAMB
BY James B. Kimbrell
ATTORNEY

INVENTOR.
JEFFERSON P. LAMB
ATTORNEY

INVENTOR.
JEFFERSON P. LAMB
BY James B. Harwell
ATTORNEY

Sept. 7, 1965 J. P. LAMB 3,205,433
ELECTRICAL LOGGING SYSTEM FOR ESTABLISHING A PLURALITY
OF ELECTRICAL FIELDS, SAMPLING THE ESTABLISHED FIELDS
AND TRANSMITTING THE SAMPLES ON A TIME-SHARING BASIS
Filed June 20, 1958 15 Sheets-Sheet 14
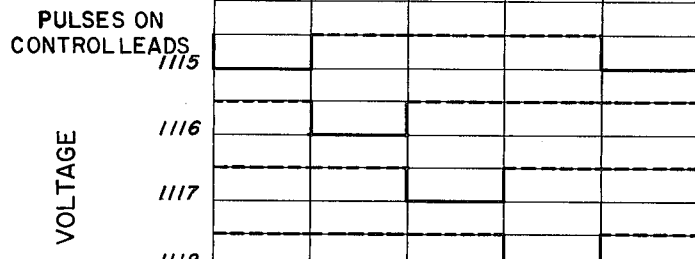
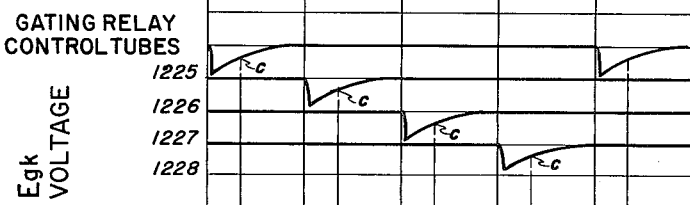
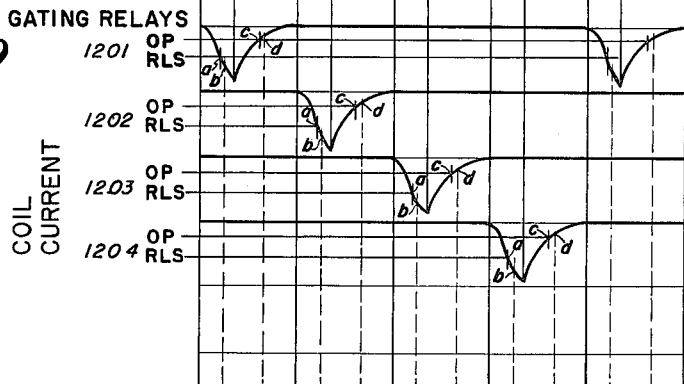
INVENTOR.
JEFFERSON P. LAMB
BY *James B. Lambell*
ATTORNEY

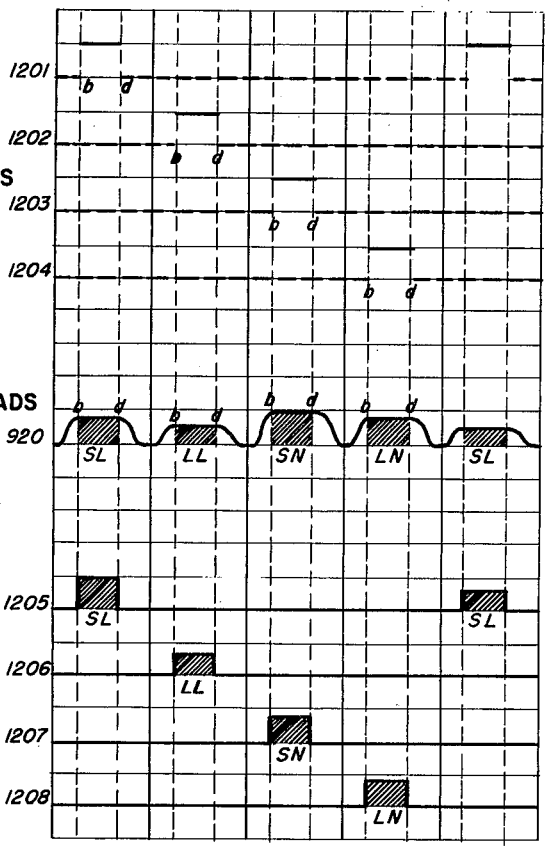

United States Patent Office 3,205,433
Patented Sept. 7, 1965

3,205,433
ELECTRICAL LOGGING SYSTEM FOR ESTABLISH-
ING A PLURALITY OF ELECTRICAL FIELDS,
SAMPLING THE ESTABLISHED FIELDS AND
TRANSMITTING THE SAMPLES ON A TIME-
SHARING BASIS
Jefferson P. Lamb, Tulsa, Okla., assignor to Dresser In-
dustries, Inc., Dallas, Tex., a corporation of Delaware
Filed June 20, 1958, Ser. No. 743,380
48 Claims. (Cl. 324—10)

This invention relates to a system for obtaining litho-graphical information on earth strata penetrated by a borehole and more particularly to methods and apparatus for electrically logging an oil well in order to obtain information correlatable with the subsurface strata.

This is a continuation-in-part of my application which was filed on December 31, 1956, and assigned Serial No. 631,789, now abandoned.

One of the most reliable means for obtaining information on the geological strata through which an oil well is drilled is the electrical well log. Interpreters of electrical resistivity logs differ as to optimum electrode spacings and as to which types of curves reveal the most, although it is generally agreed that a plurality of curves permit the more adequate analysis of the subsurface lithology.

Even so, the principal types of curves obtained during conventional logging of boreholes have been agreed upon as the natural or spontaneous potential curve, and the so-called "normal" and "lateral" resistivity curves. The former curve is obtained by sampling the D.C. voltages of the subsurface strata without establishing any artificial or induced potential field therein, whereas both the "normal" and "lateral" curves require the establishment of potential fields adjacent the borehole. The fields are then detected at points remote from the current establishing means and their values correlated with characteristics of the geological formation adjacent thereto.

The "normal" curves are generally measured between a pickup electrode carried on a logging tool and a remote electrode or sheath ground, whereas the "lateral" curves constitute the voltage difference between a pair of pickup electrodes, usually carried on the logging tool. The "normal" curves provide information on the formations immediately adjacent the borehole and are affected, more or less, by the presence of borehole fluid and impurities whereas the "lateral" curves provide information on strata farther removed from the borehole and are, therefore, less likely to be influenced by the borehole fluids. Though as noted above, users of electrical logs do not agree as to optimum electrode spacings, which accounts for a plethora of "short," "medium," "long" lateral and normal curves, all concerned do agree upon the desirability of obtaining a maximum number of resistivity curves and doing so with a minimum number of conductors and with the electrodes oriented among themselves and with respect to the subsurface instrument whereby, insofar as possible, a common reference is established for all curves. For example, it is thought best to select electrode combinations so that all of the resistivity curves are more or less referenced to the O″ band electrode since this band is closest to the bull plug of the logging tool.

In spite of the fact that the plurality of resistivity curves desired in any one situation should be obtained simultaneously, more or less, any system whereby samples for each curve are obtained at a sufficiently short time interval will be satisfactory. A single conductor cable is entirely feasible and has been used often in the electrical logging of oil wells, but it necessitates some type of carrier system in order to provide more than one resistivity curve and, at the same time, provide downhole power for the establishment of the emanating fields. As is well known, the encoding and decoding electronic equipment necessary for carrier systems is quite substantial and, since at least a part of it must be contained in the logging tool, the tools, often, have been in the past too cumbersome and yet too delicate to provide an entirely satisfactory solution. On the other hand, a multiconductor cable, theoretically at least, offers unlimited possibilities since the number of conductors in a cable may be selected with a view to the number of resistivity curves desired. As a practical matter, however, when the number of conductors in a cable exceeds five or six, the inter-conductor capacitance and crosstalk problems, not to mention problems of stretching due to excess weight, arise and conspire to nullify any theoretical advantages a cable with an unlimited number of conductors might have.

Yet another advantage to minimizing the number of conductors employed to obtain a desired number of resistivity and natural potential samples is that it leaves transmission capacity for other wireline services. Ultimately, therefore, an integrated service can be provided, perhaps including electrical logging, radioactivity logging, and gun perforating. Such wireline services would have all subsurface equipment in the same tool and use the same cable.

The present invention provides an electrical logging system wherein the number of conductors necessary for a given number of informational curves is minimized by transmitting samples for the individual informational curves to the surface on a time-sharing basis. While the sampling of resistivities adjacent the subsurface stratum and their time-sharing transmission to the surface interferes to some extent with the simultaneousness of the resistivity curves obtained, if the electrical fields are sampled sufficiently often, an accurate indication of the changes in the subsurface lithology will be provided in spite of their not being continuously recorded.

An object of the present invention, therefore, is to provide a well logging system wherein a plurality of informational samples is transmitted to surface recording equipment over a minimum number of conductors.

Another object of the invention is to provide an electrical logging system which may be expanded to permit the sequential sampling of any number of electrical fields established in the subsurface strata.

Yet another object of the present invention is to provide an electrical logging system which is more versatile, accurate, and, on a per log basis, more economical than presently existing systems.

A feature of the present invention pertains to means for sequentially establishing a plurality of electrical fields adjacent the subsurface strata and detecting means cooperating therewith to sample the established fields for transmission to surface equipment on a time-sharing basis.

Another feature of the invention is means responsive to the current establishing the plurality of electrical fields for synchronizing the sampling of the fields and their establishment.

Another feature of the present invention pertains to means cooperating with the sampling means to transmit the samples to surface equipment over a pair of conductors on a time-sharing basis and to direct each of the samples to its respective recording means.

Still another feature of the invention pertains to the cooperation of means for establishing a plurality of electrical fields adjacent subsurface strata in a preselected sequence, means synchronized with the field establishing means to sample the fields as they are established, means for transmitting the samples to surface equipment on a time-sharing basis, and means responsive to the current establishing means to gate the plurality of samples, each of which represents a point on an independent informational curve, to their respective recording channels.

More particularly, a feature of the invention pertains to an electrical logging system wherein a multi-conductor cable is connectable between surface equipment and a subsurface instrument having a plurality of electrodes for substantially simultaneously indicating at the earth's surface more than one independent electrical characteristic of the subsurface formation by preselectedly connecting conductors to combinations of the electrodes both to establish and to sample a plurality of electrical fields.

Another feature of the present invention resides in having the connections of conductors to the plurality of electrodes controlled by the current flowing to establish the plurality of electrical fields.

Still another feature of the invention pertains to means associated with the subsurface instrument for generating a series of control pulses which act to control surface gating means which, in turn, commutate the time-sharing samples to their respective recording means.

The control pulses are phantomed over the signal carrying conductors to the gating means where they are reformed and then control the operation of a selected gating circuit which in turn operates in synchronism with the sampling of the plurality of electrical fields to direct each of the sample potentials to its independent recording channel.

A more limited feature of the present invention is a current generator which provides over a current conductor a source of constant alternating current for the establishment of the electrical fields adjacent the subsurface strata. The constant current also controls a multi-deck commutator in the subsurface equipment which, in turn, establishes and permits the sampling of a plurality of electrical fields.

Further specific features pertain also to the subsurface conversion of the plurality of A.C. samples to D.C. pulses for transmission to surface equipment and to a double conversion of these D.C. pulses at the surface in order to eliminate harmonics of the alternating constant current which constitutes the fields.

Still another particular feature of the present invention pertains to pulse stretching means associated with each recording channel for extending each resistivity sample for a full sampling period whereby galvanometer inputs remain unchanged during each sampling cycle.

Another feature of the invention pertains to a function and sensitivity control circuit whereby the electrode configurations and signal sensitivities may be changed from the surface in a preselected manner in order to permit calibration and other steps preliminary to a logging run to be performed.

A further feature of the invention pertains to surface and subsurface means cooperating with one or more of the conductors to obtain a natural potential curve. The sample is transmitted to the surface from and independent electrode over the current conductor with the use of appropriate filter means in the preferred embodiment of the present invention.

A feature of the constant current generator pertains to a variable conductance network intermediate the input and output of the generator which is compensatorily responsive to changes in the output load. More particularly, a sample output potential is balanced against a fixed or reference potential to change the impedance of a regulator means to thereby compensate for variations in load.

Features of the gating means include a pulse forming network for changing the control pulses into steep front pulses; a commutator responsive to the steep front pulses to provide a plurality of time-separated outputs which, in turn, control individual gating circuits that permit each sample potential to register in its respective recording channel.

Another limited feature of the present invention pertains to a regulated power supply which combines high regulation with long-term stability through the use of a cathode follower input and a reference potential which does not draw current.

These and other objects and features may be understood more fully when the following detailed description is read with reference to the drawings in which:

FIG. 1 is a block-functional circuit diagram of the surface equipment forming part of the present exemplary electrical logging system;

FIG. 2 is a block-functional circuit diagram of the subsurface equipment forming part of the present exemplary electrical logging system;

FIG. 3 is a diagrammatic view of a borehole being traversed by a logging tool constructed in accordance with the exemplary embodiment of FIG. 2;

FIG. 4 is an orientation layout of FIGS. 5–15 which disclose the detailed circuitry of the exemplary electrical logging system;

Figure 16:
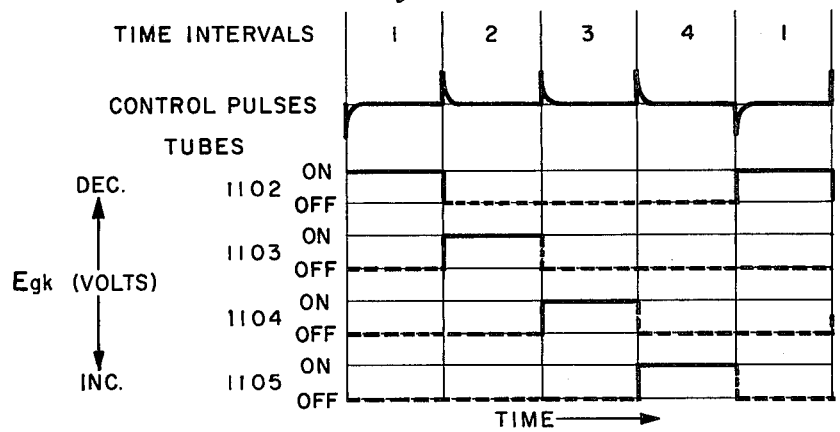
Figure 13:
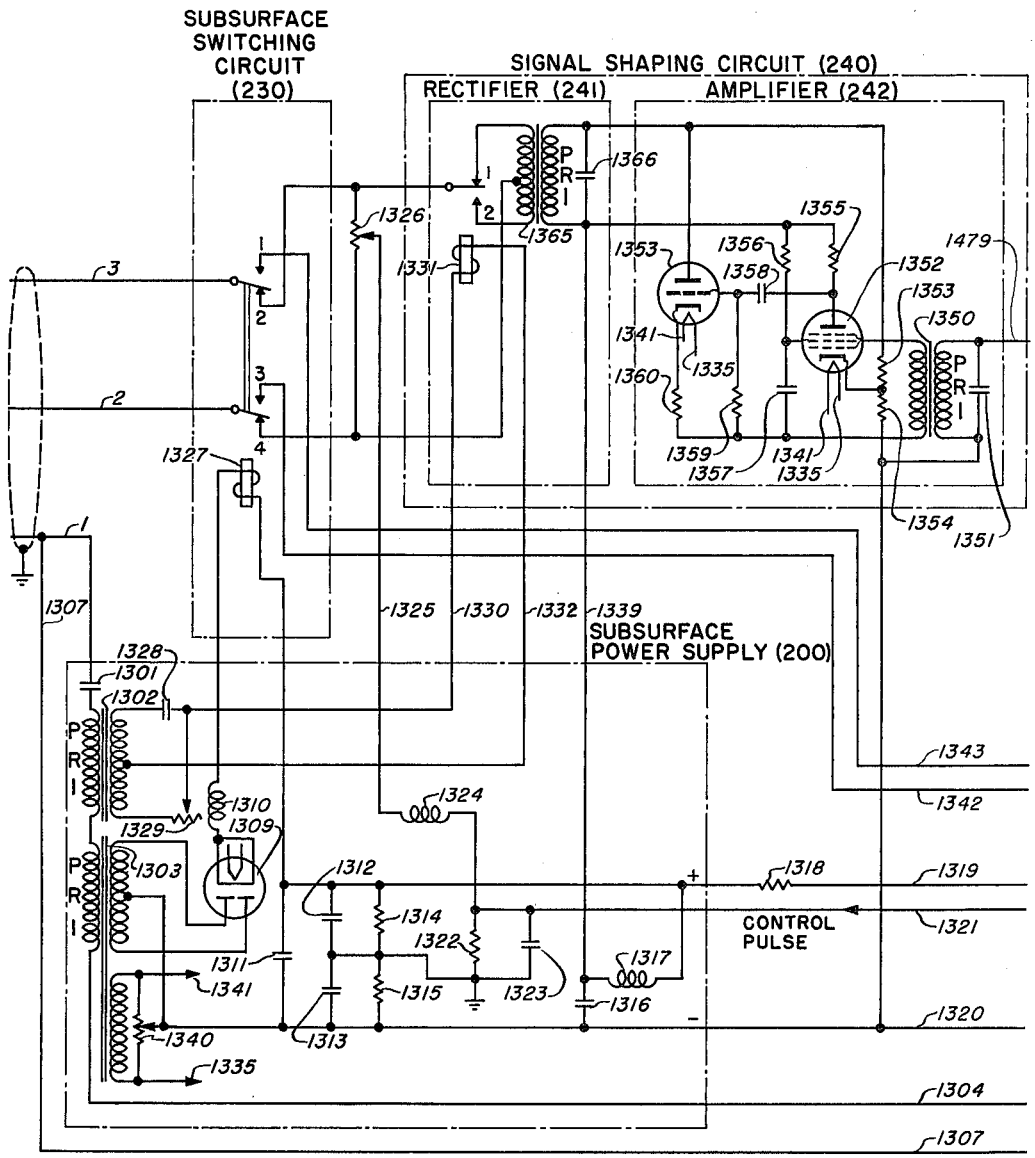
Figure 14:
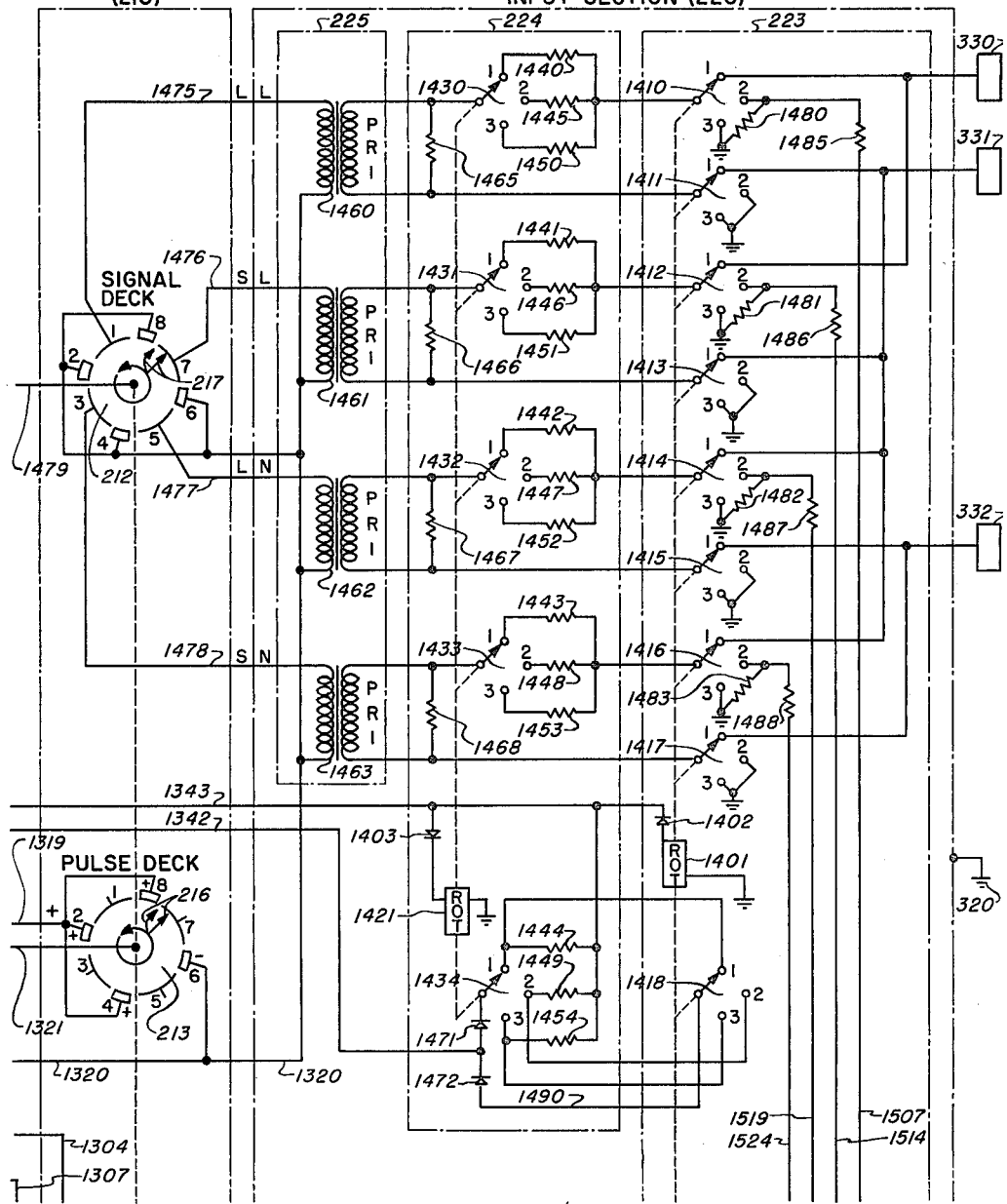
Figure 15:
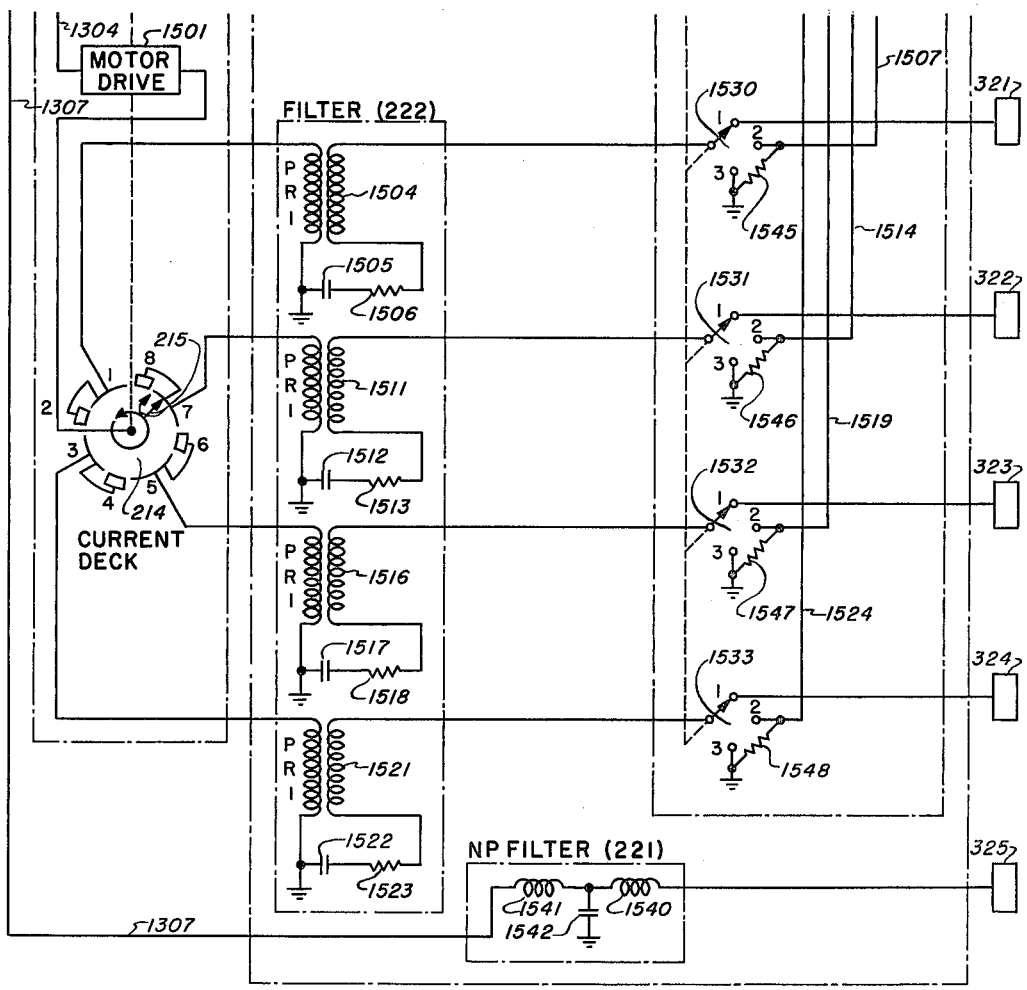

FIGS. 5–12, arranged in accordance with FIG. 4, constitute a detailed circuit diagram of the surface equipment shown functionally in FIG. 1;

FIGS. 13–15, arranged in accordance with FIG. 4, constitute a detailed circuit diagram of the subsurface equipment shown functionally in FIG. 2;

FIG. 16 illustrates the time relationship between "sync" pulses and the conductive status of tubes in the surface commutator; and FIGS. 17–22 correlate various occurrences in the selective gating circuit along a time base for the time intervals 1–4 of a sample period, more particularly, FIG. 17 depicts a group of sync pulses, FIG. 18 illustrates a group of input control pulses, FIG. 19 depicts bias voltages on gating relay control tubes, FIG. 20 shows coil current of the gating relays, FIG. 21 illustrates closures of contacts associated with the gating relays, and FIG. 22 depicts sample potential on the individual signal leads.

GENERAL DESCRIPTION

Looking generally to FIGS. 1, 2 and 3, the overall functioning of an electric logging system in accordance with the present invention may be understood. These figures will be employed first to broadly described the functioning of the inter-related apparatus and circuits of the logging system before a more detailed description of the circuitry constituting the functional box diagrams of the figures are given.

The current generator 100 supplies constant current over conductor 1 and sheath ground (SHG) to the subsurface instrument (FIG. 2) where it is supplied to a subsurface power supply 200, a commutator 210 and an input section 220. The flow of constant current through conductor 1 to the subsurface instrument causes the commutator drive 211 to rotate the four segment commutator decks 212, 213 and 214 in synchronism with one another. As the commutator rotates, constant current is commutated through the four segments of current deck 214 and the input section 220 to current electrodes 321, 322, 323, and 324. As a result of this commutated current, four fields (between each electrode and a remote sheath ground 320) are established in the strata adjacent the borehole for each complete revolution of the commutator decks 212, 213 and 214.

As each current field is serially established by the current flowing through current deck 214 to the current electrodes 321 through 324, each field is sampled by one or more potential or pickup electrodes 330, 331 and 332, which are located various distances remote from current electrodes 321–324. The sample which is taken of each of these serially established fields is fed through the input section 220 into the commutator 210 where signal deck 212 commutates the four signals, one potential for each of the four established fields, into a signal shaping circuit 240 on a time-sharing basis. After modifications in the signal shaping circuit 240, the four sampled potentials, again on a time-sharing basis, are fed through the subsurface switching circuit 230 to conductors 2 and 3, which constitute the signal carrying conductors of the present electrical logging system. These sampled potentials are thereafter transmitted over signal conductors 2 and 3 to the surface apparatus for recording purposes.

It should be understood that the particular combination of pickup electrodes chosen for sampling the established current fields in the strata are arbitrary in that they are dependent upon the particular group of resistivity curves that customers desire. In the exemplary embodiment of the instant invention, only two pickup electrodes 330 and 331 and a remote ground 332 are selected in order to obtain the four resistivity curves recommended by the American Petroleum Institute, viz. the 16" short normal (SN), the 64" long normal (LN), the 10' short lateral (SL), and the 18.8' long lateral (LL). While these particular electrode configurations are chosen for exemplary purposes, it must be understood that a variety of combinations of any four resistivity logs may be made substantially simultaneously by selecting various other combinations and/or spacings of pickup electrodes. The variations in current and pickup electrode arrangements, as is well known in the electrical well logging art, are practically infinite. Thus, while the present exemplary embodiment does not swap electrodes as between the current and pickup functions, it is often done and could be done in the present invention if desirable to get the particular resistivity curves the customer desired. Then too, the present four segment commutator decks could be enlarged to more than four segments, which would permit additional resistivity curves to be made substantially simultaneously.

The signals correlatable with the resistivity of the strata adjacent the pickup electrodes are fed into a signal converting section 110 at the surface, the output of which reconstitutes the signals as short bursts of D.C. potential. From the signal converting section 110, the samples are fed to the gating section 120. The gating section 120 functions to separate the time-sharing signals on signal conductors 2 and 3 so as to sequentially feed them to conductors 130, 131, 132 and 133. The four conductors 130 through 133, in turn, connect to individual pulse stretching networks 135, 140, 145 and 150. The pulse stretching networks are associated with individual galvanometers 156, 157, 158 and 159 in recorder 155, each pulse stretching network and its associated galvanometer supplied to record one of the four resistivity curves desired. Thus, the individual resistivity signals on conductors 130, 131, 132 and 133 are respectively fed into pulse stretching networks 135, 140, 145 and 150 wherein they are lengthened so that each revolution of the subsurface commutator changes the recorded values of the galvanometers 156 through 159 only once.

In addition to the four resistivity signals which are commutated to signal conductors 2 and 3 from the subsurface apparatus and thereafter decommutated by the gating section 120 to individual galvanometers 156 through 159 of the recorder 155, an NP electrode 325 detects a natural potential of current which is transmitted through NP filters 165 and 221 and over current conductor 1 to galvanometer 166. Since the natural earth potential varies slowly at a rate between 0–2 c.p.s., it can be transmitted over the current conductor and separated by filtering.

Since the sampled potentials adjacent the subsurface instrument are commutated through the signal deck 212 and fed on a time-sharing basis to the surface equipment and there decommutated by the gating section 120 to individual conductors 130 through 133, means are provided to synchronize the subsurface commutator and the gating section 120. Subsurface power supply 200 supplies a positive voltage over conductor 250 to three of the four fixed segments on pulse deck 213 of commutator 210, while a negative potential is supplied over conductor 251 to the remaining fixed segment on the pulse deck 213. As a result of this arrangement, the wiper 216, which is associated with the pulse deck 213, transmits three positive pulses followed by a negative pulse, on a time-sharing basis, over conductor 252 and a phantom circuit including resistor 255 and signal conductors 2 and 3 to the surface apparatus. The phantomed control pulses are taken off of resistor 170 at the surface equipment and transmitted over control pulse conductor 171 to the gating section 120 where the pulses are employed to synchronize the operation of gating section 120 with the mechanical commutation of the sampled potentials in the subsurface instrument. As a result of the foregoing system, using a four segment commutator, four resistivity curves and a natural potential curve are provided at a variety of electrode spacings. It will be apparent, as noted above, that numerous other combinations of resistivity curves may be provided and that additional resistivity curves may be obtained if the subsurface commutator 210 employs a number of fixed segments greater than four.

FIG. 3 depicts a conventional logging tool and illustrates the relation between the various electrode bands referred to previously. The means for supporting the tool and causing it to traverse the borehole are also shown in a representative form. Of course, these means are conventional and need not be considered in detail since they form no part of the present invention.

The logging tool 301 is supported by a conductor carrying cable 302 wound about a cable drum 304. The logging tool or instrument 301 is caused to traverse the borehole 305 by rotational movement of the drum 304 (by means not shown). The cable 302 includes conductors 1, 2 and 3 and has a shield or encircling sheath (SHG) surrounding them. The outer portion of the cable 302, for upwards of a 100 ft. is covered with an insulating material, e.g., polyethylene or rubber "hose," 301 to prevent direct contact between the sheath (SHG) and the fluid in the borehole. This has the effect of providing remote sheath grounds for the electrodes. Since the cable employed in the present logging system is one including three conductors and a sheath ground, slip rings 306 are provided for maintaining continuity between these conductors and the subsurface instrument and recording means located at the surface. A remote current electrode 320 is provided, which may be, as in the instant embodiment, formed on the sheath (SHG ground) at a distance approximately 100 feet remote from the logging tool 301. A remote pickup electrode 332 is similarly formed on the hose (subsurface ground return) at a distance from the tool 301 of approximately 50 feet. The previously mentioned current electrodes 321 through 324 and pickup electrodes 330 and 331 form part of the outer surface of the logging tool 301 as shown. Of course, it must be understood that the electrodes are insulated from the body of the tool in accordance with conventional logging tool construction. It is also pertinent that the 0" band is as close to the lower end of the tool as possible, since it is used as a reference.

The relative positions of the electrodes 320–325 and 330–332 are shown in FIG. 3 and to the right of the logging tool 301 are listed the particular electrodes used to obtain the four recommended A.P.I. curves.

These electrode configurations may be summarized as follows:

| Resistivity curve | Current electrodes | Pickup electrodes |
|---|---|---|
| 16″ SN | $C_1=324$ (16″) <br> $C_2=320$ (100′) | $P_1=330$ (0″) <br> $P_2=332$ (50′) |
| 64″ LN | $C_1=323$ (64″) <br> $C_2=320$ (100′) | $P_1=330$ (0″) <br> $P_2=332$ (50′) |
| 10′ SL | $C_1=322$ (136″) <br> $C_2=320$ (100′) | $P_1=331$ (32″) <br> $P_2=330$ (0″) |
| 18′8″ LL | $C_1=321$ (240″) <br> $C_2=320$ (100′) | $P_1=331$ (32″) <br> $P_2=330$ (0″) |

It can be appreciated that the actual physical design of the tool can vary considerably; however, it should be kept in mind that in all cases it must resist high temperatures and be airtight in order to resist borehole liquids.

Looking more particularly at the functioning of the present logging system but still directing attention to FIGS. 1 and 2, it can be seen that the constant current generator 100, which maintains a constant current on current conductor 1 includes an oscillator 101, a regulator 102, a driver circuit 103, an amplifier 104, a D.C. power supply 105, and a source of alternating current 106 which can, for example be a 115 volt, 60 c.p.s. source. The oscillator 101 is designed to generate a 400 cycle wave form which is sent through regulator, driver and amplifier circuits to produce a constant current output on conductor 1.

A portion of the output on conductor 1 is sampled and returned over feedback lead 107 to the regulator 102 so that the output of the current generator is maintained constant regardless of changes in the load attached to the subsurface termination of current conductor 1. The use of a constant current generator permits only potentials to be measured in the borehole and thus obviates the need to measure current changes. The way in which the constant current generator 100 is regulated by a modified feedback loop constitutes one of the novel features of the present invention and will be more particularly explained in the detailed description to follow. Suffice it here to note that the generator 100 maintains a constant current output under varying load conditions encountered by the current emanating electrodes 321–324 in the borehole 305.

The current flow in conductor 1 in the subsurface apparatus is fed to the power supply 200 which, in turn, supplies power over lead 260 to rectifier 241 in the signal shaping circuit 240. Power supply 200 also provides filament current for the tubes of amplifier 242 in the signal shaping circuit 240 and operation current for the subsurface switching circuit 230. This latter circuit is capable of switching the subsurface electrode system from an operate or logging condition to a calibrate condition, as will be more fully described below. Then too, as noted previously, power supply 200 supplies positive and negative voltages over conductors 250 and 251, respectively, to preselected fixed segments on pulse deck 213, which forms part of commutator 210.

Current in conductor 1 is also supplied serially to the commutator driving means 211 and the wiper 215 of current deck 214. The natural potential electrode 325 is connected to current conductor 1 through an NP filter 221 associated with the input section 220 over conductor 261.

The commutator drive means 211, e.g., a synchronous motor, rotates the commutator wipers 215, 216 and 217 at a constant speed and the constant current is commutated through wiper 215 of current deck 214 to the four current electrodes 321, 322, 323 and 324, sequentially.

The currents which are commutated by current deck 214 flow through conductors 262 through 265 to current electrodes 321 through 324, respectively. They also traverse a four section filter 222 and a function calibration and electrode configuration circuit 223, which circuits form part of the input section 220. The individual filter circuits contained in filter 222 for each of the current conductors 262 through 265 effectively eliminate any undesired D.C. components due, e.g., to commutation, which have been mixed with the 400 cycle A.C. during the transmission through conductor 1 to the subsurface instrument. The function, calibration and electrode configuration circuit 223 is controlled from the surface through subsurface switch circuit 230 and over circuit path 275. When the circuit 223 is in its operate or logging position, the fixed commutating segments of current deck 214 are directly connected through conductors 262 through 265 and filter circuit 222 to current electrodes 321 through 324, respectively.

As the commutator 210 rotates and a potential field is established adjacent current electrodes 321, 322, 323 and 324 in a sequential pattern, the preselected pickup electrodes 330–332 sample the different established potential fields. As these fields are sampled on a time basis, they are fed through the function-calibration-electrode configuration circuit 223, a sensitivity circuit 224 and an isolation circuit 225 to the fixed segments of signal commutating deck 212. The signal deck 212 is identical to and in synchronism with current deck 214; hence, each time a potential field is established adjacent one of the current electrodes, it is sampled by one or more pickup electrodes and fed through wiper 217 associated with signal deck 212 to the signal shaping circuit 240.

The sensitivity circuit 224 serves to attenuate all signals to a range of amplitudes so that the single amplifier 242, associated with the signal shaping circuit 240, can accommodate all sampled potentials without requiring a large dynamic range. The sensitivity is usually expressed in ohmmeters as is conventional in the electrical logging field. Thus, the attenuators for each signal channel in one exemplary embodiment are chosen so as to provide sensitivities of 10, 20 and 30 ohmmeters at full scale deflections. A variable resistor is associated with each galvanometer channel at the surface so that intermediate sensitivities are possible.

The isolation circuit 225 which includes separate filters for each sampled potential, filters all natural potentials and unwanted interference components from the sampled alternating potential fields.

After the sampled potentials are fed serially through amplifier 242, rectifier 241 of the signal shaping circuit 240 converts them into short bursts of D.C. voltage, though small amplitude A.C. components of the second harmonic remain. These direct current pulses, each representing one of the sampled potential fields, are fed through subsurface switching circuit 230 to the signal converted section 110 (surface apparatus, FIG. 1) over signal conductors 2 and 3.

While many electric logging systems transmit signals to surface recording equipment between a single conductor and sheath or surface ground, it is preferable to use two conductors as here proposed. The use of floating conductors minimizes the problem of noise and hash, which is present on the cable sheath, degrading the information bearing signals. Then too, the use of a pair of conductors permits cross-talk between cable conductors to be more readily balanced to a value within acceptable limits. The phantoming of control pulses, in a manner explained in detail below, does not aggravate the cross-talk problem as compared to that present if the transmission of information signals is between one conductor and sheath ground and control signals between another conductor and sheath ground.

The signal converter section 110 includes a D.C. to A.C. converter 111, a transformer 112, an A.C. to D.C. rectifier 113 and a low-pass filter 114. These cooperate to form a series of "reconstituted" D.C. pulses, each of which represents an electrical signal correlatable with the resistivity of the subsurface strata. The purpose of reconstituting the D.C. pulses arriving at the surface equipment is to obtain a single-ended output. Thereafter, low-pass filter 114 filters fundamentals and harmonics of the 400 c.p.s. alternating current which are superimposed on the D.C. pulse bursts on signal conductors 2 and 3 as a result of leakage and cross-talk.

The reconstituted D.C. pulses are fed to the selective gating circuit 121 of the gating section 12 which, in turn, separates them from the single transmission path and places them serially on conductors 130, 131, 132 and 133. The gating circuit 121 is controlled by a commutator 122 which is, in turn, controlled by pulses from the pulse forming network 123.

The pulse forming network 123 operates to reform the series of control pulses generated in the subsurface power supply 200 and transmitted over the phantomed path on signal conductors 2 and 3. The series of control pulses, three plus and one minus, are taken off resistor 170 and fed into the pulse forming network 123 via conductor 171. The fixed segments of signal deck 212 of subsurface commutator 210 are grounded during the time that the positive and negative pulses on the pulse deck 213 are being sampled. Thus, these potentials are being serially sampled through wiper 216 of pulse deck 213 and phantomed to the surface between conductor 252 and ground while signals sampled by pickup electrodes 330 through 332 are not passed. This prevents interference between the series of control pulses and the sampled potentials. This interference prevention is accomplished by angularly displacing the segments of the pulse deck as compared to those on the current and signal decks. This displacement means that the fixed segments of the signal deck 212 are grounded when control pulses are sent to the surface; contrariwise, during each part of the cycle when a sampled potential is transmitted over signal conductors 2 and 3, no control pulses are phantomed across the signal conductors 2 and 3. Time-sequence-wise, a potential representing a first sample occurs, then a control pulse on the phantom of signal conductors 2 and 3, then another sampled potential, then another control pulse, and so on.

The pulse forming network 123, which sharpens the wave front of the control pulses so that they can properly drive the commutator 122, are formed by novel means. The commutator 122 also constitutes a simple, yet novel, approach to a ring translator. These, and the novel way in which the selective gating circuit 121 serially separates the D.C. pulses, each of which represents a significant resistivity value, will be more fully explained below.

As noted above, each of the signals representing a sampled resistivity is fed to its individual pulse stretching network 135, 140, 145 and 150 over respective conductors 130, 131, 132 and 133. The pulse stretching networks (135, 140, 145, 150) are similar and each includes integrator circuits (136, 141, 146, 151), amplifiers (137, 142, 147, 152) and output circuits (138, 143, 148, 153), respectively. The outputs of output circuits 138, 143, 148 and 153 are directed to their respective galvanometers 156, 157, 158 and 159, located in the recorder 155. Each of these pulse stretching networks expands one of the D.C. pulses to cover the period of time before another D.C. pulse representing that particular sampled potential is again detected for transmission to the galvanometer of interest in the recorder 155. In this way, a constant voltage, representing a particular resistivity measurement, is provided for the entire period until another value of that same sampled resistivity is obtained during the next revolution of the subsurface commutator 210.

The power for the gating section 120 and the pulse stretching networks 135, 140, 145 and 150 is supplied by a regulated power supply 180; which is, in turn, supplied with alternating current from a source 181. This source may be, for example, 115 volts at 60 c.p.s. The regulated power supply 180 constitutes simple and novel means for obtaining a regulated B+ supply for use in the gating section 120 and an unregulated B+ supply for use in pulse stretching networks 135, 140, 145 and 150. The modus operandi of this regulated supply will be more fully explained below.

The subsurface function and sensitivity control circuit 190, powered by a source of alternating current 191 (e.g., 115 volts, 60 c.p.s.), is a part of the surface apparatus and permits the function-calibration-electrode configuration circuit 223 and the sensitivity circuit 224 to be changed from a surface location. The output of control circuit 190 is placed on signal conductors 2 and 3 from leads 172 and 173, thence through subsurface switching circuit 230 and over lead 275 to the circuits in question. Since circuits 223 and 224 are controlled by the manipulation of the subsurface function and sensitivity control circuit 190, whenever the instrument is to be calibrated, circuit 190 is employed to switch the electrodes across calibrate loads, to switch the pickup electrodes out of the circuit, and to switch dummy loads into the signal deck circuit. The subsurface circuit 223 also permits the multipling of electrodes to obtain any desired combination of resistivity curves thought desirable.

The wave forms, as they appear at various points in the overall system, may be seen by referring to FIG. 1. Wave form 192 represents the four sampled potentials after they have been rectified in the subsurface instrument for transmission to the surface apparatus. They are comprised of D.C. pulses with small amplitude A.C. components superimposed thereon. Wave form 193 illustrates the D.C. pulses after they have been converted to A.C. and reconverted to D.C. to eliminate the A.C. components by filtering. Wave form 194 represents the sampled resistivity signals after they have been separated by the selective gating circuit 121 for connection to their respective pulse stretching networks 135, 140, 145 and 150.

Observing the wave forms of the control pulses, wave form 195 represents the three positive spikes followed by a negative spike, and wave forms 196 and 197 represent the positive and negative control pulses, respectively, separated after their wave fronts have been sharpened by the pulse forming network 123 to drive commutator 122. Wave form 198, on the other hand, represents the reconstituted D.C. control pulses after they have been separated by commutator 122 to operate selective gating circuit 121 to separate the time-sharing information samples. Finally, wave form 199 represents the output of the constant current generator, 400 c.p.s. alternating current. Now that the overall system has been described functionally in some detail; in order to provide a clear picture of the operation of the overall system, a detailed description of the circuitry in each of the blocks forming parts of block diagrams of FIGS. 1 and 2 must be examined in detail. As noted above, FIG. 4 relates FIGS. 5 through 15, which together form the overall electrical logging apparatus which is represented functionally in FIGS. 1 and 2. It will be observed from comparing FIGS. 1 and 2 with the detailed circuitry disclosed in FIGS. 5 through 15 that the relative positions of the circuit components with respect to other components is consistent. It will further be observed that most of the detailed circuitry in FIGS. 5 through 15 is enclosed by dotted lines to represent the more or less detailed block diagrams depicted in FIGS. 1 and 2. This procedure should facilitate the understanding of the detailed description to follow.

SURFACE APPARATUS

Constant current generator

One of the most basic parts of the present electric logging system is the constant current generator 100, functionally described in the general description section above. As will become more apparent as the system is described in detail, the regulation of the current commutated to the current electrodes and to actuate the subsurface commutator must be excellent or the relative simplicity of the subsurface circuitry is lost and elaborate means must be employed to sample not only the voltage of the established fields but their currents as well.

Figure 6:
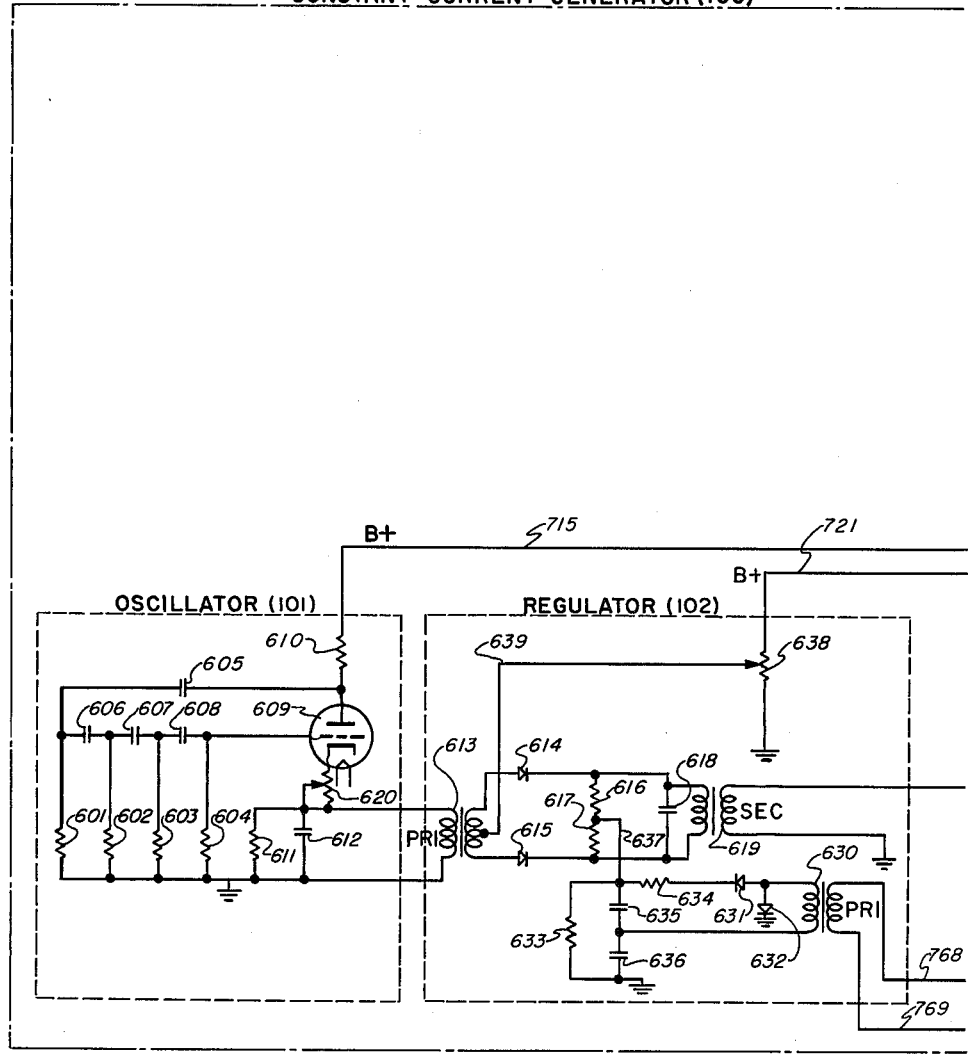
Figure 7:
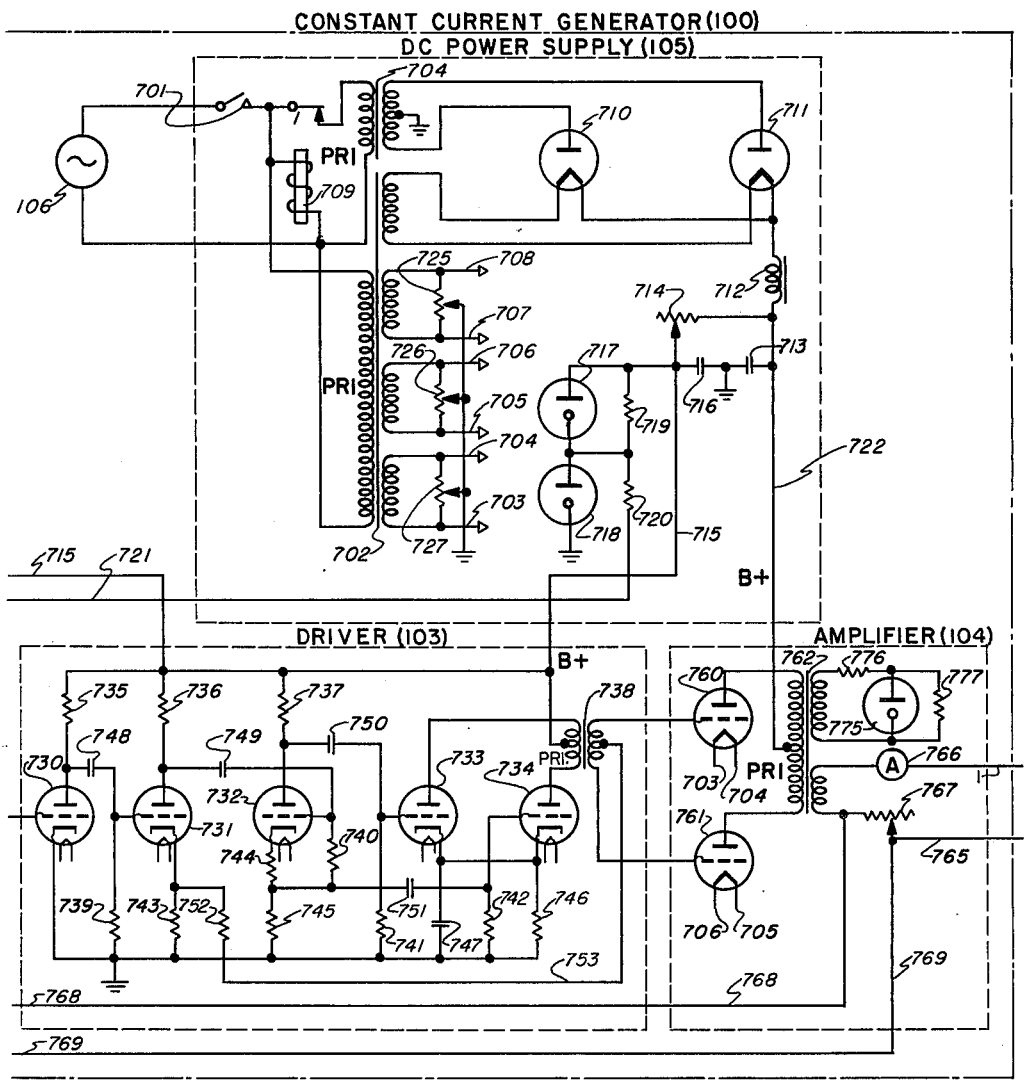

FIGS. 6 and 7 show in detail the basic components forming the constant current generator 100. As noted in the general description of the overall electrical logging system supra, the constant current generator 100 includes an oscillator 101, a regulator 102, a driver unit 103, an amplifier 104 and a D.C. power supply 105.

The D.C. power supply 105 is a conventional B+ source with a source of 60 cycle alternating current 106, e.g., 115 volts, energizing the primary winding of transformer 702 and completing a circuit to the swinger of relay 709. The manual closure of switch 701 completes a circuit through the primary winding of the transformer 702 thereby energizing its four secondary windings to supply filament current to the tubes in the constant current generator 100. Two of the secondary windings of transformer 702 are terminated on leads 703, 704, 705 and 706 which connect to the directly heated cathodes of tubes 760 and 761 of amplifier 104. The third secondary of transformer 702, having terminal leads 707 and 708 supply filament current to the indirectly heated cathode tubes in the constant current generator 100.

The closure of switch 701 also completes an operating path for relay 709, which in operating energizes the primary winding of transformer 704. The purpose of completing the circuit for the primary winding of transformer 704 through contact 1 of relay 709 is to allow the filaments of the tubes in the generator 100 to be lighted before B+ voltage is placed upon the plates. This has the effect of lengthening tube life. The relay contains a time delay of the order of 20 seconds.

Each terminal of the secondary winding of transformer 704 is connected to the plate of one of rectifier tubes 710 and 711 with the center-tap grounded and the fourth secondary winding of transformer 702 is serially connected through the heater-cathodes of the tubes. The output from this full wave rectifier is taken off the common junction of the cathodes of tubes 710 and 711 and fed through a choke 712 by-passed with a capacitor 713 to ground.

The B+ voltage available on lead 722 (junction between choke 712 and capacitor 713) is connected to the center-tap of the primary of transformer 762 for providing plate potential for tubes 760 and 761 in the amplifier 104. The B+ supply for the driver 103 and oscillator 101 is taken from lead 722 through a variable dropping resistor 714, which is by-passed to ground by capacitor 716, and connected to lead 715. Lead 715 has a series connected pair of regulator tubes 717 and 718 between it and ground. The regulator tubes 717 and 718 maintain the driver and oscillator B+ at proper value.

A third B+ voltage is obtained on lead 721 at the junction of the cathode of gas tube 717 and the plate of tube 718 through a dropping resistor 720. A by-pass resistor 719 is shunted across tube 717. This third D.C. potential acts as a reference potential for the regulator circuit 102, as will be more fully explained below.

Turning now to the oscillator 101 (FIG. 6), it can be seen to be an R-C phase-shift type of circuit comprising an input phase-shift network including resistors 601–604 and capacitors 605–608, vacuum tube 609, load resistor 610, variable cathode resistor 620, and the resonant cathode R-L-C circuit comprising resistor 611, capacitor 612, and the inductance of the primary winding of transformer 613. The oscillator output is on the cathode side of tube 609 so that the frequency or amplitude output of the oscillator is not varied by load fluctuations as it would be if taken off plate load resistor 610 in a conventional manner, the latter being in the frequency determining portion of the oscillator circuit. This controlled degeneration type of oscillator provides excellent regulation of the tank circuit, which is needed in the critical application of constant current generation. The cathode R-L-C circuit is tuned to 400 c.p.s. in the preferred embodiment of the present invention but, of course, it could be tuned to a different frequency to assist in providing constant current of a different frequency. The gain of the oscillator 101 is adjusted by varying resistor 620 in the cathode circuit of tube 609; and the gain is set at a value just above that at which oscillation commences.

The output of the oscillator 101 is applied from transformer 613 through the regulator 102 to the input of driver 103. More particularly, the output of oscillator 101 is applied to the grid of the input tube 730 of driver 103 through a part of the regulator circuit 102 which includes transformer 613, similarly poled diodes 614 and 615 in each leg of the output winding and the primary winding of transformer 619. Serially connected resistors 616 and 617 and capacitor 618 are shunted across the primary winding of transformer 619. Capacitor 618 and the input winding of transformer 619 are tuned to the 400 c.p.s. frequency desired. The operation of the regulator device 102 to assure constant current or constant voltage output from the generator 100 is described in detail hereinafter.

The output of the oscillator 101 at transformer 619 in the regulator circuit 102 is applied to the driver 103 where it is amplified, split through a more or less conventional phase inverter and used to control a low power driver stage.

The driver 103 includes triode connected vacuum tubes 730–734. The tubes 730, 731 and 732 are connected to the B+ supply on lead 715 through load resistors 735, 736 and 737, respectively, whereas the plates of tubes 733 and 734 are connected to respective terminals of the primary side of transformer 738 which is center-tapped to the B+ on lead 715. The grids of tubes 731, 733 and 734 are connected to ground through grid leak resistors 739, 741, and 742, respectively, and grid leak resistor 740 associated with tube 732 is connected to the junction of resistors 744–745. The cathode of input tube 730 is directly grounded while tubes 731 and 732 employ cathode resistors 743 and the series pair 744–745, respectively. The cathodes of tubes 733 and 734 are grounded through resistor 746 which is, in turn, shunted by capacitor 747. Capacitor 748 couples amplifying tube 730 to 731 and capacitor 749 couples tube 731 to the phase inverter tube 732. The plate and cathode of the phase inverter are coupled through capacitors 750 and 751, respectively, to the push-pull driver stage formed by tubes 733 and 734.

The oscillator signal, across transformer 619, is amplified in the first stage (tube 730) of the driver 103 and thereafter amplified and the phase inverted in the second stage comprising tubes 731 and 732. The two signals are then used to drive the push-pull output stage including tubes 733 and 734 which places the signal across the input winding of transformer 738. The output of transformer 738 is connected in push-pull to the grids of tubes 760 and 761 which perform a power amplifying function and in turn place the signal across the primary of transformer 762.

The first output winding of transformer 762 is shunted by a gas tube 775 associated with the dropping resistors 776 and 777. The neon bulb type gas tube 775 acts as an over voltage indicating device to warn an operator when the voltage across the second winding of transformer 762, and hence the output of the generator 100, is excessive. The second output winding of transformer 762 is connected between the signal conductor 1 and lead 765 (terminated at ground through an A.C. by-pass capacitor 801). NP filter 165 operates to separate the NP potential from the current lead 765. An ammeter 766 is connected in signal conductor 1 and a variable resistor 767 in lead 765.

The current output of transformer 762 is sampled across resistor 767 and directed through leads 768 and 769 to the primary of transformer 630 in the regulator circuit 102. This sampled potential across resistor 767 is stepped up by transformer 630 and applied to a voltage doubler-rectifier and filter network for the derivation of a D.C. sample voltage to be applied to the regulation circuit itself. The doubler-rectifier comprises diodes 631 and 632 and the filter network includes resistor 633 and capacitors 635 and 636. Resistor 634 forms no part of the filter, but protects the diodes from overload.

The D.C. sample voltage, at the junction of resistor 634 and capacitor 635, is applied to the junction of resistors 616 and 617 (which, preferably, are of equal value) through a lead 637. As alluded to before, a D.C. reference potential, generated by the D.C. power supply 105 and supplied over lead 721, is tapped across a part of variable resistor 638 and connected over lead 639 to the center-tap of the secondary winding of transformer 613. This reference potential is applied in opposition to the D.C. sample potential and is selected by variation of pot 638 to balance the sample potential applied via lead 637.

The diodes 614 and 615 cooperate with the sample and reference potentials, as supplied at the junction of resistors 616 and 617 and at the center tap of the secondary winding of transformer 613, respectively, to form a variable conductance bridge. The regulator circuit operates in the following manner to maintain constant current output between conductor 1 and sheath ground (SHG). Ammeter 766 is inserted in one side of the second secondary winding of transformer 762, and resistors 638 and 767 are adjusted until the meter 766 indicates the desired value of electrode current. This desired current flow then provides a sample voltage drop through the active portion of series-connected resistor 767 which, when doubled and rectified and filtered, as described above, balances the reference potential applied to the midpoint of the secondary winding of transformer 613. In this balanced condition, the conductivity of diodes 614 and 615 is such that it permits transfer of exactly the amount of energy or power from transformer 613 to transformer 619 necessary to cause the driver 103 and amplifier 104 to provide the selected output current through the secondary of transformer 762. If the output current tends to decrease, due to an increase in formation resistivity adjacent the logging tool or due to an increase in cable conductor resistance, etc., the sample potential picked off resistor 767 similarly drops. This causes an unbalance of the bridge in a direction which increases the conductivity of diodes 614 and 615.

This happens because diodes 614 and 615 become substantially short circuited when their arrow terminals are positive with respect to their plate terminals (reference potential exceeds sample potential). As a result of this characteristic, the transfer of energy from transformer 613 to transformer 619 increases to increase the output potential of the power supply between conductor 1 and ground, whereby it overcomes or compensates for the previous decreased current output. Conversely, if the output current flowing in conductor 1 increases, due to a decrease in current path resistance in the cable and/or earth formation, the larger current sampled across resistor 767 causes an opposite unbalance of the reference and sample potentials. This unbalance drives the arrow terminals of the diodes less positive which results in increasing their resistance to current flow. As the resistance of the diodes increases, reaching megohm value when the arrow terminals are negative with respect to the plate terminals, the current flow to transformer 619 decreases thereby reducing the current flow through conductor 1.

The control or current regulating system described above is automatic, and, quite unlike carbon pile and other current regulators, is substantially instantaneous in its action. Further, it is independent of the phase characteristics of the load, and not subject to the loop oscillations of usual A.C. servo-systems. The control device or regulator, employing the diodes 614 and 615 as variable conduction devices (which may be, e.g., silicon junction type diodes) in a balanced bridge, provides not only instantaneous compensation but eliminates distortion which results from the use of a single diode control circuit.

The operating range of the diodes 614 and 615 is limited to that portion of their characteristic curves lying in the region near the origin of the coordinate axes. This part of the E–I curve closely approaches a straight line, thus, by keeping the excursion of the voltage between ±0.3 volts, the diodes function as a variable conductance bridge rather than as high impedance switches. Accordingly, the electrical values of the regulating circuit and the potentials supplied thereto are chosen so as to restrict operation of the diodes to this substantially linear range on their characteristic curves.

To recapitulate, when the D.C. sample potential (derived from resistor 767) is more negative with respect to the reference potential derived at 638, the diodes present a smaller resistance to current flow, whereas when the sample potential increasingly exceeds the reference potential, their effective resistance to current flow increases.

It is to be understood, of course, that it is the output voltage across the secondary of transformer 762 that is varied, so that the current therethrough is maintained constant within a very narrow range of values. If it is desired to make generator 100 into a constant-voltage generator, the sample potential should be taken from a resistor shunted across the generator output instead of from a series-connected resistor 767 as shown. Under these circumstances, the output current will be varied to maintain a constant voltage output.

*Regulated power supply*

The regulated power supply 180 provides an unregulated source of B+ potential over lead 516 to a part of the pulse forming network 123 and a regulated B+ supply over lead 535 to various components in the gating section 120; more specifically, to the selective gating circuit 121, the commutator 122 and the pulse forming network 123. The unregulated B+ supply is a conventional one, however, the circuit used to obtain a closely regulated B+ provides novel means for obtaining a high degree of regulation, better than 0.1 percent and, at the same time, excellent long-term stability. In the particular exemplary embodiment of the regulated power supply 180, the long-term stability is also maintained at better than 0.1 percent.

The unregulated B+ potential supplied over lead 516 is obtained as follows: A circuit is completed which applies a source of alternating power 181, e.g., 115 volts at 60 c.p.s., across the primary of transformer 501. The application of an alternating voltage to the primary of transformer 501 energizes secondary windings 502, 503, 504 and 505. The center-tap of secondary winding 502 is grounded and the terminals thereof are connected to the plates of a full wave rectifier tube 506. Secondary winding 503 is connected to heat the cathode of rectifier 506. An output is derived from the cathode circuit of tube 506 through a capacitor input filter circuit, including input capacitor 508 and capacitor 509 shunting either side of inductor 507 to ground. This unregulated B+ output, available at the junction of choke 507 and capacitor 509, is supplied over lead 516 to the plate of a series regulator tube 510 and to a portion of the pulse forming network 123.

Figure 12:
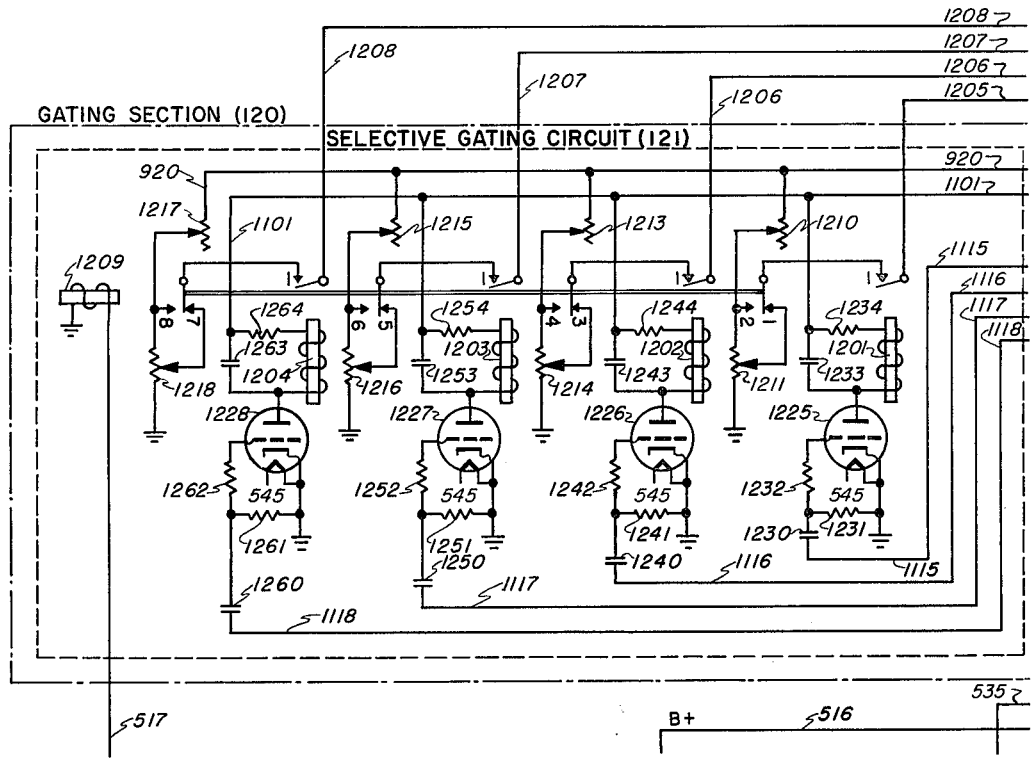

The terminals 540 and 541 of secondary winding 504 of transformer 501 are connected to the paralleled heaters of tubes 510, 512, 513 and 514 in the voltage regulator circuit of regulated power supply 180. The fourth secondary winding 505 of transformer 501 has one terminal grounded and the other (545) connected to other filaments (FIGS. 10–12) and to ground through the switch 515 and the winding of a calibrate relay 1209 in the selective gating circuit 121 (FIG. 12).

Switch 515 is manually operated whenever it is desired to calibrate the overall electrical logging system. This will be explained more fully in connection with the calibration procedure to be considered after the operation of the system is set forth in detail.

As is well known in the prior art, the conventional regulated power supply comprises a series regulator tube controlled by an amplifying stage which, in turn, is referenced to a source of known potential. While the present novel regulation circuit can also be thus broadly described, a number of features peculiar to it permit the maintenance of close regulation of output voltage, independent of load, while attaining long-term stability which is often not the natural result when gas tubes are used as a reference potential. As noted, the novel regulator circuit includes tubes 510, 512, 513 and 514 along with their associated circuitry which maintains a fixed and preselected B+ voltage on lead 535.

Broadly speaking, tube 510 and its related circuitry correspond to the series regulator tube and tubes 513 and 514 serve as an amplifier stage, and the reference potential is so described and identified as 532. The degree of regulation obtainable from any regulated power supply of this general design depends upon the portion of the sample potential as picked off of variable resistor 536, the amplification factor in the amplifying stage, and the mu of the series regulator tube 510. While the product of these factors determines the degree of regulation, long-term stability for any particular series regulated power supply depends upon the input impedance to the amplifying stage and the drift of the reference potential over time, due perhaps, to a multiplicity of reasons. These design factors have been combined in the instant regulated power supply to simply and economically assure a high degree of regulation accompanied by assured long-term stability.

The lead 535 is driven off the cathode of tube 510 which, in turn, is connected through plate resistor 520 to tube 514, plate resistor 523 to tube 513 and directly to the plate of tube 512. A variable resistor 536 in series with pad resistors 525 and 531 is connected between the cathode of tube 510 and sheath ground. The grid of tube 512 is connected through a resistor 537 to the wiper on resistor pot 536 and is also connected through capacitor 524 to the cathode of tube 510. Further, the series resistor combination including 525, 531, and 536 is shunted by a capacitor 526. The cathodes of tubes 512 and 513 are commoned and connected through a resistor 530 to ground. And a mercury cell battery 532, for example, one manufactured by Mallory, is connected in the grid circuit of tube 513. The cathode of tube 514 is connected to the wiper of a variable resistance pot 527 which is serially connected to resistors 522 and 528. These resistors are connected, respectively, to the cathode of tube 510 and ground. The control grid of tube 514 is connected directly to the plate of tube 513 and the screen grid of tube 514 is connected through resistor 519 to the cathode of tube 510. Finally, the plate of tube 514 is connected through resistor 521 to the control grid of series regulator tube 510 while the screen grid of tube 510 is connected to the plate thereof through resistor 511.

After the transformer 501 is energized, and the unregulated B+ voltage is placed on the plate of the pentode 510, which is triode connected for power regulation purposes, the regulated voltage on lead 535 is adjusted to a desired value by manipulation of resistor pot 536.

When the regulator circuit is balanced with an expected load and a preselected B+ voltage on lead 535, the bias on tube 512 is selected to come within the normal range for the tube employed by the proper selection of cathode resistor 530. Similarly, the reference potential battery 532 is chosen with resistor 530 in mind, so that the bias on tube 513 is within the tube's range of capability. Finally, the components associated with tube 514 are chosen to provide a bias within reasonable operation limits for the tube. The cathode voltage for tube 514 is obtained across resistor 527 and, since the control grid thereof is at a high potential (i.e., at the plate potential of tube 513), it must have a high cathode voltage in order that the bias will be within a reasonable range.

Once the output voltage level is chosen, the instant circuit operates to automatically maintain it, regardless of changing loads. If the resistance of the circuit being supplied B+ over lead 535 decreases, there is a tendency for the voltage to decrease which must be compensated for by the regulator circuit. The reverse is true when the load resistance tends to increase. In the first instance, if the voltage tends to decrease, the bias on tube 513 is reduced which causes the tube to draw more current. This decrease in bias results from the lowering of the voltage on the common direct coupled cathodes of tubes 512 and 513 (due to the lower positive grid voltage on tube 512) while the grid of tube 513 is maintained at the constant reference potential. The increased output of the first amplifier stage (tube 513), developed across resistor 523, is fed to the control grid of the second amplifying stage (tube 514) to decrease the current draw of that tube. Under the normally balanced condition, the cathode potential of tube 514 had been preselected through resistor pot 527 to provide a bias within the normal range in which the tube operates. Once this balance is upset by the presence of a different voltage on output lead 535, as reflected on the grid of tube 514, and, if this unbalance is toward a lower voltage (lower load resistance), the bias on tube 514 is increased and it draws less current. This increases the plate potential of tube 514 which decreases the bias on series regulator tube 510 through its connection to the control grid thereof. This renders tube 510 more conductive thereby increasing the cathode voltage connected to lead 535.

Contrary to the effect on the circuit when the output voltage tends to decrease, if the load is increased and the voltage tends to rise, tube 513 is rendered less conductive and 514 more conductive, which increases the bias on tube 510 which, in turn, decreases the regulated output voltage on lead 535.

While the conventional series regulator circuit contains some form of reference potential, ordinarily a neon bulb or gas tube in the cathode circuit of the first amplifying stage, the present invention places the reference potential in the grid circuit of the first amplifying stage in order to obtain long-term stability. Since the grid ordinarily draws little if any current, the use of a mercury cell battery, which is absolutely stable for all intents and purposes, approximates its shelf life, exceeding two years. This stability is only available when no current is drawn from the cell. Thus, reference potential 532 is placed in the grid circuit where there is no current drain.

The cathode driven input to tube 513 (tube 512 and its related circuitry) assists in the maintenance of long-term stability. Changes in the output load on the regulator circuit have no substantial effect on the impedance of tube 512, which is connected to provide a cathode follower output to control amplifying tube 513. The high input impedance, characteristic of a cathode follower, prevents any substantial change of the sample voltage taken from the wiper on pot 536 other than those due to changes in the regulated output. This voltage will remain stable if high grade resistors and pots are used and if the relatively low and changing input impedance effects of the amplifying stage (tube 513) can be isolated from the network. Variations in input impedance to the amplifier section of a series regulated power supply, resulting in sample voltage change, is one of the contributing factors to the long-term stability loss of conventional circuits. The cathode follower input substantially eliminates the problem. This, combined with the placement of a stable reference potential 532 in the non-current drawing grid circuit, assures long-term stability without degrading the degree of regulation expected from the overall circuit. Contrariwise, a gas tube reference suffers voltage shifts over its life span.

The present embodiment uses capacitors 524 and 526 and resistor 537 merely to prevent high frequency oscillations in the tubes due to the Miller effect and high circuit gain. In the same vein, resistor 511, coupling the screen grid of tube 510 to the plate thereof, and resistor 521, coupling the plate of tube 514 to the control grid of tube 510, eliminates parasitic oscillations. Resistors 525 and 531, in series with resistor pot 536, are employed to allow the range of resistor pot 536, to be maintained within narrow limits; in a similar manner, resistors 522 and 528 are so employed as regards cathode resistor 527.

The utilization of the output voltages from this regulated power supply, both unregulated and regulated, will be explained when operation of the surface apparatus is under consideration.

SUBSURFACE APPARATUS

The subsurface apparatus (shown schematically in FIG. 2) is shown in detail in FIGS. 13, 14 and 15. Looking now more particularly to the latter figures and keeping in mind the functional inter-relatedness of the building blocks as previously described in connection with FIG. 2, it can be seen that current is supplied over conductor 1 to the primaries of transformers 1302 and 1303 and that the current conductor 1 is connected in the input section 220 over conductor 1307 and through the NP filter 221.

Conductor 1 serially traverses the primaries of transformers 1302 and 1303 and continues through lead 1304, the winding of synchronous motor drive 1501 to the wiper 215 on current deck 214.

With current flowing via conductor 1 and capacitor 1301, which blocks the D.C. natural potential signal from the A.C. path, to the primaries of transformers 1302 and 1303 in power supply 200, their secondaries are energized. The secondary winding of transformer 1302 completes a circuit for the synchronous coil 1331 in signal shaping circuit 240 which may be traced from one terminal of the secondary through capacitor 1328, over lead 1330, through the coil 1331 and over lead 1332 to the center-tap of the secondary winding of transformer 1302. The other terminal of the secondary winding of transformer 1302 is connected to a variable resistor 1329, the wiper of which is connected to lead 1330. With this arrangement, whenever current flows through conductor 1, the synchronous coil 1331 is operated (to synchronously convert sample potentials). The capacitor 1328 in conjunction with variable resistor 1329 forms an adjustable phase-shifting network which allows the timing of the operation of contacts 1 and 2, associated with synchronous relay 1331, to be varied.

The first of two secondary windings carried by transformer 1303 is connected to the plates of a full-wave rectifier tube 1309 while the cathode thereof is connected through a choke 1310, the winding of relay 1327 (in the subsurface switching circuit 230) and a capacitor 1311 to the center-tap of the same first secondary winding of transformer 1303. The second secondary winding of the transformer 1303 has terminals 1341 and 1335 which are connected to the filaments of tubes 1352 and 1353 in amplifier 242 and tube 1309 in the power supply 200. A variable resistor 1340 is shunted across this secondary filament winding and the wiper thereof is connected to the center-tap of the first secondary winding. The particular arrangement of the rectifier circuit tube provides a conventional series choke input which works into capacitor 1311 in a conventional manner. The rectified voltage at the positive side of capacitor 1311 (intermediate capacitor 1311 and one side of the winding of relay 1327) is fed through dropping resistor 1318 to lead 1319.

This B+ voltage is applied to the fixed segments 2, 4 and 8 on pulse deck 213, which deck is associated with commutator 210. A source of B− voltage is taken off the center-tap of the second secondary winding of the transformer 1303 (the lower side of input capacitor 1311) over lead 1320 to fixed segment 6 on pulse deck 213 on commutator 210. Serially connected capacitors 1312 and 1313 and serially connected resistors 1314 and 1315 are connected across input capacitor 1311 and a neutral or zero potential reference point is provided at the junction of the capacitors and at the junction of the resistors by connecting them to sheath ground.

A separate source of B+ is supplied through choke coil 1317 and over lead 1339 to the low side of the primary winding of transformer 1365 (in rectifier 241) to provide plate potential for amplifier 242. This B+ supply is filtered by capacitor 1216 connected between leads 1320 and 1339.

Since relay 1327 in the subsurface switching circuit 230 is serially connected in the rectifier circuit of power supply 200, it is maintained in its operated condition during all the time current flows in conductor 1. As a result, signal conductors 2 and 3 are connected through make contacts 2 and 4 of relay 1327 during logging operations. It is only when the current flowing in current conductor 1 is interrupted that signal conductors 2 and 3 are switched and connected to break contacts 1 and 3 of relay 1327, thereby to control circuits over leads 1343 and 1342, respectively. The purpose of performing this subsurface switching function (via subsurface switching circuit 230) will be examined in considering the calibrate operations, infra.

Current commutation

The flow of current in conductor 1 energizes the winding of the synchronous motor drive 1501 in a circuit to be traced over lead 1304 and through the wiper 215 of current commutator deck 214 and one of the current transformers 1504, 1511, 1516 or 1521 to ground. The enabling of motor drive 1501, which may, incidentally, include any type of gear reduction ratio box, causes the commutator 210 to rotate at a speed having a fixed relation to the frequency of the constant current driving source flowing in conductor 1. The commutator 210 is constructed so that it rotates the signal deck 212, the pulse deck 213 and the current deck 214 in synchronism with one another; that is, their respective wipers 217, 216 and 215 engage their respective fixed segments 1, 2, 3, etc., at the same point in angular displacement. As the commutator rotates in a counterclockwise direction, as illustrated in FIGS. 14 and 15, constant current is serially placed on fixed segments 1, 3, 5 and 7 of current deck 214 which, in turn, serially feed current to the primaries of transformers 1504, 1521, 1516 and 1511, respectively (located in filter 222 associated with the input section 220). Shorting bars or fixed segments 2, 4, 6 and 8 are joined to 1, 3, 5 and 7, respectively, to prevent unnecessary arcing as the current is commutated. This arrangement results in the current lead never being between commutator segments, a situation which would adversely affect the operation of the synchronous motor 1501. The lower sides of the input winding of transformers 1504, 1511, 1516 and 1521 are grounded. The high sides of the secondaries of these transformers are connected to the wipers of switch decks 1530, 1531, 1532 and 1533 operated by rotary stepping switch 1401. The lower sides of the secondaries of these filter transformers 1504, 1511, 1516 and 1521 are connected to ground through series R-C circuits including capacitor 1505 and resistor 1506, capacitor 1512 and resistor 1513, capacitor 1517 and resistor 1518, and capacitor 1522 and resistor 1523, respectively.

Since the rotary switch 1401 is normally maintained with the wipers of its switch decks 1410–1417 and 1530–1533 contacting position 1, which position constitutes the operate position for ordinary logging operations, the current commutated by current deck 214 flows through contacts 1 of switching decks 1530, 1533, 1532 and 1531 to their respective current electrodes 321, 324, 323 and 322.

The positions 2 and 3 of the switching decks of rotary switch 1401 are used when the logging tool 301 is prepared for a logging run. This particular preparation for a logging traverse will be more fully explained below. It is sufficient here to note that rotary switch 1401 normally maintains the wipers associated with its switching decks in contact with their positions 1, thereby permitting the commutation of the constant current to current electrodes 321–324 through switch decks 1530–1533.

*Signal sampling*

As described functionally in the General Description section, the sampling portion of the subsurface apparatus includes, inter alia, the signal deck 212, input section 220 including isolation circuit 225 containing transformers for each of the four sampled potentials, a sensitivity circuit 224 consisting of a plurality of switch positions attached to variously valued dropping resistors and a part of the function-calibration-electrode configuration circuit 223. As may be observed by referring more particularly to FIG. 14, the function-calibration-electrode configuration circuit 223 includes, so far as the sampling portion thereof is concerned, switch decks 1410–1417 of rotary switch 1401. In this circuit 223, the sampling or pickup electrodes 330 through 332 are coupled together in a preselected arrangement in order to sample the sequentially established fields.

The signal deck 212 of commutator 210 has eight fixed segments, as do the pulse deck 213 and the current deck 214. Fixed segments 1, 3, 5 and 7 are connected, respectively, to the high sides of the secondary windings of transformers 1460, 1463, 1462 and 1461 in the isolation circuit 225, while the low sides of these secondary windings are coupled together to lead 1320. The fixed segment shorting bars 2, 4, 6 and 8 of signal deck 212, are commoned to the low side of input transformer 1350 of amplifier 242 (amplifier ground) through lead 1320. Thus, whenever the wiper 217 of signal deck 212 is in contact with segments 2, 4, 6 or 8, the input to amplifier 242 is shorted and no sample potential is applied to the input thereof. As noted, fixed segments 1, 3, 5 and 7 are connected to secondary windings of transformers 1460 through 1463 in isolation circuit 225. The primaries of these transformers are connected through sensitivity circuit 224 to pairs of the switching decks 1410–1417 of rotary switch 1401.

More specifically, the low side of the primary of transformer 1460 is connected directly to the wiper of switch deck 1411 whereas the high side of the primary is connected to the wiper of switch deck 1410 through the three position sensitivity switch deck 1430, which is controlled by a second rotary switch 1421. The switch deck 1430 has three resistance arms including resistors 1440, 1445 and 1450. The magnitude of a sample potential, as it is applied to the primary of transformer 1460, is determined by the position of the switch 1421 (switch deck 1430). In a manner similar to the connection of transformer 1460, the primary of transformer 1461 connects to switch decks 1412 and 1413 in the function - calibration - electrode configuration circuit 223 through a sensitivity switch deck 1431 having resistor arms 1441, 1446 and 1451; the primary of transformer 1462 connects to switch decks 1414 and 1415 through a sensitivity switch deck 1432 having resistor arms 1442, 1447 and 1452; and the primary of transformer 1463 connects to switching decks 1416 and 1417 in the circuit 223 through switch deck 1433 having resistor arms 1443, 1448 and 1453.

In the function-calibration-electrode configuration circuit 223, the electrodes 330–332 are multipled to various of the isolation transformers 1460–1463 in order to sample the serially established constant current fields to provide sampled potentials correlatable with the resistivity measurements desired in the exemplary embodiment of the present invention. To effect this design, pickup electrode 330 is connected directly to switch position 1 on switch sections 1410 and 1412, pickup electrode 331 is connected directly to position 1 on switch sections 1411, 1413, 1414 and 1416, and remote pickup electrode 332 is connected directly to positions 1 on switch decks 1415 and 1417. It is apparent to anyone familiar with the electrical logging industry that this particular multipling is only one combination of which there are many. If other types of resistivity curves are desired, additional pickup electrodes might be supplied or various other combinations might be employed. In any event, one of the functions of the function-calibration-electrode configuration circuit 223 is to multiple the electrodes to provide the desired resistivity combinations. In the present exemplary embodiment, the curves obtained are the 16″ and 64″ normal and the 10′ and 18′8″ lateral curves, all as recommended by the A.P.I.

The function-calibration-electrode configuration circuit 223 also contains the inter-connections associated with the calibrate operation. This part of the circuit 223 finds positions 2 and 3 on switch decks 1410, 1412, 1414, 1416 and 1530–1533 joined by resistors 1480, 1481, 1482, 1483, 1545, 1546, 1547 and 1548, respectively, and positions 2 and 3 on switch decks 1411, 1413, 1415 and 1417 directly connected. Respective positions 2 on switch decks 1530–1533 are connected by respective leads 1507, 1514, 1519, and 1524 through respective resistors 1485–1488 to respective positions 2 on respective switch decks 1410, 1412, 1414, and 1416. All positions 3 are connected to sheath ground (SHG). The purpose of this calibration part of circuit 223 will be explained in connection with a description of the calibration procedure and the control of rotary switches 1401 and 1421 incident thereto.

The sensitivity switch decks 1430 through 1433 are controlled by the rotary switch 1421 operated over lead 1343 and are set for a particular sensitivity prior to the operation in a borehole of the logging tool 301. The purpose of reducing the incoming sampled potentials through selected variously-valued series resistors, is to reduce the amplitudes of the incoming signals so that the dynamic range of amplifier 241 is great enough to handle all sample potentials; otherwise, a separate amplifier would have to be provided for each sampled potential, resulting in a substantial increase in subsurface electronic components. For the present, it is sufficient to assume the wipers of switch decks 1430 through 1434 are in position 1. After the overall operation of the circuit is explained, the method by which these switch decks are rotated by surface manipulations and the positions identified will be more fully explained.

When current flows through fixed segment 1 on current deck 214 to current electrode 321, the difference in potential between electrodes 330 and 331, as a measure of the established field, is transferred to fixed segment 1 on signal deck 212 (via transformer 1460). The wiper 217, associated with the signal deck 212, transfers this sampled potential, which represents a "long lateral" sample, to the primary of transformer 1350 of amplifier 242. As the commutator 210 continues to rotate counterclockwise and the constant current is placed on fixed segment 3, associated with current deck 214, thereby completing a current path between current electrode 324 and ground, the field is sampled between electrode 331 and sheath ground (electrode 332) and transferred to fixed segment 3 on the signal deck 212 where it is picked up by wiper 217 and fed to the primary of transformer 1350 as a "short normal" sample. Further rotation of the commutator 210 commutates current through fixed segment 5 on current deck 214 to current electrode 323. The field established thereby is sampled between electrode 331 and remote pickup electrode 332 and placed on fixed segment 5 of signal deck 212. It is there commutated by the wiper 217 to the primary of transformer 1350 as a "long normal" sample. The continued rotation of commutator 210, in a similar manner, commutates current through fixed segment 7 on current deck 214 to current electrode 322. This field, sampled between pickup electrodes 330 and 331 and taken off of fixed segment 7 of signal deck 212 by wiper 217 is placed across the primary of transformer 1350 as a "short lateral" sample.

Briefly then, current is commutated serially over fixed segments 1, 3, 5 and 7 of current deck 214 to current electrodes 321, 324, 323 and 322 in that order. The potential fields established by current flowing between these current electrodes and a remote sheath electrode 320, are serially sampled by signal deck 212, at fixed segments 1, 3, 5 and 7 of the signal deck, and on a time-sharing basis fed to the input of amplifier 242 of signal shaping circuit 240 to provide individual units of information for the long lateral, short normal, long normal and short lateral curves, respectively.

The 400 c.p.s. wave signals, representing the information for the resistivity logs translated along first, second, third, and fourth signal channels, are applied on a time-sharing basis to the common signal amplifier 242 by way of the primary of an input transformer 1350. An interference or arc suppression capacitor 1351 shunts the primary of the input transformer 1350. By use of this capacitor 1351 and the shorting bars 2, 4, 6 and 8 of signal deck 212, which are connected to the low side of the transformer 1350—substantially nothing but bursts of 400 c.p.s. signals are impressed upon the amplifier 242.

The subsurface signal amplifier 242 is essentially a two-stage device including vacuum tubes 1352 and 1353 fed from a transformer input. The high side of the secondary transformer 1350 is coupled to the control grid of pentode 1352 while the low side is connected to the B− lead 1320 and to the cathode of tube 1352 through resistor 1354. The cathode is connected through resistor 1353 to the high side of the primary of output transformer 1365. The plate of tube 1353 is also directly connected to the high side of the primary of transformer 1365, whereas the plate of tube 1352 is coupled to the low side of transformer 1365 through load resistor 1355 (where B+ is provided over lead 1339). The plate of the first stage tube 1352 is coupled to the grid of tube 1353 through capacitor 1358. The screen grid of tube 1352 is connected through resistor 1356 to the low side of transformer 1365 and through capacitor 1357 to amplifier ground. Tube 1353 has a grid leak resistor 1359 and a cathode resistor 1360, both connected to amplifier ground.

The four A.C. signals are serially applied to the control grid of tube 1352 and amplified and transferred to tube 1353 through the coupling capacitor 1358. The output of the amplifier 242 is fed to the input winding of transformer 1365 in rectifier unit 241. Capacitor 1366 shunts this input winding to compensate for any phase shift in the amplifier 242. The rectifier 241 which converts the bursts of 400 c.p.s. signal into direct current pulses comprises the driving relay 1331, energized as previously explained over leads 1330 and 1332, and its contacts 1 and 2. The secondary of transformer 1365 is center-tapped, which tap is connected to the front contact 4 of relay 1327 and thence to signal conductor 2. The terminals of the secondary side of transformer 1365 are connected to the contacts 1 and 2 of the relay 1331. The wiper or armature thereof is connected through front contact 2 of relay 1327 to signal conductor 3. The armature of rectifier 241 is driven by coil 1331, which, it will be remembered, is energized by 400 c.p.s. power, at a rate synchronous therewith. The synchronous rectifier serves to rectify the 400 c.p.s signal waves into direct current pulses which are applied through contacts 2 and 4 on the relay 1327 to the signal conductors 2 and 3. The direct current pulses are transmitted as the information-representing signals from which four resistivity logs are obtained at the surface.

*Control pulse sampling*

In the periods between the transmission of sample potentials to the surface, the series of control or "sync" pulses are transmitted to the surface apparatus on a circuit phantomed between signal conductors 2 and 3 and sheath ground. It will be remembered that B+ is placed on fixed segments 2, 4 and 8 of pulse deck 213 and B− on fixed segment 6. With these voltages present, as the wiper 216 of pulse deck 213 rotates in phase with wipers 215 and 217 of the current and signal decks 214 and 212, a series of three positive pulses and one negative pulse is obtained. This series of pulses is transmitted over lead 1321 intermediate the times during which sampled potentials flow through the signal conductors, and thus raises no problem of crosstalk and other interference problems.

The synchronous placement of one control pulse between each two sample potentials is easily acccomplished by picking the control pulses off of fixed segments of pulse deck 213, the counterparts of which on the signal deck 212 are grounded. Then too, the fixed segments of pulse deck 213 are short, and therefore, provide sharp control spikes which are adequate for triggering the surface commutator 122 to synchronize each sample potential with its recording means.

The series of control pulses are transmitted to the surface on the phantom pair in a circuit which may be traced from the wiper 216 of pulse deck 213, over lead 1321, through choke 1324, over lead 1325 to the tap of resistor 1326, which is connected between signal conductors 2 and 3 intermediate the subsurface switching circuit 230 and signal shaping circuit 240. The tap is adjusted for the balanced condition necessary for proper phantoming. Control pulse lead 1321 is bridged to ground by the parallel R-C circuit including resistor 1322 and capacitor 1323. This R-C circuit and inductor 1324 form a filter which prevents modulation of the control pulses at the pulse deck by the 400 c.p.s generator crosstalk present on conductors 2 and 3.

The rectifier 241 is operated synchronously with the 400 c.p.s. current flowing in conductor 1, and to attain maximum utilization of the available signal, the phase relationship of the driving current may be suitably adjusted by the phase-shifting network including capacitor 1328 and resistor 1329. Thus, the vibrating armature of the converter may be caused to open and close with the opposed contacts 1 and 2 at times such as to recover a maximum of signal energy with a minimum of current break at the contacts. The small 400 c.p.s. harmonics, superimposed upon the D.C. pulses, may be removed by a filter at the surface.

*NP sampling*

As noted previously, the current conductor 1 is connected over lead 1307 to NP filter 221. This provides a path over conductor 1 for the NP potential between NP electrode 325 and surface ground (SG). Surface ground is a direct earth ground at the surface and not internally connected to sheath ground (SHG). Furthermore, different symbols are used for the two grounds, and sheath ground is meant unless otherwise indicated. The potential flows through NP filter 221 which is a T-filter section including serially connected inductors 1540 and 1541 shunted to ground through capacitor 1542 connected to their junction. From filter 221, the NP potential is carried over lead 1307 to conductor 1 for transmission to the surface. Since the NP potential is a slowly varying D.C. voltage, (0–2 c.p.s. range), it is not lost in the A.C. signal on conductor 1 and can, therefore, be separated by the surface equipment, as will be explained below.

*Rotary switch circuits*

The rotary switches 1401 and 1421, the former in the function-calibration-electrode configuration circuit 223 and the latter in the sensitivity circuit 224, are controlled over lead 1343 which is connected to back contact 1 of relay 1327 in the subsurface switching circuit 230. Lead 1343 is connected to one side of the winding of each rotary stepping switch 1401 and 1421 through respective, oppositely poled, diodes 1402 and 1403. The other sides of the rotary stepping switch coils are connected to sheath ground. A position determining circuit cooperates with the stepping circuit and is monitored from the surface apparatus over back contact 3 of relay 1327 and lead 1342. The circuit includes switch deck 1418 of switch 1401 and switch deck 1434 of switch 1421. Corresponding positions on the two switch decks are connected together while the wiper of deck 1418 is connected through a diode 1472 to lead 1342. Lead 1342 is also connected to the wiper on deck 1434 through a diode 1471. Positions 1, 2 and 3 on switch deck 1434 are commoned to lead 1343 through respective resistors 1444, 1449 and 1454.

The operation of these circuits is as follows: When a negative source of potential from the surface appears on lead 1343, a circuit is completed for rotary switch 1401 only because diode 1403, which is in series with the coil of rotary switch 1421, is poled to act as an open circuit, while diode 1402, in series with the coil of rotary switch 1401, acts as a short circuit. Contrariwise, when a positive source of potential from the surface appears on lead 1343, rotary switch 1421 is caused to step, due to low resistance of diode 1403, and switch 1401 does not step due to the high back impedance of diode 1402.

The continued application of positive or negative voltage on lead 1343 causes the rotary switch responsive to that particular polarity to continue to step. In the case of both stepping switches, any one position of switch decks 1418 and 1434 (1, 2 or 3) is identified by the presence of its associated resistor (1444, 1449 or 1454) which is bridged across the leads 1342 and 1343. The value of current flow through one of the three differently valued resistors is employed to identify at the surface the instant step position of the function switch 223 or the sensitivity switch 224. The polarity of the switching current determines the relative resistance of diodes 1472 and 1471 and thereby identifies which of the rotary switches 1401 or 1421 is involved in a particular position identification.

The actual operation of these circuits will be considered, infra in connection with the explanation of the calibration circuit.

SURFACE SIGNAL APPARATUS

The sampled potentials relating to the resistivity of subsurface lithology are transmitted to the surface over conductors 2 and 3 where they are further processed by surface signal apparatus, while the three positive and one negative control pulses are phantomed over conductors 2–3 and sheath ground. These control or "sync" pulses are further refined and used by the surface control pulse apparatus to synchronize the sampling of the subsurface strata with a closed path to the individual signal channel chosen for registration of each resistivity curve. The remaining information relating to the subsurface strata, i.e., NP samples, are transmitted continuously over current conductor 1 for processing through an NP filter 165 and registration on a galvanometer 166 associated therewith.

Natural potential sample

Figure 8:
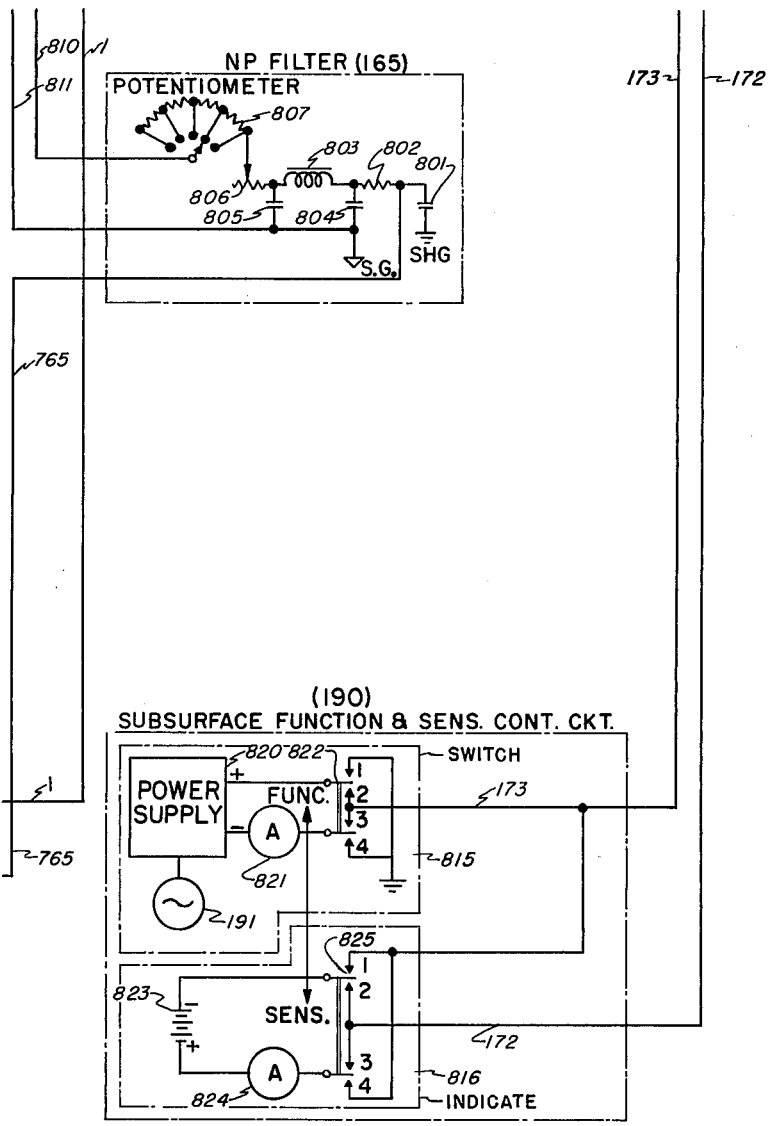

The continuous signal developed between the non-commutated electrode 325 and the surface ground (SG) is placed on current conductor 1 for transmission to the surface apparatus, as was set forth in the description of the subsurface apparatus. When the signal reaches the surface apparatus, it may be traced over current conductor 1 (and through the coil of synchronous driving relay 910), through the coil of ammeter 766 in the constant current generator 100 and a secondary winding of transformer 762 and adjustable resistor 767, and over lead 765 to NP filter 165 (FIG. 8).

Lead 765 is connected to the capacitive input A.C. filter which includes a capacitor 801 connected between lead 765 and sheath ground and serially connected elements including resistor 802, an inductor 803, a variable resistor 806, sensitivity potentiometer 807, and galvanometer 166. The other side of the galvanometer is connected to surface ground (SG) as are capacitors 804 and 805, which are connected to the input and output sides of inductor 803, respectively.

The NP signal passes through the filter 165, where A.C. components are eliminated, to the recording galvanometer 166 associated with recorder 155. The potentiometer 807 is used to select an operating sensitivity for NP curves just as the sensitivity circuit 224 (FIG. 14) selected a sensitivity level for the other four sample potentials. Variable resistor 806 is used for calibration purposes as will be more fully explained in the section on Preparation and Calibration, infra.

Signal converting section

Figure 9:
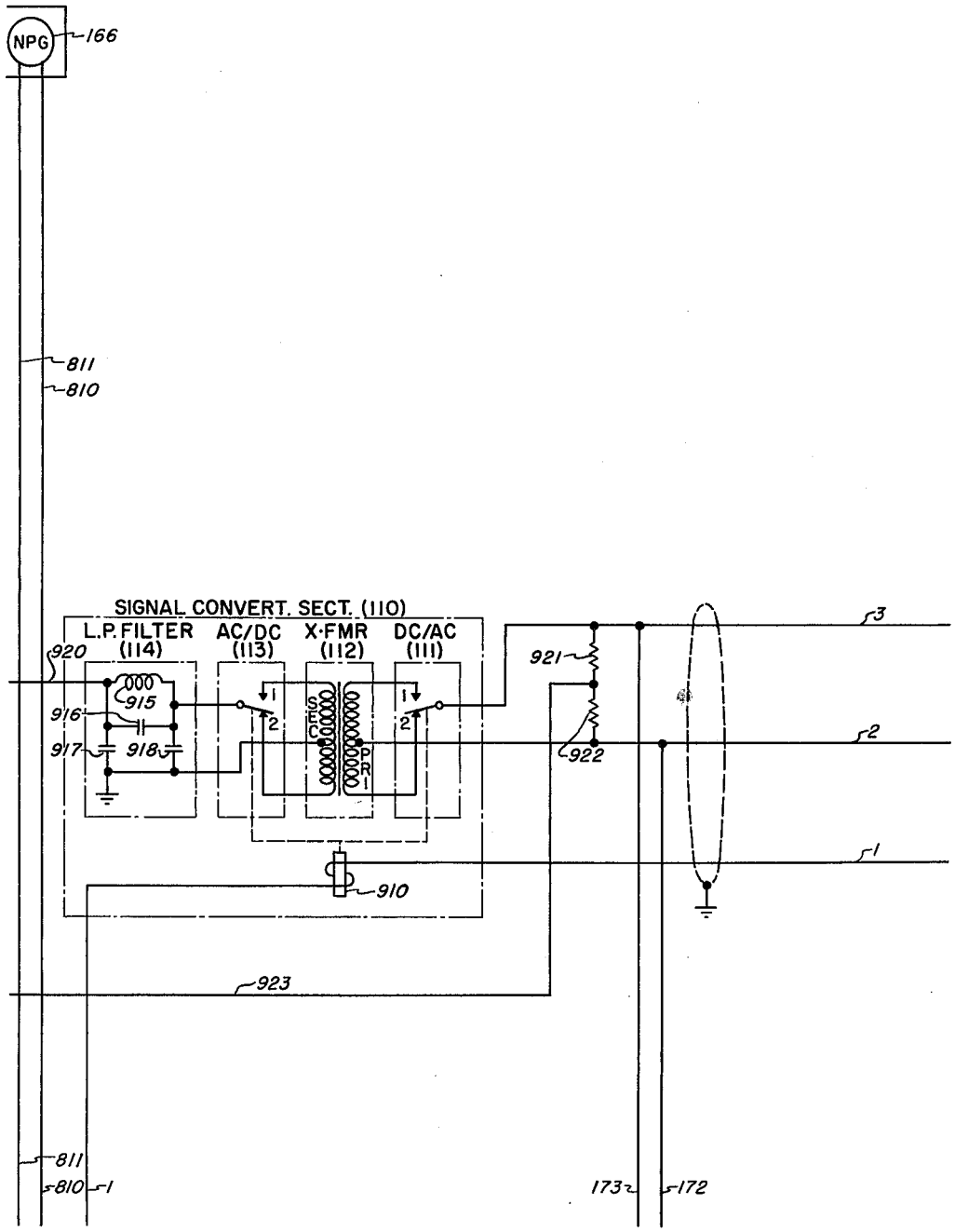

The upcoming resistivity information signal pulses on cable conductors 2 and 3 are transferred through the slip rings 306 to the surface apparatus as previously explained. These groups of four D.C. pulses, one for each of the desired resistivity curves, are connected to the input of the signal converter section 110 (FIG. 9). Signal conductor 3 is connected to the swinger of a transfer contact which forms part of the synchronous D.C. to A.C. chopper 111 whereas signal conductor 2 is affixed to the centertap of the primary of transformer 112. The swinger of chopper 111 is operated and released by the action of its driving coil 910 which operates in synchronism with the frequency of the constant current source 100 as applied to conductor 1. Hence, the D.C. pulses between conductors 2 and 3 are alternately placed on the high and low sides of the primary of transformer 112 through contacts 1 and 2 associated with the swinger of chopper 111. This has the effect of chopping each of the incoming D.C. signal pulses into many D.C. pulses of much briefer duration which are applied alternately to the two terminals of the primary of transformer 112 between the terminals and center-tap.

The principal output of the secondary of transformer 112, therefore, is bursts of 400 c.p.s. alternating current of approximately square wave form; one burst for each D.C. input pulse and of a comparable amplitude. The small magnitude harmonics of the frequency of the constant current source which were transmitted with and superimposed on the D.C. signal pulses in the subsurface apparatus, are also chopped by the chopper 111 and appear at the secondary of transformer 112.

The output terminals of transformer 112 are connected to contacts 1 and 2 in rectifier section 113, which contacts cooperate with a swinger driven by the same coil 910 that operated the contacts associated with chopper 111. The rectified output is taken off the vibrating swinger of rectifier 113 and the mid-point of the secondary winding of transformer 112, which is connected to sheath ground. Since the D.C. chopping (by chopper 111) and rectification (by rectifier 113) are performed synchronously, the output of rectifier 113 for each time sharing resistivity pulse is a combination of a series of D.C. pulse signals with bursts of extraneous harmonics of A.C. waves superimposed thereon.

Since the desired signal outputs, i.e., a D.C. pulse for each sampled potential, are of much greater amplitude than the extraneous unwanted A.C. components, the latter are readily separated from the D.C. signals by conventional filter means 114. Low pass filter 114 includes a parallel L-C pad including inductor 915 and capacitor 916, shunted to ground through capacitors 917 and 918.

This reconstitution of the upcoming D.C. sample potentials, by synchronous chopping and re-rectification, and filtering, provides a highly efficient and yet simple means for eliminating unwanted A.C. components from the signal. Since the desired part of the output of rectifier 113 is in the form of discrete D.C. pulses and all of the undesired part is A.C., the latter is readily eliminated by the described filter 114.

*Gating section*

The ouput from the signal convertor section 110 is placed on lead 920 which is commoned to the gates in selective gating circuit 121 of the gating section 120. As noted above, the filtered output signal for each full cycle of the subsurface commutator 210 comprises four reconstituted D.C. pulses, one for each of the resistivity information channels. Hence, the signal appearing on lead 920 is in the form of repetitive groups of four time-separated D.C. pulses per group or full commutator revolution. The first, second, third and fourth pulses of each group are switched or routed into respective individual resistivity signal channels by relays 1201, 1202, 1203 and 1204, respectively (gating section 120), for utilization in producing the aforementioned short lateral, long lateral, short normal and long normal resistivity curves or logs, respectively.

The control relays 1201–1204, in selective gating circuit 121, are operated serially for preselected periods of time in synchronism with the subsurface commutator 210 so as to apply the four sample potentials, obtained during one complete revolution of the commutator 210, to leads 1205, 1206, 1207 and 1208, which are respectively associated with galvanometers 159, 158, 157 and 156. This synchronism is obtained, as was functionally described in the General Description section, by the interaction of the control pulses generated by pulse deck 213 in subsurface commutator 210 and the pulse forming network 123, the surface commutator 122 and selective gating circuit 121. The detailed description of this synchronism process as well as the means employed to hold each gate open for a preselected period of time will be set forth after the time-sharing signals appearing across signal conductors 2 and 3 are followed to their respective galvanometers. It is sufficient here to presume that relays 1201–1204 serially and synchronously operate to complete circuits from common signal conductor 920 to the pulse stretching networks 150, 145, 140 or 135 to which a sample potential is assigned.

The D.C. pulses on lead 920 are applied in parallel to front contacts 1 on relays 1201–1204, whereas leads 1205–1208 are connected to their respective swingers. Thus, as the relays 1201–1204 are synchronously operated, the four D.C. pulses, one representing each desired resistivity curve, are fed to the leads 1205–1208 in that order. The circuit from lead 920 to contact 1 of relay 1201 may be traced through variable resistors 1210 and 1211 and back contact 1 of calibrate relay 1209. Similarly, lead 920 connects to contact 1 of relay 1202 through variable resistors 1213 and 1214 and back contact 3 of relay 1209; to contact 1 of relay 1203 through variable resistors 1215 and 1216 and back contact 5 of relay 1209; and to contact 1 of relay 1204 through variable resistors 1217 and 1218 and back contact 7 of relay 1209. Relay 1209 is only operated during calibration and its function will be explained in that connection along with the uses for variable resistors 1210, 1213, 1215, and 1217. Resistors 1211, 1214, 1216 and 1218 are sensitivity adjustment pots and will be explained in conjunction with their associated pulse stretching networks, for the sake of logic.

*Pulse stretching networks*

The pulse stretching networks, 135, 140, 145 and 150 are replicas of each other, except as to component values, hence a complete explanation of one of them will explain the others. It is proposed to take pulse stretching network 150, which is associated with lead 1205, as an example and thereafter briefly allude to the others.

When the sampled potential corresponding to the 10' short lateral curve is gated to lead 1205 for a preselected and constant period of time, it is fed into the integrator circuit 151 of pulse stretching network 150. The signal is there integrated and supplied to the grid of tube 1005 of the two stage amplifier 152 from where it is caused to traverse output circuit 153 to galvanometer 159.

The potentials sampled by the pickup electrode configurations differ widely in amplitudes and are accordingly subjected to different degrees of attenuation in sensitivity circuit 224 of the subsurface instrument before presentation to the single amplifying means 242 in the signal shaping circuit 240. The object was, as noted above, to provide input signals which fell within a reasonable dynamic range so that a single amplifier 242 could be employed. The degree of attenuation of signals in any one of the four channels is preselected; i.e., there is a fixed relationship between the potential as sampled and the potential as transmitted to the surface apparatus. These fixed relations are characterized as 10, 20, 30, etc. ohmmeter sensitivity scales, for example.

In the surface apparatus, the variable series resistors (1211, 1214, 1216 or 1218) associated with the gating channels of relays 1201–1204, respectively, are adjustable to obtain sensitivity ratings intermediate those available in the sensitivity circuit 224. An operator may manually adjust the pots 1211, 1214, 1216 and 1218, for example, to obtain a sensitivity setting of 15 or 25 ohmmeters. Since the samples corresponding to the different resisitivty logs have been unequally attenuated, they are restored by variation in amplifying factors of the amplifiers 137, 142, 147 and 152. Alternatively, they may be restored by proper assignment of values to the transverse scalar divisions on the recording mediums in the respective galvanometer-recorder means.

The pulse restoration and stretching networks not only can restore the resistivity signals to their original relative amplitudes but also extend the time duration of each gated signal. Since the signal passing through contact 1 of gating relay 1201 is of a brief, though fixed, duration as compared with the total period of one signaling cycle, i.e., time during which all of the current fields are sampled once, it must extend or hold the effect of the signal so that it may register on its associated recorder means for a period equal to the duration of one complete signaling cycle. This is accomplished in the pulse stretching network 150.

The integrator circuit 151 includes resistor 1007 and the R-C parallel combination of resistor 1008 and capacitor 1009 connected between the grid of input tube 1005 and sheath ground. The cathode of tube 1006, which forms the second stage of amplifier 152, is connected to the cathode of tube 1005 and their common point is connected to seath ground through resistor 1010. The plates of tubes 1005 and 1006 are connected through respective load resistors 1011 and 1012 to B+ voltage on lead 1101. The output circuit 153 is taken off from the plates of tubes 1005 and 1006. The circuit 153 includes an R-C filter comprising resistor 1013 and capacitor 1014, oppositely poled diodes 1015 and 1016 bridging the output leads, and dropping resistor 1017. The output of output circuit 153 is connected to the galvanometer 159 in recorder 155, which is of a conventional construction.

The integrator circuit 151 is connected to the input of the modified "push-pull" amplifier comprising tubes 1005 and 1006. This circuitry permits push-pull operation without the usual complexity of a push-pull circuit. The circuit choice additionally doubles the dynamic range of the amplifier. It should be pointed out that the amplifier 152 is a D.C. amplifier and only positive pulses are applied to the input. The signal stretching part of the network 150 is the R-C integrator circuit including capacitor 1008 and resistor 1009. The values are chosen to maintain a signal of substantially undiminished intensity during the period intervening between termination of one incoming signal sample and the next one. For example, a time constant of ten seconds, when the complete signaling cycle is 1/30 second long, is more than adequate. When a sample potential is gated over contact 1 of relay 1201 to integrator circuit 151, the grid of tube 1005 is placed at a potential substantially corresponding to that of the signal pulse. It is maintained there by the R-C pulse stretching network until the appearance of the next sample potential gated to network 150. When the next sample potential arrives at lead 1205, the grid and R-C circuit potential level is reset, being raised if the signal intensity has increased and reduced if the signal stength has decreased.

As a result of the admission of the D.-C. pulse sample potential for a preselected period of time, there is produced at the output of amplifier 152 a continuous signal, the intensity of which is reset once each signaling cycle. This continuous signal, developed as a potential difference between the plates of tube 1005 and 1006, is utilized by conventional galvanometer-recorder means 159 to produce a continuous graph or log of the discrete information samples secured by the resistivity information channel associated therewith. The graph or log is produced in a known manner to show the resistivity measurement values relative to the position or depth in the borehole at which the sample potentials were obtained.

The output circuit 153 is basically a protection circuit for the galvanometer. Due to the fact that most galvanometers, if they are driven beyond full scale deflection appreciably will not return to zero, a current drain network must be used to prevent overexcursions. In the present more or less conventional circuit, resistor 1013 is chosen to limit the current through the galvanometer coil while capacitor 1014 acts to damp violent changes in current flow, i.e., to desensitize the galvanometer to sudden current changes. Diodes 1015 and 1016 are shunted across the galvanometer input to drain current in excess of a predetermined amount, whether positive or negative. For example, in the present embodiment, when the current flowing through resistor 1017 tends to exceed 30 microamps, the diodes conduct thereby diverting the current. As noted, this is a conventional type of galvanometer protection circuit.

The controlled operation of gating relays 1202, 1203, and 1204 in a serial fashion, after operation of relay 1201, places the sample potentials representing the 18'8" long lateral, the 16" short normal, and the 64" long normal on respective leads 1206–1208. These signal pulses cooperate with their respective pulse stretching networks 145, 140, and 135 in a manner similar to that of the 10' short lateral sample potential and network 150, which have been explained in detail.

The integrator circuits 146, 141 and 136 of these other networks 145, 140 and 135 include resistors 1027, 1147, and 1167 corresponding to 1007; capacitors 1028, 1148 and 1168 corresponding to 1008; and resistors 1029, 1149 and 1169 corresponding to 1009, respectively. The amplifiers 147, 142 and 137 of these networks include cathode resistors 1030, 1150 and 1170 corresponding to 1010; tubes 1025–1026, 1145–1146 and 1165–1166 corresponding to 1005–1006; end plate resistors 1031–1032, 1151–1152 and 1171–1172 corresponding to 1011–1012, respectively. And the output circuits 148, 143 and 138 of these networks include resistors 1033, 1153 and 1173 corresponding to 1013; capacitors 1034, 1154 and 1174 corresponding to 1014; oppositely poled diodes 1035–1036, 1155–1156 and 1175–1176 corresponding to 1015–1016; and dropping resistors 1037, 1157 and 1177 corresponding to 1017, respectively. The corresponding components in the pulse stretching networks cooperate in each network to function in a manner similar to that previously explained in detail.

SURFACE CONTROL PULSE APPARATUS

It was previously explained that the series or group of time-sharing pulses which constituted one sample cycle were gated by relays 1201–1204 from lead 920 to their respective pulse stretching networks and associated galvanometers. At that time, rather than interrupt the continuity of the signal utilization circuits, it was assumed that relays 1201–1204 operated serially in synchronism with the establishment of the current fields by subsurface commutator 210 to connect lead 920 to the pulse stretching networks, in turn, for a preselected period of time. It is now necessary to consider in detail the means by which relays 1201–1204 are caused to serially operate for preselected periods of time in synchronism with the sampling of the established fields.

Remembering the broad description of this, which was set forth in the General Description section, it will be recalled that the control pulses, three positive and one negative, were taken off a phantom circuit including signal conductors 2 and 3 and connected to the gating section 120 including a pulse forming network 123, a commutator 122 and a selective gating circuit 121, the latter circuit including the gating relays 1201–1204. The pulse forming network 123 reshapes the wave fronts of the control pulses so that they will properly trigger the ring translator 122 which, in turn, controls individual sections in the selective gating circuit 121. The individual sections in the latter circuit in turn control relays 1201–1204.

*Pulse forming network*

The D.C. control pulses are extracted at the surface apparatus between serially connected resistors 921–922, which bridge signal conductors 2 and 3, and sheath ground (FIG. 9). Lead 923 connected to the junction of the resistors 921–922 places the control pulse signals, in repetitive groups of three positive pulses and one negative pulse, across resistor 1050 at the input of the pulse forming network 923. The control signals are sampled at resistor 1050 and fed to a twin-T filter network to remove 400 c.p.s. "cross-talk" and then to other filter elements for removal of extraneous A.C. potentials. The twin-T net comprises capacitors 1051, 1052 and 1053 and resistors 1054, 1055 and 1056 and the remaining filter elements comprise resistors 1057 and 1058 and capacitors 1061 and 1062.

Figure 10:
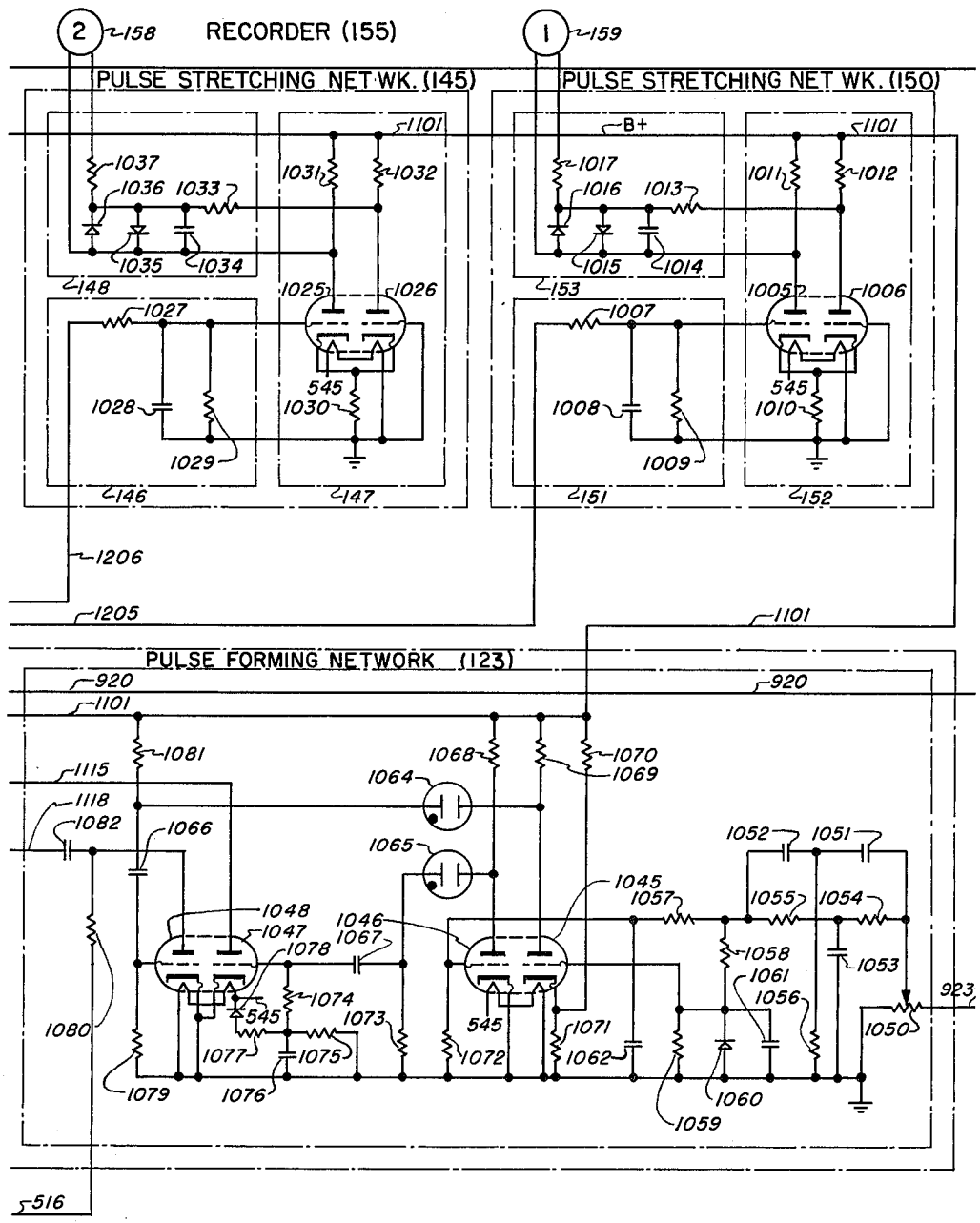
Figure 11:
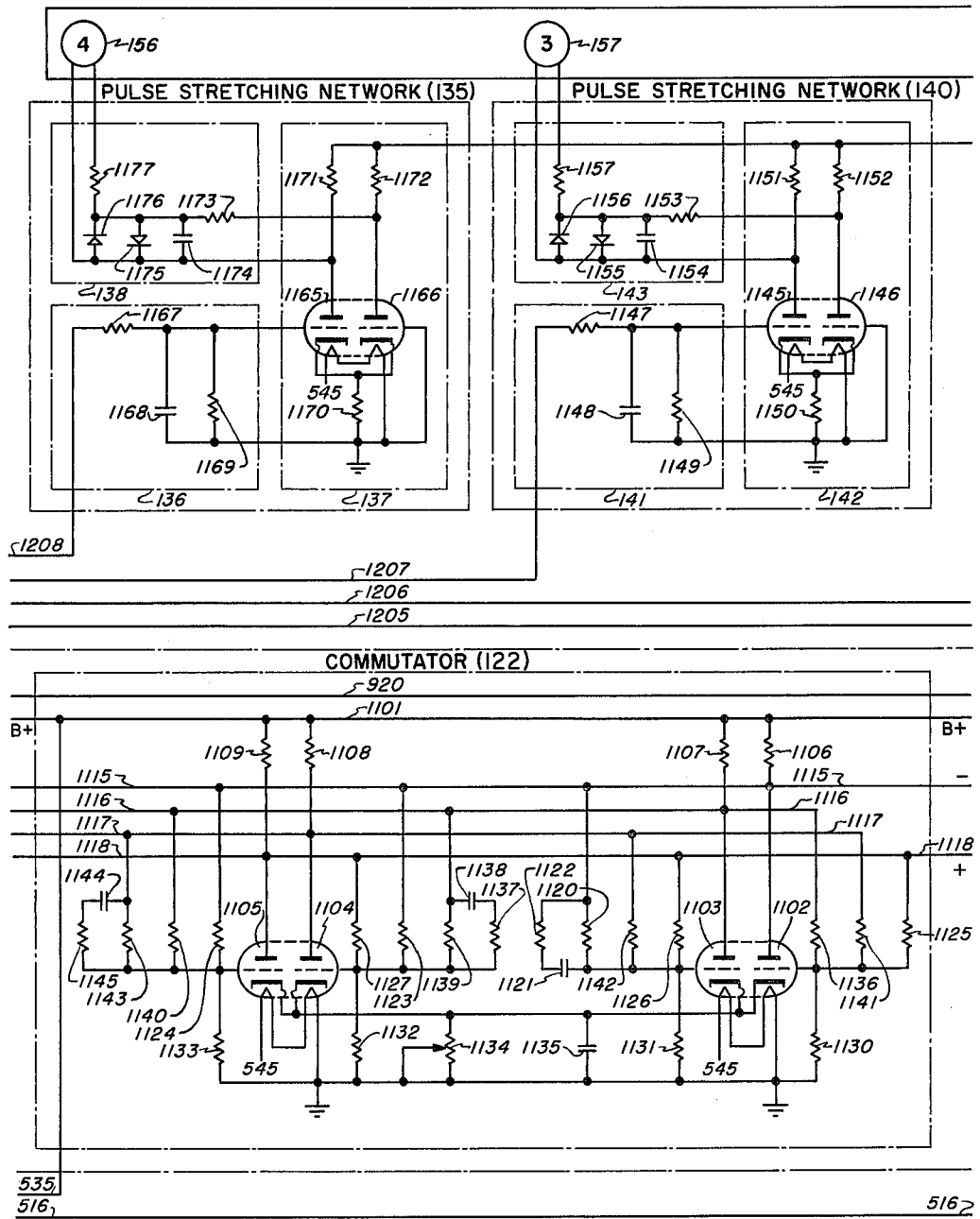

As can be seen most clearly in FIG. 10, serially connected capacitors 1051–1052 are paralleled with serially connected resistors 1054–1055 and one termial thereof is connected to the wiper of input voltage divider 1050 while the other is connected through resistor 1057 to the grid of vacuum tube 1046. Resistor 1056 is connected between the junction of capacitors 1051–1052 and ground, and capacitor 1053 is connected between the junction of resistors 1054–1055 and ground. Serially connected components, resistor 1058—capacitor 1061, are connected between the junction of resistors 1052–1057 and ground while capacitor 1062 shunts the grid of tube 1046 to ground. The pulse forming network includes amplifying vacuum tubes 1045 and 1046 and gas tubes 1064 and 1065 connected plate to plate to their respective tubes 1045 and 1046. The cathodes of gas tubes 1064 and 1065 are connected through respective coupling capacitors 1066 and 1067 to the respective grids of amplifying and phase inverting vacuum tubes 1048 and 1047. The control signals appear at the input of the pulse forming network 123 as shown in wave form 195 (FIG. 1). The distortion from the originally created square wave form is due to transmission through and from the subsurface apparatus to the network 123. The pulse forming network employs novel means to separate the positive-going pulses and the negative-going pulses and create new pulses therefor, which new pulses have extremely sharp wave fronts. The control pulses of both polarities appear between the junction of resistors 1057–1058 and ground and are separated to activate tubes 1045 and 1046. The rectifier 1060, which shunts grid leak resistor 1059 of tube 1045, is poled so that it shorts out or eliminates any negative-going pulses from the input circuit of the positive-pulse amplifier tube 1045.

B+ voltage is supplied over lead 1101 to the plates of tubes 1046 and 1047 and to the plate and cathode of tube 1045 through respective resistors 1068, 1106, 1069, and 1070, whereas B+ of a different value is supplied over lead 516 to plate resistor 1080 of tube 1048. Both leads 516 and 1101 (a continuation of lead 535) are obtained from regulated power supply 180. The cathodes of tubes 1046, 1047 and 1048 are connected directly to sheath ground whereas tube 1045 employs a cathode resistor 1071. The grids of tubes 1046, 1047 and 1048 are connected to ground through respective resistors 1072, serially connected resistors 1074–1075, and 1079. Resistors 1073 and 1081 connect the cathodes of gas tubes 1065 and 1064, respectively, to ground and B+ potential, respectively. The output of tube 1047 appears on negative pulse lead 1115, and the output of tube 1048 through capacitor 1082 appears on positive pulse lead 1118, which leads cooperate with the commutator 122 to cause it to synchronously re-cycle. And finally, the filaments of tubes 1045–1046 and 1047–1048 obtain current over lead 545 from regulated power supply 180. The grid of tube 1047 is connected to lead 545 through resistors 1074 and 1077 and diode 1078, while the circuit including resistor 1075 and capacitor 1076 isolates this bias source from cathode potential. Tube 1045 is biased close to cut-off (non-conducting state) by the proper selection of components including resistors 1070 and 1071. As a result, any negative pulse appearing at the grid of the tube will have little effect on the output, whereas positive pulses will be effective to cause increasing conduction through it. On the other hand, amplifier tube 1046 has its input circuit connected to the control pulse source through resistor 1057, and the tube is normally operating at zero bias, i.e., it normally acts as a short circuit. When positive control pulses appear at the grid of tube 1046, they produce negative output pulses, which cannot pass diode 1065. However, the arrival of the negative-going control pulse drives the tube to cut-off for a brief interval. In consequence of the circuitry and connections described above, arrival of each group of four control pulses (3 pos., 1 neg.) initiates a cycle of events and sequential control operations which repeats each time another group appears. For convenience in describing those events and operations and the apparatus involved, the control pulses will be numbered in the order of their creation and arrival at the surface apparatus. Thus, control pulses numbered 1, 2 and 3 have positive polarity and pulse number 4 has negative polarity.

When control pulse 1 arrives at tube 1045, it reduces the normal bias and causes conduction through the tube. The resulting increasing voltage drop across plate resistor 1069 causes, at a certain I-R value, the breakdown and conduction through gas tube 1064, which in the exemplary embodiment is a neon bulb. The ignition of tube 1064 causes it to act as a short circuit to current flow and changes its status from a non-conducting one to a fully conducting state within an extremely short period of time, e.g., less than one microsecond. It is a characteristic of gas tubes that they create a sharp wave front in igniting and have sustaining voltages much less than their ignition voltages. By choosing the circuit elements judicially, a differential between ignition and sustaining voltage exceeding 30 volts is reasonable. The rapid decrease in voltage across gas tube 1064 when the tube ignites creates an extremely sharp negative-going output pulse. This pulse is translated through coupling capacitor 1066 to the input circuit of amplifier tube 1048 for amplification and phase inversion. At the output of 1048, across plate resistor 1080, there is produced a sharp rise in potential (corresponding to the ineverted I-R drop). When the trailing edge of the incoming positive pulse 1 drops below the sustaining voltage of gas tube 1064, the tube is extinguished and the circuit is returned to the normal quiescent condition. This sequence of events is repeated for each of the incoming positive control pulses with the result that a series of three time-spaced positive pulses having steep wave fronts are transferred through capacitor 1082 to lead 1118 associated with commutator 122.

The arrival of the negative-going sync or control pulse 4 from the subsurface apparatus initiates a somewhat similar sequence of circuit operations, but through a separate circuit, to produce a reformed sharp-front pulse for use with the three preceding plus pulses in controlling the commutator 122.

The incoming negative control pulse has no appreciable effect on 1045 since the tube is normally biased to or near cut-off. However, the pulse is applied to the input of amplifier tube 1046 through resistor 1057 and, since this tube is normally conducting, the presence of the negative pulse briefly decreases conduction. This decreases the I-R drop across plate resistor 1068 which in turn causes gas tube 1065 to break down. Current flows through tube 1065 and, in a manner similar to tube 1064, it produces a pulse having a steep wave front (across resistor 1073) although it is a positive pulse rather than a negative one. This pulse is translated through capacitor 1067 to the input of tube 1047 and, though the tube is normally biased to cut-off by the voltage derived through the rectifier-resistor net including resistors 1074, 1075 and 1077 and rectifier 1078, the positive pulse causes momentary conduction through 1047 thereby causing current to flow in plate resistor 1106 intermediate tube 1047 and B+ lead 1101. The phase inverter 1047 causes a negative pulse to appear on lead 1115, which pulse has a short wave front. In conjunction with the three positive pulses previously produced on lead 1118, this pulse controls a novel commutator or relay control circuit 122 which, in turn, controls the four gating relays 1201–1204.

*Surface commutator (relay control circuits)*

The surface commutator or gating relay control circuit 122 is composed of a plurality of vacuum tube triodes, equal in number to the number of control pulses, both positive and negative, and their associated circuitry.

The exemplary embodiment of the present relay control circuit 122 comprises four vacuum tubes 1102–1105 (FIG. 11), though the novel arrangement of the circuit lends itself to indefinite expansion as will be explained more fully after the basic circuit is considered. The biasing of the tubes and operation of the control circuit is such that only one of the four tubes 1102–1105 can be rendered conducting at any one time (except during periods of transition). Further, the operation is planned so that the tubes are caused to conduct sequentially: 1102 in response to the negative pulse of a group (pulse 4), 1103 in response to positive pulse 1, 1104 in response to positive pulse 2, and 1105 in response to positive pulse 3. Thus, looking at the circuit broadly, it operates as do most ring counting circuits. The expected sequence of registrations must occur or the proper switch in the modified ring will not be operated to identify what caused it to change its state. The negative pulse in the present circuit acts as a reset pulse to return the circuit to its first or reset condition by seizure of control from any one of tubes 1103–1105.

The circuit 122 is connected as follows: B+ is supplied to the tubes 1102–1105 from lead 1101 through respective plate resistors 1106–1109, respectively. Lead 1115, carrying the reshaped negative pulse of each group of pulses, is connected directly to the plate of tube 1102, to the grid of tube 1103 through a parallel R-RC net comprising resistor 1120 in parallel with serially connected resistor 1122 and capacitor 1121, to the grid of tube 1102 through resistor 1123, and to the grid of tube 1105 through resistor 1124. The reshaped positive trigger pulses are applied in timed succession to lead 1118 through coupling capacitor 1082. Lead 1118 is further connected to the grid of tube 1102 through resistor 1125, to the grid of tube 1103 through resistor 1126, to the grid of tube 1104 through resistor 1127, and directly to the plate of tube 1105. The grids of tubes 1102–1105 are connected to ground through respective grid-leak resistors 1130–1133, and the cathodes of the tubes are collectively connected to ground through an adjustable cathode bias resistor 1134, which is shunted by capacitor 1135 (to ground A.C. potentials).

Lead 1115 serves as an output signal lead for tube 1102, and lead 1118 serves as output signal lead for tube 1105. Similar output leads 1116 and 1117 are connected to the plates of tubes 1103 and 1104, respectively. Lead 1116 is also connected to the grids of tubes 1102, 1104 and 1105 through resistor 1136, parallel R-RC circuit including resistor 1139 in parallel with serially connected resistor 1137—capacitor 1138, and resistor 1140, respectively. Lead 1117 is connected to the plate of tube 1104 and to the grids of the remaining tubes, 1102, 1103 and 1105, through resistor 1141, resistor 1142, and parallel R-RC circuit including resistor 1143 in parallel with serially connected resistor 1145—capacitor 1144, respectively.

Leads 1115–1118 are connected to the circuits including respective gating relays 1201–1204 in selective gating circuit 121, and, as a result, when current flows sequentially through the plate resistors of the tubes 1102–1105 (whenever a particular tube conducts), the one relay of gating relays 1201–1204 which is associated with the instant conducting tube is caused to operate. This procedure synchronizes the operation of the gating relays with the subsurface commutator 210 as required by the original circuit requirements.

The arrangement of the circuit of commutator 122 is such that tubes 1103 through 1105 act as a non-recycling counter and tube 1102, in response to a different signal, i.e., the negative sync or control pulse, resets the circuit to its first or reset position. The combination of a common cathode load resistor for all tubes in the control circuit and the interconnection of the plate of each tube to the grids of the other tubes assumes that only one of the four tubes conducts between trigger pulses. The circuit is so arranged that the plate of the conducting tube maintains the grids of the other tubes sufficiently negative with respect to the common cathode to cause their continued non-conduction.

It should be appreciated that one of the four tubes will be operated whenever the B+ voltage (on lead 1101) and filament voltage, over lead 545, are applied to the circuit. Absent any control pulses on leads 1115 or 1118, when the commutator 122 is energized, one of the tubes will, at random, seize control of the circuit by conducting. Hence, when the negative control pulse first appears after the overall logging system is put into operation, means have to be provided to cause it to seize control of the commutator irrespective of which of the other three tubes may at that time be operated. Of course, if the random seizure of control is made by tube 1102, the first occurrence of a negative pulse will merely perpetuate the status quo.

After the commutator 122 has been put in operation, each negative sync pulse (on lead 1115) drives the grids of tubes 1103–1105 more negative with respect to their cathodes. This cuts off the conducting tube thereby permitting the reset tube 1102 to conduct due to the common cathode bias adjustment which requires that one and only one of the tubes conduct.

The appearance of the first positive pulse on lead 1118 increases the grid voltage on tubes 1102, 1103 and 1104 and causes them to attempt to conduct, but since the circuit values are chosen so that only one of the four tubes can be operated at one time, only one can conduct. If tube 1103 were not connected to the plate of the preceding conducting tube 1102 through the RC-R network including capacitor 1121, a random one of tubes 1102, 1103 and 1104 would operate upon the application of a positive pulse over lead 1118 or the tubes might all partially conduct. However, the effect of conducting tube 1102 on tube 1103, when a positive voltage is placed on lead 1118, is the key to guaranteeing that tube 1103 seizes control.

When the first positive pulse appears on lead 1118 and the grid voltages on tubes 1102, 1103 and 1104 are increased, the tubes "jockey" for control of the circuit. The cumulative effect is that each tube momentarily operates and, as a result, depresses the grid of tube 1102 and, in cooperation with the common cathode connection, cause tube 1102 to cut-off. As tube 1102 cuts-off, the positive signal produced on its plate is coupled through the RC-R network including capacitor 1121 to the grid of the next succeeding tube 1103, which has the effect of placing an additional source of positive voltage on the grid of tube 1103. Thus, tube 1103 has its grid voltage increased as a result of the positive pulse, as do tubes 1102 and 1104 and, additionally, as a result of the positive going plate of previously conducting tube 1102. The combined amplitude of these positive potentials on the grid of tube 1103 is not necessarily sufficient to cause tube 1103 to seize control from tubes 1102 and 1104. Therefore, tubes 1103 and 1104 continue to vie for control of the circuit during the time the positive pulse remains on lead 1118. However, when the positive control pulse is terminated, the positive voltage placed on the grid of tube 1103 from the previously conducting plate is maintained for a time because capacitor 1121 was charged during its initial application. The effect of all of this is that the voltage on the grid of tube 1103 is maintained more positive with respect to its cathode than are the other tubes after the positive trigger pulse has been extinguished on lead 1118.

Since tube 1103 has a subtsantially greater grid voltage, as a result of the continuel application of this positive potential, it seizes conduction from tubes 1102 and 1104, even though the others previously attempted to seize control (prior to the disappearance of positive pulse on lead 1118). Once the circuit stabilizes with tube 1103 conducting, tubes 1102, 1104 and 1105 are maintained extinguished due to the depressing effect of the negative plate potential of tube 1103 which is applied to their grids. It remains thus until the next positive pulse appears on lead 1118.

The second or next appearing positive pulse is placed on grids of tubes 1102, 1103 and 1104 and they momentarily conduct. The momentary conduction of tubes 1102 and 1104 depresses the grid voltage on conducting tube 1103 thereby causing it to cut off. As tube 1103 cuts off, the positive going potential on its plate is applied through grid capacitor 1138 to the grid of the next succeeding tube 1104. Capacitor 1138 is charged to maintain the more positive voltage on this grid beyond the time at which the positive pulse potential, as applied to non-conducting tubes 1102 and 1103, is interrupted. This assures that tube 1104 will seize control. As in the case of tube 1103, the grids of the tubes other than the one conducting are depressed by the negative potential on the plate of the conducting tube to assure their continued non-conduction.

And finally, when the third positive control pulse appears on lead 1118 with tube 1104 conducting, it is applied to the grids of tube 1102, 1103 and 1104. Tubes 1102 and 1103 depress the grid voltage on tube 1104 thereby causing tube 1104 to cut off. As tube 1104 cuts off, a source of positive potential is placed on the grid of tube 1105 through capacitor 1144, which potential is maintained by virtue of said charging capacitor beyond the time at which the positive trigger pulse is maintained on the grid of tubes 1102–1104. This assures that tube 1105 will seize control of the commutator circuit 122. The potential on the plate of tube 1105 is coupled to the grids of the remaining tubes to maintain them at cut-off.

Upon the appearance of the next negative sync pulse on lead 1115, tube 1102 seizes control as explained above. Upon subsequent appearances of positive control pulses, the circuit operates in the manner previously described.

Considering this explanation of the commutator circuit 122, it can be seen that in any given equilibrium position other than that of reset tube 1102, the coupling capacitor plays a very important part. It, combined with its connection to the then conducting plate of the previous tube, maintains a source of positive potential on the grid of the tube which must seize control of the circuit thereby assuring that it does so. The capacitor coupling the conducting tube plate to the grid of the next tube provides a means to push the switching of conduction over the transition stage so that the proper tube will seize control. Since the capacitor is a transition protector, the time constant of the RC circuit including it must be chosen so as to extend the length of the control pulse that is applied to the appropriate grid circuit. Of course, the time constant must not exceed the time between control pulses.

Output pulses are sampled by leads 1115 through 1118 at the plates of tubes 1102 through 1105, respectively, each time one of these tubes is operated. These output pulses, which are synchronized with the subsurface commutator and hence the four sampled potentials, drive their respective gating relays 1201 through 1204. These relays are associated with the individual signal channels and are utilized, as will be more fully explained below, to serially feed the signals to leads 1205–1208 of said signal channels. If additional tubes, each provided with a resistance-capacitance network in its grid circuit, are connected in a manner similar to that of the instant embodiment, the number of time-sharing pulses that can be converted is quite large. Provided, of course, that there is one reset pulse for each group of control pulses.

To express it generally, if a series of $n$ tubes are connected output to input and each pair but the last and the first one have the resistance-capacitance net connecting them and, if the series is fed a negative pulse followed by $n-1$ positive pulses, output pulses can be supplied to $n$ output terminals for use in synchronizing the controlling actions in $n$ controllable circuits or for such other uses as may prove attractive.

FIG. 16 illustrates the status of each of tubes 1102–1105 with respect to the reformed control pulses as they appear sequentially on leads 1118 and 1115. For example, tube 1102 is conducting between the appearance of a negative sync pulse and the first positive pulse, tube 1103 is conducting in interval between the first and second positive pulses, etc. Thus, the sequential conductive status of tubes 1102–1105 is available to operate gating relays 1201–1204, respectively, in time correlation with the establishment and sampling of the subsurface electrical fields.

As in the case of the synchronizing control circuit herein disclosed, the disclosed logging system is not in principle restricted to only four resistivity channels, as shown in the exemplary embodiment. It may accommodate a greater number of resistivity or other logging channels, limited only by mechanical limitations as to the number of fixed segments possible with any given commutator.

Aside from a mere mechanical expansion of the basic logic of the control circuit, if it is not necessary to have the reset function, the control circuit may be made to operate as a true ring circuit of $n$ links upon being fed a continuing succession or series of like polarity pulses. For example, if a capacitor of proper value were connected between the plate of tube 1105 and the grid of tube 1102, and if grid resistor 1124 of tube 1105 is connected to pulse lead 1118 rather than to lead 1115, and if the plate of tube 1105 and the output lead off of the plate are disconnected from lead 1118, tube 1102 would seize control from the last tube 1105 at the appearance of the next positive pulse. The mode of this switching of conduction would be precisely as described in regard to tubes 1103–1105 upon the appearance of positive pulses. In this modified form of control circuit, the number of stages (tubes) is not limited to four, but may be any larger number, it being evident that each stage must include a load and a pulse output lead connected to the RC input net of the next succeeding stage.

*Selective gating circuit*

Now that the surface commutation of the sampled potentials, in synchronism with their detection in the borehole, has been explained, it only remains to understand how the gating relays are operated by the control pulses on leads 1115–1118 to place the sampled potentials for a constant period of time on their respective leads 1205–1208. It will be recalled that pulse stretching networks 150, 145, 140 and 135 stretch the sampled potentials over the full sampling cycle or period; however, they can only perform their function if, as was assumed earlier, the length of pulses gated to them by relays 1201–1204 are maintained constant. The selective gating circuit 121 is arranged to assure that this assumption was and is correct.

The signals representing the 10′ short lateral, the 18′8″ long lateral, the 16″ short normal and the 64″ long normal appear sequentially on lead 920 and are directed by the sequential operations of relays 1201–1204, respectively, to the pulse stretching networks 150, 145, 140 and 135 which are associated with galvanometers 1–4 (159-156), respectively.

The selective gating circuit includes four vacuum tubes 1225–1228, each of which is associated with one of the gating relays 1201–1204, respectively. The output leads 1115–1118 (from commutator 122) are connected to the respective grids of tubes 1225–1228 through respective capacitors 1230, 1240, 1250 and 1260 and respective grid limiting resistors 1232, 1242, 1252 and 1262. Further, grid-leak resistors 1231, 1241, 1251 and 1261 are associated with tubes 1225–1228, respectively, and the cathodes of the tubes are grounded. The plates of tubes 1225–1228 are connected to B+ lead 1101 through the coil of respective gating relays 1201–1204 and resistors 1234, 1244, 1254 and 1264 which are each in series with respective ones of the gating relays. The relay coils and their associated resistors are shunted by respective capacitors 1233, 1243, 1253, and 1263.

In their normal state, with no control pulses appearing on leads 1115–1118, the tubes 1225–1228 are biased so that they conduct, and capacitors 1230, 1240, 1250 and 1260 are charged. The purpose of maintaining tubes 1225–1228 normally in their conductive state is to allow the negative control pulses on their associated leads 1115–1118 to change their state without any phase inversion equipment. If these tubes were maintained normally cut-off, the negative going control pulses on leads 1115 through 1118 would have to be converted to positive pulses in order to raise the grid voltage so that conduction could take place. The tubes are also maintained normally conductive in order to avoid the capacitive transfer of voltage spikes to the contacts of the relays in the plate circuits of tubes 1225 through 1228.

Looking more particularly at a signal channel, including tube 1225 and relay 1201, with no control pulse appearing on lead 1115 the tube is drawing current and relay 1201 is energized in a circuit extending to B+ lead 1101. Capacitor 1233 in shunt of the relay is also fully charged. When a negative control pulse appears on lead 1115, capacitor 1230 is immediately discharged and tube 1225 is driven to cut-off by the appearance of the large negative voltage on the grid thereof. Even though the tube 1125 is immediately cut-off, the gating relay 1201 is maintained in its energized condition until the current in the circuit, including capacitor 1233, resistor 1234 and the resistance of the coil of relay 1201 permits, as determined by the time constant of the circuit, the current flowing to decrease below the release current value of the relay. At that time the relay armature starts to release and shortly thereafter a circuit is completed from common signal lead 920 over back contact 1 of relay 1201, resistor pots 1210 and 1211, and back contact 1 of relay 1209 to lead 1205 (which is connected to the pulse stretching network 150). The current flowing through the coil of relay 1201 continues to decrease as capacitor 1233 discharges even after the relay has released, until the circuit including resistor 1231 and capacitor 1230 is charged sufficiently to allow tube 1225 to again start to conduct. At that point, the plate current recharges capacitor 1233 and at the same time builds up current through the coil of relay 1201 until it again operates to open the previously traced circuit between common signal lead 920 and lead 1205. Tube 1225 is thereafter maintained in a conductive state, and relay 1201 is maintained operated until the next appearance of a control pulse on lead 1115.

When the negative going leading edge of the gating pulse appears on line 1115, tube 1225 is immediately cut off as this pulse is applied to grid resistor 1232. The voltage between the plates of capacitor 1230 equalizes as charge leaks off exponentially through resistor 1231 to ground. As a result, the grid voltage developed across resistor 1231 rises exponentially toward zero. At some time in this rise, the grid voltage reaches a value at which plate current again flows in tube 1225. This time is determined by the time constant of the circuit comprising capacitor 1230 and resistor 1231. One of the functions of resistor 1232 is to limit the flow of grid current in tube 1225 when the trailing edge of the gating pulse is differentiated by capacitor 1230 and resistor 1231.

By properly choosing the time constant of the differentiator circuit associated with the grid of tube 1225 and the time constant of the circuit including the coil of relay 1201, the points of contact closure and opening may be accurately determined. All of this presupposes that relay 1201 has narrow limits within which it operates and releases. Such a relay is the Western Electric 275 mercury type. With this relay, time constants may be chosen so that the swinger associated with relay 1201 is maintained in contact with back contact 1 for a preselected and constant period of time. The choice of this period of contact closure is made so that the sample potential representing the long lateral resistivity curve has reached a constant value that is maintained during the period in which the contacts are closed. The advantage of passing only the middle part of a sample potential is the elimination of the distorted leading and trailing edges of the sample potential which permits stretching of a finite sample.

The integration of the timing of the components of this signal channel may be more readily understood by referring to FIGS. 17 through 22 wherein the sync or control pulses for time intervals 1 through 4 (as depicted in FIG. 17), are shown correlated along a time axis with the pulses on control leads 1115 through 1118 (FIG. 18), the grid to cathode on gating relay tubes 1225 through 1228 (FIG. 19), the coil current through gating relays 1201 through 1204 (FIG. 20), the periods of contact closure for gating relays 1201–1204 (FIG. 21), and the sampled potentials on common signal lead 920 and leads 1205 through 1208 (FIG. 22).

Looking more particularly at time interval 1 (FIGS. 17–22), it will be noted that the negative sync pulse is presented to the gating section 120 at the beginning of the time interval, causing a negative square wave pulse on lead 1115 for time interval 1 (see FIG. 18). This negative pulse immediately drives tube 1225 to cut-off by decreasing the grid voltage (FIG. 19). However, as noted above, capacitor 1230, associated with the grid of tube 1225, starts to discharge exponentially through resistor 1231 until the grid to cathode voltage is reduced to the point where the tube will again conduct, as noted by c in FIG. 19. Looking now to FIG. 20, as soon as gating relay control tube 1225 is cut off, which interrupts the circuit including the coil of relay 1201, the current through the coil begins an exponential decay as capacitor 1233 discharges through the relay winding. This exponential decay continues until the point in time at which tube 1225 again conducts and then the current drawn through the winding of relay 1201 exponentially builds up to a steady state value. As can be seen in FIG. 20, as the current through the winding of relay 1201 decreases, the relay starts to release at point a and the contacts close a short time later at point b. Then as the current begins to build up through the coil of relay 1201, as a result of the re-operation of tube 1225, the relay starts to operate at point c and the contacts associated therewith open a short time later at point d. As a result of this sequence of events, the contacts on relay 1201 will be closed between points b and d, as shown in FIG. 21, and at all other times remain in their open position. The careful selection of the components in the capacitor timing circuits makes it possible to select the time interval b–d so that the sample potentials on common signal lead 920 have reached a steady state or constant value, thereby placing on leads 1205 through 1208 square wave signals having a preselected time width (FIG. 22).

The tube 1226 and plate relay 1202 which constitute part of the second signal channel, operate in a fashion similar to that described for the first signal channel including tube 1225 and relay 1201. The signal channels including tubes 1227 and 1228 and plate connected relays 1203 and 1204, respectively, also operate similarly. Looking particularly at the second signal channel and referring to FIG. 17 through FIG. 22, it can be seen that tube 1226 is driven immediately to cut-off (FIG. 19) by the presence of a negative control pulse on lead 1116 (FIG. 18) and that the current through relay 1202 begins to decay at the cut-off of tube 1226, releases at a time a and begins to re-operate at a time c (FIG. 20). However, since there is some delay between the time that the release current value is reached and the contacts close, and the time that an operate current level is reached and the contacts open, the contacts are actually closed during the interval b–d (FIG. 21). This, finally, has the effect of sampling the middle portion of the long lateral signal on signal lead 920 (FIG. 22) which is gated by relay 1202 to output lead 1206 as shown in FIG. 22.

As will be evident from the description of the selective gating circuit 121, as regards the first two signal channels, the channels including relays 1203 and 1204 function similarly.

To recapitulate, the time-sharing sample potentials are translated over lead 920 to the back contacts of respective gating relays 1201 through 1204 which, in response to the sync pulses and associated surface circuitry, separate them to respective leads 1205 through 1208, each signal having a constant and preselected time interval. These constant length sample potentials are thereafter separately stretched and applied to their respective galvanometers in the recorder 155 for registration as was explained previously.

PREPARATION AND CALIBRATION

Before a logging operation is commenced it is necessary to select the sensitivity desired and calibrate the instrument. In most cases, this is preferably done after the tool 301 has been lowered to the bottom of the borehole 305 to permit a rough temperature equilibrium to be reached. However, the NP circuit is calibrated before the logging tool is placed in the borehole.

To calibrate the NP recording circuit, a D.C. potential for which a full scale deflection is desired, is placed on electrode 325 and with the desired sensitivity manually set on potentiometer 807 (FIG. 8), e.g., 50 millivolts, the resistor pot 806 is varied so that the galvanometer 166 reads full scale.

Once the NP recording channel is calibrated with a desired sensitivity setting, the tool 301 is lowered into the borehole.

The procedure for preparing the other four signal channels for a logging run is quite straight forward. Two steps are necessary:

(1) Zero the galvanometers with all electrodes grounded, and (2) Adjust each galvanometer for full scale deflection with standard resistive loads across the pickup electrodes and the reference sensitivity in the respective circuits.

The first step is performed by switching the function-calibration-electrode configuration circuit 223 to its position 3, which position grounds all commutated inputs and outputs. With the inputs thus grounded, the galvanometers 156–159 are each adjusted to zero deflection.

With the galvanometers zeroed, the function-calibration-electrode configuration circuit 223 is switched to position 2 which represents the calibrate position. When rotary switch 1401 is in position 2, the reference loads comprising resistors 1485–1488 are respectively connected between the fixed segments of the signal deck 212, and the fixed segments of current deck 214. In this manner, typical or reference loads attenuate the sampled potentials for calibration purposes.

After the calibrate function has been selected by the placing of a positive potential on subsurface lead 1343, the rotary switch 1421 associated with sensitivity circuit 224 is stepped to position 1 by the application of a negative potential, which position represents the 10 ohmmeter sensitivity setting and which is used for a reference value.

With the function circuit 223 set on a calibrate position and the sensitivity circuit 224 set on the 10 ohmmeter position (position 1), the switch 515 (FIG. 5) is closed to complete a path over lead 517 for the operation of calibration relay 1209 in the selective gating circuit 121. The operation of relay 1209 places the full resistance of the variable resistors 1211, 1214, 1216 and 1218 in the selective gating circuits (FIG. 12).

With the switch positions, etc., as herein described, the galvanometer 159, which is associated with the channel including gating relay 1201, is adjusted to full scale deflection by variation of resistor 1210. Thereafter, variable resistor 1213 associated with gating relay 1202, is adjusted to set full scale deflection on galvanometer 158; variable resistor 1215, associated with gating relay 1203, is adjusted to set full scale deflection on galvanometer 157; and variable resistor 1217, associated with gating relay 1204, is adjusted to set full scale deflection on galvanometer 156.

Normally, no direct means for individually calibrating at any other than the highest sensitivity position is provided (i.e., 10 ohmmeters), but of course such could be provided. A rough check is sometimes made if the operator suspects that one of the sensitivity networks is in error. This is done by switching the sensitivity circuit 224 to the 20 ohmmeter position, for example, and then checking the deflection on the respective galvanometers. If they read one-half of full scale, they are approximately correct, or if they read one-fourth of full scale with the 40 ohmmeter sensitivity setting, they are approximately correct.

*Subsurface function and sensitivity control circuit*

This control circuit 190 acts to switch the subsurface rotary switches 1401 and 1421 that are associated with the function-calibration-electrode configuration circuit 223 and the sensitivity circuit 224, respectively. Whenever it is desired to effect a stepping of these rotary switches, switch 701 in the constant current generator 100 is opened to interrupt the flow of current over conductor 1 to the subsurface instrument.

With no current flowing through current conductor 1, relay 1327 in the subsurface switching circuit 230 is released, and, as before noted, signal conductors 2 and 3 are connected to respective conductors 1342 and 1343 over respective back contacts 3 and 1 of relay 1327.

The subsurface function and sensitivity control circuit 190 (FIG. 8) includes a pair of voltage supply sources 815 and 816 connected in a preselected manner to leads 172 and 173 which are connected to signal conduction leads 2 and 3, respectively. Power supply source 815 is used for switching the stepping switches whereas source 816 is used in operating the indicating circuit. Switching power source 815 includes a conventional D.C. power supply 820 supplied from an alternating current source 191. The positive and negative output leads of the power supply 820 are connected to the swingers or armatures of a manual operated function-sensitivity switch 822. The negative lead of the D.C. power supply 820 has an ammeter in series with it. The indicate source 816 includes a battery 823 with an ammeter 824 in series with it. The battery leads are connected to swingers of a second manually operated function-sensitivity switch 825. Manual switches 822 and 825 are multi-decked, 3 position devices having back contacts 1 and 3 and front contacts 2 and 4 with intermediate neutral or off positions. As can be seen in FIG. 8, contacts 1 and 4 on manual switch 822 are grounded, whereas contacts 2 and 3 are commoned to lead 173 (signal conductor 3). Contacts 1 and 4 on manual switch 825 are also commoned to conductor 173 whereas contacts 2 and 3 are commoned to conductor 172, which is connected to signal conductor 2. The particular exemplary embodiment of this subsurface function and sensitivity control circuit 190 is skeletonized since any number of arrangements might be used in order to provide voltage to control the switching in the subsurface sensitivity circuit 224 and function circuit 223 and to identify the instant stepped positions. Even so, it must be pointed out that only one of the manual switches 822, 825 can be operated at once, otherwise the diodes associated with subsurface leads 1342 and 1343 will be overloaded. The actual switches employed in a system of this kind are wired so an operator cannot operate both at once. When the manual switch 822 is operated so that the negative source of D.C. power is placed on back contact 3 and lead 173, it completes an operating circuit for rotary switch 1401 over conductor 173, signal conductor 3, through back contact 1 of relay 1327, over conductor 1343 and through diode 1402 and the winding of rotary switch 1401 to ground. Since the diode 1402 is phased to present a low impedance to negative potential on lead 1343, current flows through the coil of rotary switch 1401 thereby causing it to step. Each time manual switch 822 is operated to place negative potential on lead 1343, the rotary switch 1401 steps. This is continued until the wipers associated with decks 1410–1418 and 1530–1533 engage their position 1 or whatever other position is desired, as identified by the indicating source circuit 825. In a similar manner, if the manual switch 822 is moved to apply positive potential over front contact 2 of the switch to lead 173, a circuit is completed through diode 1403 for the winding of rotary switch 1421, which causes it to step the wipers of its associated sensitivity circuit decks 1430–1433 to a desired position.

Through the use of positive and negative voltages over lead 173, rotary switches 1401 or 1421 may be operated as desired. Indicating means have to be provided for identifying the resting position of a wiper. The use of differently valued resistors 1444, 1449, and 1454 (FIG. 14) in the circuit previously described in connection with the subsurface apparatus, provides a simple means to determine the position of the function switch. The positive terminal of battery 823 is connected to lead 173 and the negative terminal to lead 172 by causing the swingers of switch 825 to engage back contacts 2 and 4. This completes a circuit including one of resistors 1444, 1449 or 1454, depending upon the instant position of the wipers. With this circuit completed and with each resistor known to be associated with a given switch position, a surface operator can read the ammeter 824 and tell which of the three positions the rotary switch 1401 is currently in. The diode 1471, which is connected between the wiper of switch deck 1434 on rotary switch 1421 and the junction of lead 1342 and diode 1472, is arranged polarity-wise so that it blocks any current flow through sensitivity switch deck 1434 when negative potential is present on lead 1342. On the other hand, diode 1472 is poled so that it presents a low resistance to current flow through sensitivity switch deck 1418 during the time that the negative potential is present on lead 1342, thereby assuring a determining of the position of rotary switch 1401, not the sensitivity setting rotary switch 1421.

As previously explained, in order to determine the position of rotary switch 1421, the polarity of the D.C. indicate voltage is reversed. This is effected by the operation of switch 825 whereby the positive side of battery 823 is connected over front contact 3 of switch 825 to lead 172 and the negative side over contact 1 of switch 825 to lead 173. Whenever positive voltage is placed on lead 1342, a circuit is completed over lead 1342 through diode 1471, through the wiper of switch deck 1434 and one of the resistors 1444, 1449 or 1454, depending upon the instant position of the switch deck 1434, to lead 1343. The indicating circuit is now completed through the switch deck 1434 associated with sensitivity circuit 224 and ammeter 824 again enables the operator to determine the instant position of rotary switch 1421. Contrary to the previous setup, diodes 1472 and 1471 present a high resistance to current flow through function switch deck 1418 and a low resistance to current flow through sensitivity switching deck 1434.

CONCLUSION

This completes the detailed description of the overall system for obtaining a plurality of informational curves of the subsurface lithology. Since this detailed description has been lengthy, it might serve some useful purpose to summarize the salient cooperating features of the system. However, the broad operation of this system may be reviewed by reference to the earlier General Description section. Therefore, it is suggested that the detailed description be considered in light of the broad layout as illustrated in FIGURES 1 and 2 which form the basis for the General Description section.

It is to be understood that the above described arrangements are illustrative of the application of the principles of the invention. The particular components and functional circuits which cooperate to form the instant electrical logging system are merely exemplary and should not be construed as limiting the invention in any way. Numerous other arrangements may be devised by those skilled in the art without departing from the spirit and scope of the present invention.

I claim:

1. An electrical logging system for logging an extent of earth borehole comprising: first means to generate an alternating current of constant intensity; movable means for traversal along the extent of borehole; cable means including insulated electric conductors interconnecting said first means and said movable means for traversing the latter along the extent of borehole and for current and signal transmission therebetween; said movable means comprising current-commutating and electrode means for causing alternating current supplied by said first means to pass successively through each of a plurality of paths in the borehole-encircling earth to produce therein successively existent alternating electrical fields; said movable means further comprising means to secure alternating current samples each representing the intensity of a respective one of said fields to provide A.C. signals each representing the intensity of a respective one of said fields; and means in said movable means including a common amplifier to amplify the A.C. signals each in its turn; rectifier means in said movable means for rectifying said A.C. signals to direct-current pulses and applying the direct-current pulses to conductors of said cable for transmission to a location outside the borehole; and means outside the borehole for utilizing the transmitted direct-current pulses to produce graphical log representations of respective alternating current samples; said means outside the borehole including a synchronous converter-rectifier unit for chopping the transmitted direct-current pulses into respective bursts of pulses of shorter duration and converting the bursts of pulses into respective bursts of alternating current of the chopping frequency and for synchronously with the chopping rectifying the bursts of alternating current into reconstituted direct-current pulses each representing a respective transmitted direct-current pulse, and further including in said means outside the borehole a filter for removing alternating current components from the reconstituted direct-current pulses.

2. An electrical logging system for logging an extent of earth borehole comprising: first means to generate an alternating current of constant intensity; movable means for traversal along the extent of borehole; cable means including insulated electric conductors interconnecting said first means and said movable means for traversing the latter along the extent of borehole and for current and signal transmission therebetween; said movable means comprising current-commutating and electrode means for causing alternating current supplied by said first means to pass successively through each of a plurality of paths in the borehole-encircling earth to produce therein successively existent alternating electric fields; said movable means further comprising means to secure alternating current samples each representing the intensity of a respective one of said fields to provide A.C. signals each representing the intensity of a respective one of said fields; and means for causing said electric fields to be produced in groups and said samples to be secured in corresponding groups; and means in said movable means including a common amplifier to amplify the A.C. signals each in its turn; rectifier means in said movable means for rectifying said A.C. signals to direct-current pulses and applying the direct-current pulses to conductors of said cable for transmission to a location outside the borehole; and means outside the borehole for utilizing the transmitted direct-current pulses to produce graphical log representations of respective alternating current samples; said means outside the borehole including a synchronous converter-rectifier unit for chopping the transmitted direct-current pulses and converting the chopped pulses into respective bursts of alternating current of the chopping frequency and for synchronously with the chopping rectifying the bursts of alternating current into reconstituted direct-current pulses occurring in corresponding groups and each pulse thereof representing a respective transmitted direct-current pulse, and further including in said means outside the borehole a means for separating and directing each individual reconstituted direct-current pulse of any group into a separate respective pulse-utilizing circuit, and said means outside the borehole further comprising a separate respective pulse-utilizing circuit and recorder means for each of the pulses of any of said groups of reconstituted direct-current pulses.

3. In an electrical logging system for logging an earth borehole, means for accurately conveying a plurality of logging informations from a location within a borehole to a location outside the borehole, comprising a signal line inter-connecting said locations, means for operation in the borehole to sample each of the informations in turn in repetitive cycles and provide repetitive groups of discrete A.C. wave samples each sample of a group representing a respective information during a respective cycle, means for operation in the borehole to impose the discrete A.C. wave samples on a single signal channel, means for operation in the borehole for there converting the discrete A.C. wave samples into equivalent time-spaced D.C. pulse signals and for impressing the D.C. pulse signals onto said signal line for transmission to the location outside the borehole, signal translation means outside the borehole connected to said signal line for receiving and translating said D.C. pulse signals, said signal translation means comprising means to convert each received D.C. signal pulse to a respective group of short-duration D.C. pulses and transform each said group of short-duration D.C. pulses into a corresponding burst of A.C. and rectify each burst of A.C. into a respective corresponding reconstituted D.C. pulse, said signal translation means including filter means for eliminating transient signals from each reconstituted D.C. pulse, and means for routing each such reconstituted D.C. pulse of any group thereof to a respective individual signal utilizing means for utilization in production of a respective information log.

4. An electrical logging system for earth borehole logging comprising, in combination: surface apparatus for operation outside a borehole, subsurface apparatus for operation within a borehole and an electrical suspending cable interconnecting the surface apparatus with the subsurface apparatus and adapted to traverse the latter along an extent of borehole; said surface apparatus comprising means for generating and transmitting over said cable to said subsurface apparatus an alternating current of constant intensity; said subsurface apparatus comprising a plurality of current electrodes and a plurality of pick-up electrodes and means to commutate said alternating current through current electrodes into and from borehole-encircling earth, and means including said pick-up electrodes for producing recurring series of successively existent A.C. signals each series comprising a number N of such signals each of which represents by amplitude the intensity of an alternating electric field as exhibited between pick-up electrodes and produced by flow of said alternating current through borehole encircling earth, said subsurface apparatus including also means to convert each of said A.C. signals in its turn to a corresponding respective D.C. information signal pulse and means to produce synchronously with each such signal pulse a respective corresponding discrete D.C. control pulse to provide repetitive series of N D.C. control pulses each to provide an individual D.C. control pulse for each D.C. information signal pulse and one pulse of each series thereof being of negative polarity, the subsurface apparatus also including means for impressing said D.C. information signal pulses and said D.C. control pulses onto said cable for transmission to said surface apparatus; said surface apparatus further comprising information signal translating means for receiving from said cable and converting into a respective reconstituted signal each of said D.C. information signal pulses, and for applying the reconstituted signals to N information signal channels, and also comprising synchronizing and control means for receiving said repetitive series of said D.C. control pulses and for applying the received control pulses to control signal gating means in each of said information signal channels in turn to divert through each of the latter a selected portion of a respective one of the reconstituted signals from each series thereof; said surface apparatus further including in each of said signal channels a log-forming means effective to form a log representing the respective signals gated thereinto; whereby N logs are produced each representative of intensities of respective alternating electric fields produced in the borehole encircling earth.

5. A system as defined in claim 4, said information signal translating means including: means to chop at a selected frequency each received information signal pulse into bursts of pulses of shorter duration, means to transform the said bursts of pulses of shorter duration into corresponding bursts of A.C. of said frequency, means to rectify the said bursts of A.C. into corresponding reconstituted D.C. information signals, and means to filter extraneous signal components from the reconstituted D.C. information signals.

6. A system as defined in claim 5, in which said subsurface apparatus comprises four sets of current electrodes and two sets of pick-up electrodes and in which $N=4$.

7. A system as defined in claim 6 and including in said subsurface apparatus means for obtaining a variable D.C. potential representing a spontaneous potential produced between the borehole encircling earth and said subsurface apparatus, and including means for impressing said D.C. potential onto said cable for transmission to said subsurface apparatus, and said surface apparatus including means for receiving and translating said variable D.C. potential as transmitted on said cable into an NP log.

8. A system as defined in claim 7, said system including means in said surface apparatus for controlling switching operations in said subsurface apparatus during traverse of the latter along an extent of borehole.

9. A system as defined in claim 8, said system comprising means for changing the sensitivity at which the A.C. signals are produced during traverse of the subsurface apparatus along an extent of borehole.

10. A system as defined in claim 9, in which said synchronizing and control means comprises an electronic control circuit having an input pulse line and N output leads and effective to produce repetitive series of N discrete output pulses distributed to said output leads with one output pulse per output lead per series in response to application to said input pulse line of said repetitive series of said D.C. control pulses as electric input pulses, said control circuit comprising: a group of N electron tubes each provided with an input grid circuit and an anode load circuit and anode energizing means, a common cathode bias means limiting full conduction to but one of the said tubes at any time, means for applying all said input pulses to input grid circuits of said tubes and including means acting in conjunction with said common cathode bias means and effective to cause the first tube of said group to become conductive in response to application of a negative pulse to said input circuit and further acting in conjunction with said common cathode bias means and effective therewith to cause transfer of conductive status from the previously conducting tube to the next tube of said group in response to application of a positive electric pulse of said series to said input grid circuits, whereby each of said tubes is rendered conductive in turn once for and in response to each applied complete series of N discrete input pulses and provides at its respective anode load a respective one of said N discrete output pulses, and in which system said N discrete output pulses are employed to control the time gating of said information signal channels.

11. An electrical logging system for earth borehole logging, comprising, in combination: surface apparatus for operation outside a bore hole; subsurface apparatus for operation within a borehole; and an electrical suspending cable composed essentially of first, second, and third insulated electrical conductors and a conductive sheath as four conductive members thereof, said cable interconnecting the surface apparatus with the subsurface apparatus and adapted to traverse the latter along an extent of borehole; said surface apparatus comprising means for generating and transmitting over a first conductor and the sheath of said cable to said subsurface apparatus an alternating current of constant intensity; said subsurface apparatus comprising N sets of current electrodes and sets of electric field potential pick-up electrodes, and means to commutate said alternating current successively through said N sets of current electrodes in turn into and from borehole-encircling earth to create successively existent electric fields therein, and means including said sets of electric field potential pick-up electrodes for producing recurring series of A.C. signals each series comprising N such signals each of which represents by amplitude the intensity of an alternating electric field as exhibited between a set of said pick-up electrodes and produced by a respective flow of said alternating current through borehole-encircling earth; said subsurface apparatus including also means to convert each of said A.C. signals to a corresponding respective D.C. information signal pulse and means to produce synchronously therewith a respective corresponding discrete D.C. control pulse to provide N D.C. control pulses in each of repetitive series thereof, one control pulse for and corresponding to each D.C. information signal pulse and each series comprising N−1 pulses of + polarity and one pulse of − polarity, and also including means for impressing said D.C. information signal pulses onto said second and third conductors of said cable and said D.C. control pulses onto a phantom circuit comprising at least three of said conductive members of said cable for transmission to said surface apparatus; said surface apparatus further comprising N information signal utilization channels and information signal translating means for receiving from said cable and converting into respective reconstituted D.C. information signals said D.C. information signal pulses and for applying the reconstituted information signals to the N information signal utilization channels, and also including synchronizing and control means for receiving the repetitive series of said D.C. control pulses and for employing the received D.C. control pulses to control timed gating of each of the said information signal utilization channels in turn to divert through each of the latter a selected portion of a respective one of the said reconstituted information signals; said surface apparatus also including in each of said signal utilization channels a log-informing means effective to form a log representing the respective information signals gated thereinto; whereby N logs are produced each representative of intensities of respective electric field potentials of successively existent alternating electric fields produced in the borehole-encircling earth.

12. A system as defined in claim 11 in which said synchronizing and control means comprises N output pulse leads and an electronic control circuit for producing repetitive series of N discrete output pulses on respective output pulse leads in response to the application to said control circuit of repetitive series of input pulses, said electronic control circuit comprising a group of N electron tubes each provided with an input grid circuit and an anode load having anode energizing means, a common cathode bias means limiting full conduction to but one of the said tubes at any time, means for applying input pulses to input grid circuits of said tubes, means including said input grid circuits and acting in conjunction with said common cathode bias means and effective to cause the first tube of said group to become conductive only in response to application of a negative one of said input pulses to said input grid circuits and said means also acting in conjunction with said common cathode bias means and effective therewith to cause transfer of conductive status from the previously conducting tube to the next tube of said group in response to application of a positive electric pulse of said series of input pulses to said input grid circuits, whereby each of said tubes is rendered conductive in turn once for and in response to each applied series of N discrete control pulses and provides at its respective anode load a respective one of said N discrete output pulses, said system comprising in each of said signal channels a signal-gating means connected to a respective one of said N output pulse leads and operated by a respective one of said N discrete output pulses to control said timed gating of said information signal utilization channels.

13. A system according to claim 12, in which said surface apparatus includes in said synchronizing and control means a pulse-producing circuit for producing for said electronic control circuit repetitive series of input pulses each having a rise time of the order of one microsecond or less in response to application thereto of repetitive series of said D.C. control pulses, said pulse-producing circuit comprising (1) an electric potential source having terminals of opposite polarities (2) variable resistive means connected across said terminals and comprising two series-connected resistive elements one of which is a first resistor and the other of which is a resistive electron tube having a control grid, a cathode and an anode connected to be supplied with positive potential from said source (3) a gas tube and a resistor connected in series combination with a junction therebetween and connected in parallel with one of said resistive elements (4) a lead for applying said D.C. control pulses to said control grid; and (5) pulse differentiating circuit means connected to said junction and having an output lead connected to said means for applying input pulses to input grid circuits of said tubes of said electronic control circuit for supplying thereto produced input pulses, whereby application of one of said D.C. control pulses to said control grid induces decreased resistance to current flow through said resistive electron tube and the resulting increase in current flow through said resistive means produces an increase in voltage across said gas tube and causes the latter to conduct and produce a pulse having a rise time of the order of one microsecond or less for differentiation by said pulse differentiating circuit means and application to said output lead for translation to said input grid circuits of said N electron tubes of said electronic control circuit.

14. A system according to claim 13, said information signal translating means comprising chopper means acting to chop at a certain frequency each incoming D.C. information signal into pulses of shorter duration, means to transform the pulses of shorter duration into a burst of A.C. of said frequency, and means to rectify synchronously with the chopping burst of A.C. to provide said reconstituted D.C. information signals for application to said N information signal utilization circuits.

15. A system according to claim 14, said means for generating an alternating current of constant intensity comprising an output circuit and also comprising an oscillator and an amplifier interconnected by means including a balanced variable-conductance bridge circuit whose conductance may be varied to vary the input to the amplifier from the oscillator and thereby vary an output characteristic of the generating means, means for producing and applying to said variable conductance bridge circuit a selected constant reference potential, means for deriving and applying to said variable conductance bridge circuit in opposition to said constant reference potential a control potential which varies in accordance with variation in said output characteristic of the generating means, whereby in response to a tendency of said output characteristic to vary a corrective variation is produced in said derived control potential effective to vary the conductance of said variable conductance bridge circuit in a manner such as to restore said output characteristic to the value obtaining prior to the said tendency to vary.

16. A system according to claim 15, in which said means for deriving a control potential comprises means for deriving an A.C. potential which varies in accordance with variations of an output characteristic of the said generating means, and also comprises means for rectifying and doubling the derived A.C. potential to secure therefrom a D.C. potential varying only in accordance with variations in the intensity of said output characteristic, whereby effects of variation in phase between the voltage and current in the output of said generating means are nullified.

17. A system according to claim 16 in which said balanced variable conductance bridge comprises a center-tapped input transformer winding and an output transformer winding each having corresponding winding terminals interconnected and a silicon-junction diode interposed in each interconnection and similarly poled, a pair of equal-valued resistors shunted acorss the interconnections in parallel with said output transformer winding, a capacitor connected in parallel with said resistors, a constant D.C. reference potential connection to the center tap of said input transformer winding, and a conductance-control potential connection to the common junction point of said resistors, whereby energy transfer from said input transformer windings to said output transformer winding is varied in inverse relation to variations in a control potential applied to said conductance-control potential connection.

18. A system according to claim 17, each of said signal-gating means being effective to pass only the middle portion of each of the reconstituted information signals gated therethrough, and said surface apparatus including in each of said information signal channels a pulse duration extending means whereby each passed middle portion of a reconstituted information signal is maintained at substantially undiminished amplitude throughout a period commencing with application thereto of a passed middle portion of a gated information signal and expiring with application thereto of the next succeeding gated information signal, whereby there is presented to each of said log-forming means a signal whose amplitude changes substantially only during a respective signal gating period.

19. In an apparatus for electrically logging oil wells or the like to determine the electrical characteristics of earth formations adjacent the borehole the combination of a cable having a plurality of conductors; equipment mounted on said cable to be lowered into the borehole thereby, said equipment including a plurality of current electrodes associated with a first of said conductors and at least three signal collecting means associated with a second conductor in said cable; a commutator having a plurality of commutating sections; means including a source of current and one of said commutating sections for serially supplying current to said current electrodes; switching means for serially connecting said second conductor to each of said signal collecting means; and means for actuating said switching means in synchronism with the application of current to said first conductor.

20. Apparatus for electrically logging oil wells or the like, comprising, in combination, a cable having a plurality of conductors including at least one current conductor; equipment mounted on said cable to be lowered into the borehole thereby, said equipment including at least three signal collecting means associated with a signal conductor; means for applying current through said current conductor; switching means for serially connecting said signal conductor to each of said signal collecting means; means responsive to the current flow in said current conductor for controlling said switching means; and indicating means associated with said signal conductor at the surface for providing at least three indications in response to signals from said three signal collecting means whereby at least three subjects of interest in the well bore may be investigated simultaneously.

21. Apparatus for electrically logging oil wells or the like, comprising, in combination, a cable having a plurality of conductors including at least one current carrying conductor; equipment mounted on said cable to be lowered into the borehole thereby, said equipment including at least three signal collecting means associated with a signal conductor; means for applying current through said current carrying conductor; means for serially connecting said signal conductor to each of said signal collecting means; means responsive to the current flow in said current conductor for controlling the actuation of said switching means; at least three indicating means associated with said signal conductor at the surface for providing separate indications of the signals from each of said signal collecting means whereby at least three subjects of interest in the well bore may be investigated simultaneously; and means for rendering said three indicating means effective in time correlation with the operation of said switching means.

22. Apparatus for electrically logging oil wells or the like, comprising, in combination, a cable having a plurality of conductors including at least one current conductor and at least one signal conductor; equipment mounted on said cable to be lowered into the borehole, said equipment including at least three signal collecting means associated with said signal conductor; means for applying current through said current conductor; switching means for serially connecting said signal conductor to each of said signal collecting means; and means responsive to the current flow in said current conductor for controlling the actuation of said switching means.

23. Apparatus for electrically logging oil wells or the like, comprising, in combination, a cable having a plurality of conductors including at least one current conductor and at least one signal conductor; equipment mounted on said cable to be lowered into the borehole, said equipment including at least three signal collecting means associated with said signal conductor; means for applying an alternating current through said current conductor; switching means for serially connecting said signal conductor to each of said signal collecting means; and means responsive to the current flow in said current conductor for controlling the actuation of said switching means in synchronism with the frequency of the current flowing in said current conductor.

24. Apparatus for electrically logging oil wells or the like, comprising, in combination, a cable having a plurality of conductors including a current conductor and a signal conductor; equipment mounted on said cable to be lowered into the borehole, said equipment including at least three signal collecting means associated with said signal conductor; means for applying alternating current through said current conductor; switching means for serially connecting said signal conductor to each of said signal collecting means; means responsive to the current flow in said current conductor for controlling the actuation of said switching means in synchronism with the frequency of the current flowing in said current conductor; at least three indicating means associated with the signal conductor at the surface for providing separate indications of the signals from each of said signal collecting means whereby at least three subjects of interest in the well bore may be investigated simultaneously, said indicating means including means for rendering the three indicating means effective in time correlation with the operation of said switching means in order to separate the signals on said signal conductor.

25. In an apparatus for electrically logging oil wells or the like, the combination of a cable having a plurality of conductors including a signal carrying conductor and a current conductor; equipment mounted on said cable to be lowered into the borehole, said equipment including a pair of spaced apart potential electrodes; means for serially establishing three separate and distinct fields in the earth formations adjacent the borehole, all of said fields being established by current flow through said current conductor; switching means for serially connecting said signal carrying conductor to at least one of said potential electrodes; means responsive to the current flow in said current conductor for controlling actuation of said switching means in synchronism with the serial establishment of said fields; three measuring systems at the earth's surface associated with said signal carrying conductor; and means for rendering said measuring systems effective in synchronism with the establishment of said fields in order to separate the signals present on said signal carrying conductor and permit each one of said measuring systems to indicate the effect of each of said fields upon its corresponding electrode arrangement.

26. In an apparatus for electrically logging the characteristics of earth formations adjacent a borehole, the combination of a cable having a plurality of conductors including a signal carrying conductor and a current carrying conductor; equipment mounted on said cable to be lowered into the borehole, said equipment including at least two current electrodes and at least a pair of longitudinally spaced apart potential electrodes located different distances from said current electrode; means for serially establishing at least two separate and distinct fields in the earth's formations adjacent the borehole, both of said fields being established by current flow through said current conductor to said current electrodes; first signal collecting means including at least one of said potential electrodes for sampling a first potential difference resulting from said first field; second signal collecting means including both of said potential electrodes for sampling a second potential difference resulting from said second field; switching means for serially connecting said signal carrying conductor to said signal collecting means in synchronism with the establishment of said fields; and at least a pair of indicating systems at the earth's surface associated with said signal carrying conductor and rendered effective in synchronism with the operation of said switching means thereby to separate the signals on said signal carrying conductor.

27. A system for obtaining measurements correlatable with the lithology of subsurface strata adjacent an aperture defined by said strata comprising, in combination, a cable having a plurality of conductors; a tool attachable to said cable, means associated with said cable and operable to cause said tool to traverse the subsurface strata defining said aperture at varying rates, means including at least one of said conductors for establishing at least three fields adjacent said tool, detecting means associated with said tool but located remote from said field establishing means, subsurface means including said detecting means for sampling each of said established fields, surface indicating means for each of said detected fields, and means including at least one of said conductors to transfer said detected signals to their respective indicating means on a time-sharing basis.

28. A system for obtaining measurements correlatable with the lithology of subsurface strata adjacent an aperture defined by said strata comprising, in combination, a cable having a plurality of conductors, a tool attachable to said cable, means associated with said cable and operable to cause said tool to traverse the subsurface strata defining said aperture at varying rates, means including a current generator for establishing at least three fields adjacent said tool, means located remote from said field establishing means to detect preselected ones of said established fields, surface indicating means for each of said detected fields, and means to transfer said detected signals to their respective indicating means synchronously with the establishment of said fields.

29. A system for obtaining measurements correlatable with the lithology of subsurface strata adjacent an aperture defined by said strata comprising, in combination, a cable having a plurality of conductors including at least one signal conductor, a subsurface instrument attachable to one end of said cable, said instrument having a plurality of current and pickup electrodes associated therewith, the total number of electrodes exceeding the number of conductors, surface equipment attachable to the other end of said cable, means operable to cause said tool to traverse the extent of said aperture at preselected rates, a source of constant current, means for preselectively connecting said source to preselected ones of said current electrodes and combinations thereof in order to establish at least three potential fields in said subsurface strata adjacent said tool, means to serially sample said established fields at a plurality of locations of said detecting electrodes, and means associated with said surface equipment to display said detected field samples.

30. A system for obtaining measurements correlatable with the lithology of subsurface strata adjacent an aperture defined by said strata comprising, in combination, a cable having a plurality of conductors including at least one signal conductor, a subsurface instrument attachable to one end of said cable, said instrument having a plurality of current and pickup electrodes associated therewith, surface equipment attachable to the other end of said cable, means operable to cause said tool to traverse the extent of said aperture at preselected rates, a source of constant current, means for preselectively connecting said source to preselected ones of said current electrodes and combinations thereof in order to establish at least three time-displaced potential fields in said subsurface strata adjacent said total, means to serially sample said established fields at a plurality of locations of said detecting electrodes, means to transmit said samples to said surface apparatus, said means including fewer of said conductors than there are samples, and means associated with said surface and subsurface equipment to separate and display said detected samples.

31. A system for obtaining measurements correlatable with the lithology of subsurface strata adjacent an aperture defined by said strata comprising, in combination, a cable having a plurality of conductors including at least one current conductor, a subsurface instrument attachable to one end of said cable, said instrument having a plurality of current and spaced apart pickup electrodes associated therewith, the total number of electrodes exceeding the number of conductors, surface equipment attachable to the other end of said cable, means operable to cause said tool to traverse the extent of said aperture at preselected rates, a source of constant current, means including said current conductors for serially connecting said source to preselected ones of said current electrodes in order to establish more than three potential fields in said subsurface strata adjacent said tool, means to serially sample said established fields at a plurality of locations of said detecting electrodes, means associated with said surface equipment to separate and display said detected samples, said surface means also including means cooperating with said current conductor to display natural earth potentials, and means to correlate all of said samples with the depth at which they were made.

32. A system for measuring electrical characteristics of the formations adjacent a borehole comprising, in combination, a cable having a plurality of conductors including at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means to serially establish a plurality of electrical fields in the formations adjacent preselected ones of said electrodes; means to serially sample said established fields adjacent other preselected ones of said electrodes at the time said fields are established; the location of said electrodes, the preselection of serially established electrical field and the preselection of the serially sampling of the preselected electrical fields being such as to provide sample potentials each of which conform to a short normal, long normal, short lateral or long lateral resistivity curve; means for converting said sample potentials to direct current pulses for transmission to said surface equipment over said pair of signal conductors; a plurality of recording means; gating means to direct said sample potentials to their respective recording means; and means for controlling said gating means whereby said samples are directed to their respective recording means in synchronism with the establishment and sampling of said fields.

33. A system for measuring electrical characteristics of the formations adjacent a borehole comprising, in combination, a cable having a plurality of conductors including at least two current carrying conductors and at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means including a source of current and said current carrying conductors to serially establish a plurality of electrical fields in the formations adjacent preselected ones of one group of said electrodes; means to serially sample said established fields adjacent preselected ones of another group of said electrodes in time correlation with the establishment of said fields; means for converting said sample potentials to direct current pulses; the location of said electrodes, the preselection of serially established electrical fields and the preselection of the serially sampling of the preselected electrical fields being such as to provide sample potentials each of which conform to a short normal, long normal, short lateral, or long lateral resistivity curve; means for transmitting said direct current pulses to said surface equipment over said pair of signal conductors; means for recording said sample potentials of each of said plurality of fields; gating means to direct said sample potentials to their respective recording means; and means for controlling said gating means whereby said samples are directed to their respective recording means in synchronism with the establishment and sampling of said fields.

34. A system for measuring electrical characteristics of the formations adjacent a borehole comprising, in combination, a cable having a plurality of conductors including at least two current carrying conductors and at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means including a source of current and said current carrying conductors to serially establish a plurality of electrical fields in the formations adjacent preselected ones of one group of said electrodes; means to serially sample said established fields adjacent preselected ones of another group of said electrodes in time correlation with the establishment of said fields; means for converting said sample potentials to direct current pulses; means for transmitting said direct current pulses to said surface equipment over said pair of signal conductors; means associated with said surface equipment for eliminating all alternating current components from said direct current sample pulses; means for recording said A.C.-free sample potentials of each of said plurality of fields; gating means to direct said A.C.-free sample potentials to their respective recording means; means for controlling said gating means whereby said A.C.-free samples are directed to their respective recording means in synchronism with the establishment and sampling of said fields; means for recording the natural earth potential of said formations; and means to select a logging sensitivity and to calibrate the plurality of said recording means.

35. A system for measuring electrical characteristics of the formations adjacent a borehole comprising, in combination, a cable having a plurality of conductors including at least two current carrying conductors and at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means including said current conductors for serially establishing a plurality of electrical fields in the formations adjacent said borehole; means for serially sampling said established fields at electrode locations remote from said establishing electrodes on a time-sharing basis; the location of said electrodes, the preselection of serially established electrical fields and the preselection of the serially sampling of the preselected electrical fields being such as to provide sample potentials each of which conform to a short normal, long normal, short lateral or long lateral resistivity curve; and means to separate said sample potentials at said surface apparatus.

36. A system for measuring electrical characteristics of the formations adjacent a borehole comprising, in combination, a cable having a plurality of conductors including at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means to serially establish a plurality of electrical fields in the formations adjacent preselected ones of said electrodes; means to serially sample said established fields adjacent other preselected ones of said electrodes at the time said fields are established; the location of said electrodes, the preselection of serially established electrical fields and the preselection of the serially sampling of the preselected electrical fields being such as to provide sample potentials each of which conform to a short normal, long normal, short lateral or long lateral resistivity curve; and means including said signal conductors for recording said sample potentials; said means including gating means responsive to the serial establishment of said fields to direct said samples to their respective recording means in synchronism with the establishment and sampling of said fields.

37. A system for measuring electrical characteristics of the formations adjacent a borehole comprising, in combination, a cable having a plurality of conductors including at least two signal conductors; a subsurface instrument attachable to one end of said cable for traversing said borehole, said instrument including a plurality of electrodes; surface equipment attachable to the other end of said cable; means operable to cause said instrument at times to traverse the formations penetrated by said borehole; means to serially establish a plurality of electrical fields in the formations adjacent preselected ones of said electrodes; means to sample said established fields adjacent other preselected ones of said electrodes in time correlation with the establishment of said fields; the location of said electrodes, the preselection of serially established electrical fields and the preselection of the serially sampling of the preselected electrical fields being such as to provide sample potentials each of which conform to a short normal, long normal, short lateral or long lateral resistivity curve; means for converting said sample potentials to direct current pulses; means for transmitting said direct current pulses to said surface equipment over said pair of signal conductors; means associated with said surface equipment for eliminating all alternating current components from said direct current sample pulses; means for recording said A.C.-free sample potentials of each of said plurality of fields; gating means to direct said A.C.-free sample potentials to their respective recording means; and means for controlling said gating means whereby said A.C.-free samples are directed to their respective recording means in synchronism with the establishment and sampling of said fields.

38. A system for measuring electrical characteristics of the formations adjacent a borehole comprising, in combination, a shielded cable having a pair of signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole, a subsurface commutator; means including said commutator to establish serially a plurality of electrical fields in the formations adjacent various ones of said current electrodes; means associated with said signal conductors and including said commutator and various preselected combinations of said plurality of pickup electrodes to serially sample said established fields at the time said fields are established; a signal shaping circuit for converting said time-sharing sample potentials to direct current pulses for transmission to said surface equipment over said pair of signal conductors; means associated with said surface equipment for eliminating all alternating current components from said direct current sample pulses; means for recording said direct current sample potentials of each of said plurality of fields; gating means operable to direct said direct current sample potentials to their respective recording means; means associated with said subsurface instrument and said surface apparatus for synchronizing the operation of said gating means with the establishment and sampling of said fields; and means including a natural potential electrode and at least one conductor to log the natural earth potential of said formations.

39. A system for measuring electrical characteristics of the formations adjacent a borehole comprising, in combination, a cable having a plurality of conductors including at least two current carrying conductors and at least a pair of signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole; a source of power connected to said current carrying conductors and forming a part of said surface equipment; a commutator; means including said commutator and said current conductors to establish serially a plurality of electrical fields in the formations adjacent various ones of said current electrodes; means associated with said signal conductors and including said commutator and various preselected combinations of said plurality of pickup electrodes to serially sample said established fields at the time said fields are established; the location of said electrodes, the preselection of serially established electrical fields and the preselection of the serially sampling of the preselected electrical fields being such as to provide sample potentials each of which conform to a short normal, long normal, short lateral or long lateral resistivity curve; means for recording said sample potentials of each of said plurality of fields; gating means operable to direct said sample potentials to their respective recording means; and means for controlling said gating means whereby said samples are directed to their respective recording means in synchronism with the establishment and sampling of said fields.

40. A system for measuring electrical characteristics of the formations adjacent a borehole comprising, in combination, a cable having a plurality of conductors including at least two current carrying conductors and at least two signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole; a constant current generator connected to said current carrying conductors and forming a part of said surface equipment; a subsurface commutator; means including said commutator and said current conductors to establish serially a plurality of electrical fields in the formations adjacent various ones of said current electrodes; means associated with said signal conductors and including said commutator and various preselected combinations of said plurality of pickup electrodes to serially sample said established fields at the time said fields are established; a signal shaping circuit for converting said time-sharing sample potentials to direct current pulses for transmission to said surface equipment over said pair of signal conductors; means for recording said sample potentials of each of said plurality of fields; gating means operable to direct said sample potentials to their respective recording means; means for controlling said gating means whereby said samples are directed to their respective recording means in synchronism with the establishment and sampling of said fields; said control means including means cooperating with said commutator to produce a repetitive series of control pulses and a surface commutator responsive to said control pulses to synchronously control said gating means.

41. A system for measuring electrical characteristics of the formations adjacent a borehole comprising, in combination, a cable having a plurality of conductors including at least two current carrying conductors and at least a pair of signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole; a constant current generator connected to said current carrying conductors and forming a part of said surface equipment; a subsurface commutator; means including said commutator and said current conductors to establish serially a plurality of electrical fields in the formations adjacent various ones of said current electrodes; means associated with said signal conductors and including said commutator and various preselected combinations of said plurality of pickup electrodes to serially sample said established fields at the time said fields are established; a signal shaping circuit for converting said time-sharing sample potentials to direct current pulses for transmission to said surface equipment over said pair of signal conductors; means for recording said sample potentials of each of said plurality of fields, each of said recording means including a pulse stretching network to maintain said sample pulse until the field associated therewith is again sampled following a complete cycle of said commutator; gating means operable to direct said sample potentials to their respective recording means; means associated with said subsurface instrument and said surface apparatus for controlling said gating means whereby said samples are directed to their respective recording means in synchronism with the establishment and sampling of said fields; said control means including means cooperating with said commutator to produce a repetitive series of control pulses; means for phantoming said series of control pulses to said surface apparatus, and a surface commutator responsive to said control pulses to synchronously control said gating means; and means including at least one conductor and recording means to log the natural earth potential of said formations.

42. A system for measuring electrical characteristics of the formations adjacent a borehole comprising, in combination, a shielded cable having a current carrying conductor and a pair of signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole; a constant current generator connected to said current carrying conductor and forming a part of said surface equipment; a subsurface commutator; means including said commutator and said current conductors to establish serially a plurality of electrical fields in the formations adjacent various ones of said current electrodes; means associated with said signal conductors and including said commutator and various preselected combinations of said plurality of pickup electrodes to serially sample said established fields at the time said fields are established; a signal shaping circuit for converting said time-sharing sample potentials to direct current pulses for transmission to said surface equipment over said pair of signal conductors; means associated with said surface equipment for eliminating all alternating current components from said direct current sample pulses; means for recording said direct current sample potentials of each of said plurality of fields in correlation with the depth at which said fields were sampled, each of said recording means including a pulse stretching network to maintain said sample pulse until the field associated therewith is again sampled following a complete cycle of said commutator; gating means operable to direct said direct current sample potentials to their respective recording means; means associated with said subsurface instrument and said surface apparatus for controlling said gating means whereby said direct current samples are directed to their respective recording means in synchronism with the establishment and sampling of said fields; said control means including means cooperating with said commutator to produce a repetitive series of control pulses equal in number to the number of fields sampled; means for phantoming said series of control pulses between said signal conductors and the sheath of said cable to said surface apparatus, and a surface commutator responsive to said control pulses to synchronously control said gating means; and means including a natural potential electrode, at least one conductor and recording means to log the natural earth potential of said formations.

43. A system for measuring electrical characteristics of the formations adjacent a borehole comprising, in combination, a shielded cable having a current carrying conductor and a pair of signal conductors; a subsurface instrument attachable to one end of said cable for traversing said borehole, said instrument including a plurality of current and pickup electrodes; surface equipment attachable to the other end of said cable; means operable to cause said instrument at times to traverse the formations penetrated by said borehole; a constant current generator connected to said current carrying conductor and forming a part of said surface equipment, said generator including feedback means for maintaining a constant current output irrespective of load; a subsurface commutator having multi-segmented current, signal and pulse decks; means responsive to said constant current flowing in current conductor to rotate said commutator decks; means including said current deck of said commutator and said constant current to establish serially a plurality of electrical fields in the formations adjacent said current electrodes, said fields equal in number to the number of commutating segments on said current deck; means associated with said signal conductors and including said signal deck of said commutator and various preselected combinations of said plurality of pickup electrodes to serially sample said established fields in time correlation with the establishment of said fields; a signal shaping circuit for converting said time-sharing sample potentials to direct current pulses for transmission to said surface equipment over said pair of signal conductors; signal converting means associated with said surface equipment for reconstituting as square wave pulses said time-sharing sample potentials of said plurality of fields; means for recording said sampled potentials of each field of said plurality of fields in correlation with the depth at which said fields were sampled, each of said recording means including a pulse stretching network to maintain said reconstituted sample pulse until the field associated therewith is again sampled following a complete revolution of said commutator; gating means operable to direct said reconstituted sample potentials to their respective recording means; means associated with said subsurface instrument and said surface apparatus to control said gating means whereby said reconstituted pulses are directed to their respective recording means in synchronism with the establishment and sampling of said fields adjacent said subsurface instrument; said control means including means cooperating with said pulse deck to produce a repetitive series of control pulses equal in number to the number of fields sampled, one of which pulses is negative, means for phantoming said series of control pulses between said signal conductors and the sheath of said cable to said surface apparatus, surface means for reforming said control pulses to have steep wave fronts, and a surface commutator responsive to said steep front control pulses to control said gating means in synchronism with the establishment of said fields; means, including a natural potential electrode, said current carrying conductor and an individual recording means to log the natural earth potential of said formations in correlation with depth; and means operable at said surface equipment at any time to select a desired logging sensitivity and to zero and calibrate the plurality of said recording means.

44. Apparatus for electrically logging oil wells or the like, comprising in combination a cable having a plurality of conductors including a current conductor and a signal conductor; equipment mounted on said cable to be lowered into the borehole, said equipment including at least three signal collecting means associated with said signal conductor; means for applying an alternating current through said current conductor; switching means for connecting said signal conductor to each of said signal collecting means; means responsive to the current flow in said current conductor for controlling the actuation of said switching means in synchronism with the alternations in the current flow in said current conductor; at least two indicating means associated with the signal conductor at the surface for providing separate indications of the signals from each of said signal collecting means, whereby at least two subjects of interest in the well bore may be investigated simultaneously, said indicating means including means for rendering the two indicating means effective in time correlation with the operation of said switching means in order to separate the signals on said signal conductor.

45. In an apparatus for electrically logging the characteristics of earth formations adjacent a borehole, the combination of a cable having a plurality of conductors including a signal carrying conductor and a current carrying conductor; equipment mounted on said cable to be lowered into the borehole, said equipment including a current electrode and a pair of longitudinally spaced apart potential electrodes located different distances from said current electrode; means for establishing separate and distinct fields in the earth's formations adjacent the borehole, at least one of said fields being established by current flow through said current conductor to said current electrode; a first signal collecting means including one of said potential electrodes for sampling a first potential difference resulting from said first field; second signal collecting means including the other of said potential electrodes for sampling a second potential difference resulting from said second field; switching means for connecting said signal carrying conductor to said potential electrodes in synchronism with the establishment of said fields; and a pair of indicating systems at the earth's surface associated with said signal carrying conductor and rendered effective in synchronism with the operation of said switching means, thereby to separate the signals on said signal carrying conductor so that one of the indicating means measures the first potential difference and the other indicating means measures the second potential difference.

46. An electrical logging system for logging an earth borehole, comprising surface apparatus, subsurface apparatus to be traversed along an extent of borehole to be logged, and plural-conductor electric cable means electrically interconnecting the surface and subsurface apparatuses and adapted to support and traverse the subsurface apparatus along said extent of borehole, said subsurface apparatus comprising current distributing means for causing alternating current distributed thereby to create at least one alternating electric field in the earth encircling the borehole and means for securing A.C. samples each representative of the potential intensity of the alternating electric field as presented between a respective set of plurality of sets of locations along the borehole, said surface apparatus comprising a generator of alternating current of constant intensity connected to supply such current to the subsurface apparatus through said cable means, said subsurface apparatus comprising means to form a group of discrete direct-current pulse signals spaced apart in time and each pulse signal representing by amplitude the intensity of a respective one of said secured A.C. samples and further including means to transmit over two conductors of said cable means said group of direct-current pulse signals, and resolving means associated with the surface apparatus and connected to said two conductors to receive, translate and produce a logging indication of the amplitude of the respective direct-current pulse signal, said resolving means including means to cyclically interrupt in turn each received direct-current pulse signal to form therefrom a burst of shorter pulses, transformer means to transform the burst of shorter pulses into a respective A.C. burst, means to rectify each A.C. burst synchronously with the cyclical interruption of the respective direct-current signal pulse to form a group of time-separated reconstituted D.C. pulses each representing a received direct-current pulse signal and means to filter out A.C. components from said reconstituted D.C. pulses, whereby extraneous signals due to inter-conductor leakage and reactance effects are eliminated from the signals translated for utilization in the signal-utilization circuits.

47. A system as defined in claim 46, including means to eliminate the leading and trailing portions of each of the reconstituted D.C. pulses.

48. An electrical logging system for logging an earth borehole, comprising, in combination: surface apparatus for operation outside a borehole; subsurface apparatus for operation within a borehole; and an electrical suspending cable composed essentially of first, second and third insulated electrical conductors and a conductive sheath as four conductive members thereof, said cable interconnecting the surface apparatus with the subsurface apparatus and adapted to traverse the latter along an extent of borehole; said surface apparatus comprising means for generating and transmitting over a first conductor and the sheath of said cable to said subsurface apparatus an alternating current of constant intensity; said subsurface apparatus comprising transformer means for extracting power from said alternating current for operation of subsurface apparatus components; current electrodes, a commutating device operated by power extracted by said transformer means to distribute the current in successive discrete pulses to said current electrodes whereby different electric fields are successively created, information signal producing apparatus including a plurality of electric field potential sensing electrodes and associated means for producing a series of A.C. information signals each representing the potential intensity of a respective different electric field and producing corresponding discrete D.C. information signals and impressing the D.C. information signals in successive order on said circuit comprising said second and third insulated electric conductors for transmission to said surface apparatus, means powered by power extracted by said transformer means to produce and impress on a phantom circuit including at least three of said conductive members of said cable a series of D.C. control pulses each contemporaneous with a respective D.C. information signal; and said surface apparatus including signal translating and recording means synchronized and controlled by said D.C. control pulses for translating said D.C. information signals in turn and forming separate graphical records each representing a respective one of said A.C. information signals.

References Cited by the Examiner

UNITED STATES PATENTS

| | | | |
|---|---|---|---|
| 2,003,428 | 6/35 | Cowan | 323—66 |
| 2,164,344 | 7/39 | Norwine | 323—66 X |
| 2,393,009 | 1/46 | Chun | 324—1 |
| 2,617,852 | 11/52 | Waters | 324—1 |
| 2,654,064 | 9/53 | Brading | 324—1 |
| 2,712,631 | 7/55 | Ferre | 324—1 |
| 2,728,047 | 12/55 | Doll | 324—1 |
| 2,729,784 | 1/56 | Fearon | 324—1 |
| 2,730,668 | 1/56 | Edelman | 323—1 X |
| 2,754,475 | 7/56 | Norelius | 324—1 |
| 2,779,913 | 1/57 | Waters | 324—1 |
| 2,782,364 | 2/57 | Shuler | 324—1 |
| 2,806,201 | 9/57 | Schuster | 324—1 |
| 2,813,248 | 11/57 | Ferre | 324—1 |
| 2,880,389 | 3/59 | Ferre et al. | 324—1 |
| 2,925,551 | 2/60 | Segesman | 324—1 |

WALTER L. CARLSON, *Primary Examiner.*

SAMUEL BERNSTEIN, FREDERICK M. STRADER,
*Examiners.*